United States Patent
Conrad et al.

(10) Patent No.: US 9,612,806 B2
(45) Date of Patent: *Apr. 4, 2017

(54) VERIFICATION OF COMPUTER-EXECUTABLE CODE GENERATED FROM A MODEL

(71) Applicant: THE MATHWORKS, INC., Natick, MA (US)

(72) Inventors: Mirko Conrad, Ismaning (DE); Xiaocang Lin, Sherborn, MA (US); Jun Yan, Westborough, MA (US); Peter S. Szpak, Newton, MA (US); Appa Rao Nirakh, Framingham, MA (US); Jayaprabha Shankar, Brighton, MA (US)

(73) Assignee: The MathWorks, Inc., Natick, MA (US)

(*) Notice: Subject to any disclaimer, the term of this patent is extended or adjusted under 35 U.S.C. 154(b) by 120 days.

This patent is subject to a terminal disclaimer.

(21) Appl. No.: 14/475,302

(22) Filed: Sep. 2, 2014

(65) Prior Publication Data

US 2014/0380269 A1    Dec. 25, 2014

Related U.S. Application Data

(63) Continuation of application No. 13/250,590, filed on Sep. 30, 2011, now Pat. No. 8,856,726, which is a
(Continued)

(51) Int. Cl.
G06F 9/44      (2006.01)
G06F 9/45      (2006.01)
G06F 11/36     (2006.01)

(52) U.S. Cl.
CPC ............ *G06F 8/35* (2013.01); *G06F 11/3604* (2013.01)

(58) Field of Classification Search
None
See application file for complete search history.

(56) References Cited

U.S. PATENT DOCUMENTS 5,852,449 A    12/1998  Esslinger et al.
6,289,505 B1    9/2001  Goebel
(Continued)

FOREIGN PATENT DOCUMENTS

WO    WO 02/101544    12/2002

OTHER PUBLICATIONS

Co-pending U.S. Appl. No. 12/559,233 entitled "Verification of Computer-Executable Code Generated from a Model", by Conrad et al., filed Sep. 14, 2009, 55 pages.
(Continued)

*Primary Examiner* — Insun Kang
*Assistant Examiner* — Roberto E Lunar
(74) *Attorney, Agent, or Firm* — Harrity & Harrity, LLP

(57) ABSTRACT

In an embodiment, a model is sliced into a plurality of slices. A slice in the plurality of slices is selected. A portion of code, that corresponds to the selected slice, is identified from code generated from the model. The identified code is verified to be equivalent to the selected slice. Equivalence may include equivalent functionality, equivalent data types, equivalent performance, and or other forms of equivalence between the selected slice and the identified generated code.

29 Claims, 50 Drawing Sheets

Related U.S. Application Data continuation-in-part of application No. 12/559,233, filed on Sep. 14, 2009, now Pat. No. 8,713,528.

(60) Provisional application No. 61/509,371, filed on Jul. 19, 2011, provisional application No. 61/494,274, filed on Jun. 7, 2011, provisional application No. 61/103,167, filed on Oct. 6, 2008, provisional application No. 61/103,161, filed on Oct. 6, 2008.

(56) References Cited

U.S. PATENT DOCUMENTS

| | | | |
|---|---|---|---|
| 7,151,438 | B1 | 12/2006 | Hall et al. |
| 7,331,040 | B2 | 2/2008 | Sandham et al. |
| 7,707,547 | B2 | 4/2010 | Colton et al. |
| 8,219,406 | B2 | 7/2012 | Yu et al. |
| 2002/0069192 | A1 | 6/2002 | Aegerter |
| 2004/0205772 | A1 | 10/2004 | Uszok et al. |
| 2004/0237074 | A1 | 11/2004 | Aronson et al. |
| 2004/0268331 | A1 | 12/2004 | Mitchell et al. |
| 2005/0015781 | A1 | 1/2005 | Brown et al. |
| 2005/0114841 | A1 | 5/2005 | Moskowitz et al. |
| 2006/0085180 | A1 | 4/2006 | Menezes et al. |
| 2006/0190806 | A1 | 8/2006 | Sasson et al. |
| 2006/0288332 | A1 | 12/2006 | Sagar et al. |
| 2007/0220486 | A1 | 9/2007 | Lammel et al. |
| 2008/0046864 | A1* | 2/2008 | Bai .................. G06F 8/35 717/105 |
| 2008/0189328 | A1 | 8/2008 | Sareday et al. |
| 2009/0007085 | A1 | 1/2009 | Owen et al. |
| 2009/0031181 | A1* | 1/2009 | Yuan .................. G06F 11/25 714/741 |
| 2009/0144218 | A1 | 6/2009 | Bonawitz et al. |
| 2009/0144698 | A1 | 6/2009 | Fanning et al. |
| 2009/0265684 | A1* | 10/2009 | Fuchs .................. G06F 8/10 717/105 |
| 2012/0254830 | A1 | 10/2012 | Conrad et al. |
| 2013/0326472 | A1* | 12/2013 | Han .................. G06F 8/20 717/105 |

OTHER PUBLICATIONS

Susan Horwitz, Jan Prins and Thomas Reps, "On the Adequacy of Program Dependence Graphs for Representing Programs", 1988, ACM.

Susan Horwitz, Jan Prins and Thomas Reps, "Integrating Non-Interfering Versions of Programs", 1988, ACM.

International Search Report and Written Opinion for Application No. PCT/US2012/041329, 15 pages, dated Feb. 8, 2013.

Adams, M. M. et al., "CLAWS: Cost-effective Formal Verification for Control Systems", DASC 2005, The 24$^{th}$ Digital Avionics Systems Conference, vol. 2, 5 pages (2005).

O'Halloran, C. et al., "Verification of Picture Generated Code", 14$^{th}$ IEEE International Conference on Automated Software Engineering, pp. 127-136 (1999).

Toeppe, Steve et al., "Practical Validation of Model Based Code Generation for Automotive Applications", Proceedings of the 18$^{th}$ Digital Avionics Systems Conference, vol. 2:11.A3-1-10A.3-14 (1999).

Invitation to Pay Additional Fees for Application No. PCT/US2012/041329, 8 pages, dated Oct. 5, 2012.

Horwitz, Susan, Thomas Reps, and David Binkiey. "Interprocedural slicing using dependence graphs." *ACM Transactions on Programming Languages and Systems (TOPLAS)* 12.1 (1990): 26-60.

* cited by examiner

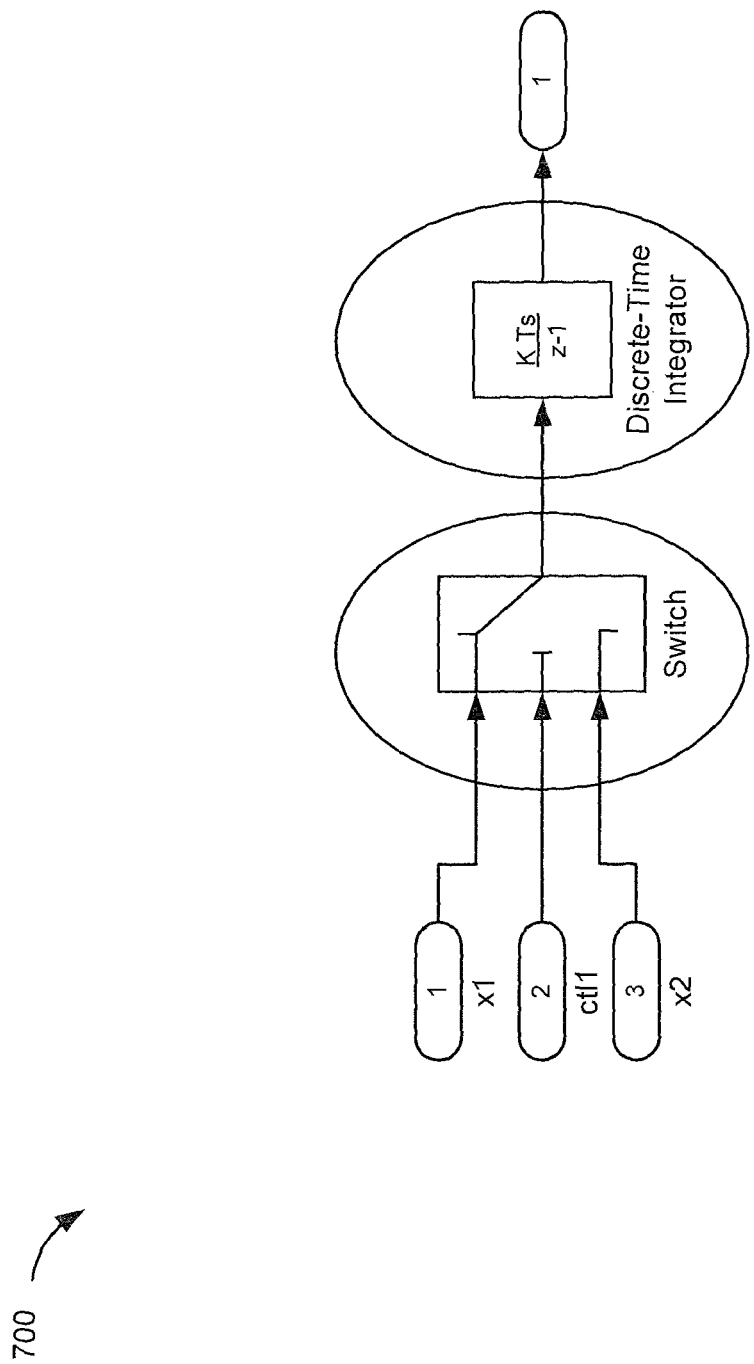

```
/* Model step function */
void example_step(void)
{
    real_T rtb_Switch;

/* Outport: '<Root>/Out1' incorporates:
     * DiscreteIntegrator: '<Root>/Discrete-Time Integrator'
     */
    example_Y.Out1 = example_DWork.DiscreteTimeIntegrator_DSTATE;

/* Switch: '<Root>/Switch' incorporates:
     * Inport: '<Root>/In1'
     * Inport: '<Root>/In2'
     * Inport: '<Root>/In3'
     */
    if (example_U.crt1 >= 0.0) {
        rtb_Switch = example_U.x1;
    } else {
        rtb_Switch = example_U.x2;
    }

/* Update for DiscreteIntegrator: '<Root>/Discrete-Time Integrator' */
    example_DWork.DiscreteTimeIntegrator_DSTATE =
        example_DWork.DiscreteTimeIntegrator_DSTATE + rtb_Switch;
}
```

FIG. 8

```
/* Model step function */
void IEC61508_step(uint16_T U_x1, uint16_T U_y1, int16_T U_x2, int16_T U_y2,
                   int16_T *Y_distance, uint8_T *Y_distance_ok)
{                                                                              ~902a /* local block i/o variables */
int16_T rtb_Add2;                                                              ~902b /* Sum: '<Root>/Add1' incorporates:
 * Inport: '/Root>/x2'
 * Inport: '/Root>/y2'
 */
rtb_Add2 = (int16_T)(U_x2 - U_y2);                                             ~902c /* Sum: '<Root>/Add2' incorporates:
 * Abs: '<Root>/Abs1'
 * Inport: '<Root>/x1'
 * Inport: '<Root>/y1'
 * Sum: '<Root>/Add'
 */
rtb_Add2 = (int16_T)(((uint16_T)(U_x1 - U_y1)) + rt_ABS(rtb_Add2));

/* Outport: '<Root>/distance' */
(*Y_distance) = rtb_Add2;                                                      ~904

/* Outport: '<Root>/distance_ok' incorporates:
 * Constant: '<S1>/Constant'
 * RelationalOperator: '<S1>/Compare'
 */
(*Y_distance_ok) = (rtb_Add2 <= 40);                                           ~906
}
```

| INPUT DATA TYPES | OUTPUT DATA TYPES | ROUNDING METHOD | SATURATION ON INTEGER OVERFLOW |
|---|---|---|---|
| DOUBLE | | CEILING | 0 |
| FLOAT | | SIMPLEST | 1 |
| INT32 | | FLOOR | 0 |
| INT16 | | ZERO | 0 |
| INT8 | | NEAREST | 1 |
| UNSIGNED32 | | | 1 |
| UNSIGNED16 | | | 1 |
| UNSIGNED8 | | | |
| BOOLEAN | | | |

1012, 1014, 1016, 1018, 1002

| CONTROL VALUES | |
|---|---|
| | |
| | |
| ⋮ | ⋮ |
| | |

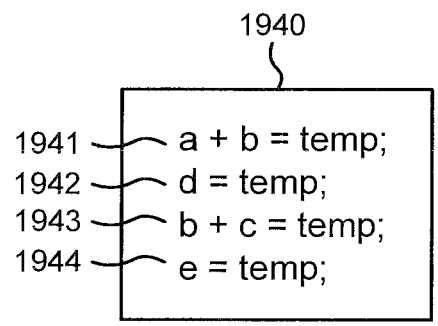
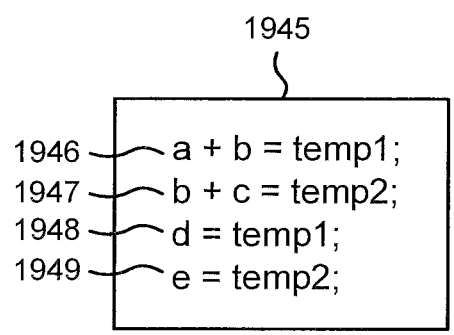
FIG. 19B

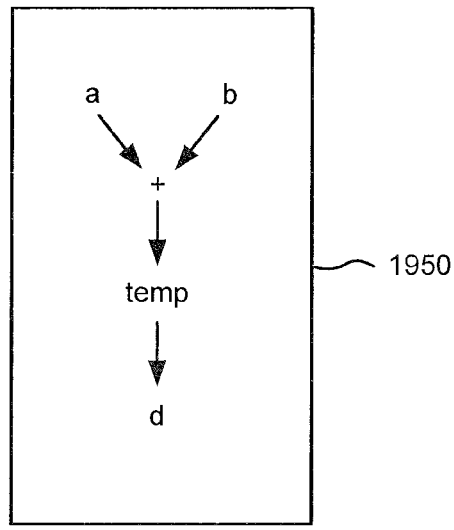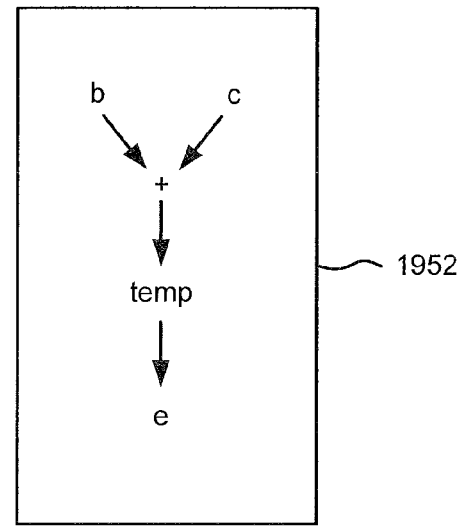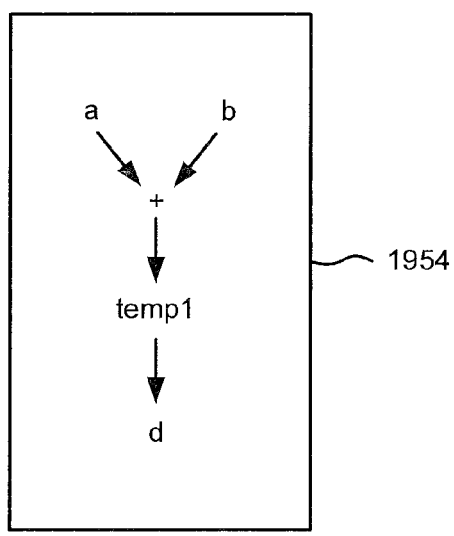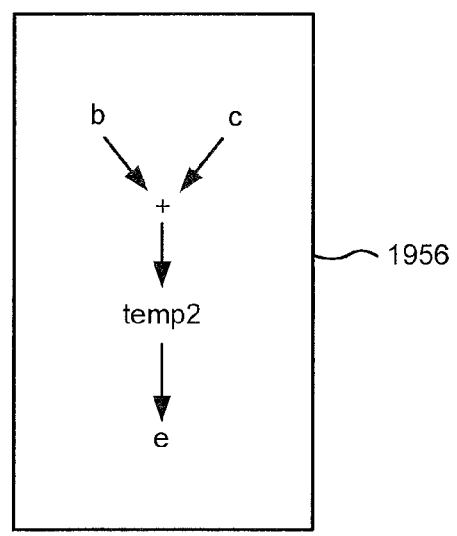
FIG. 19C

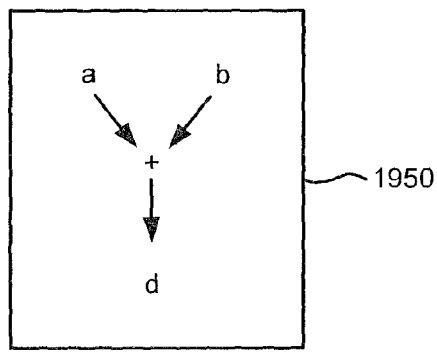 1950
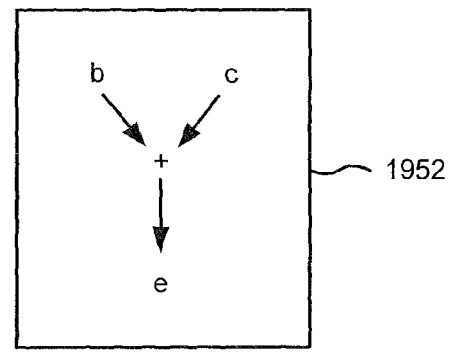 1952
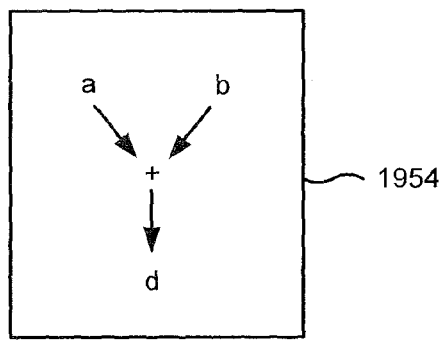 1954
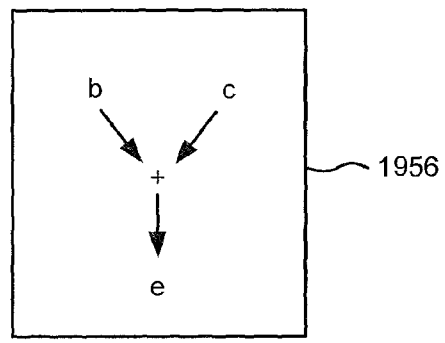 1956
FIG. 19D

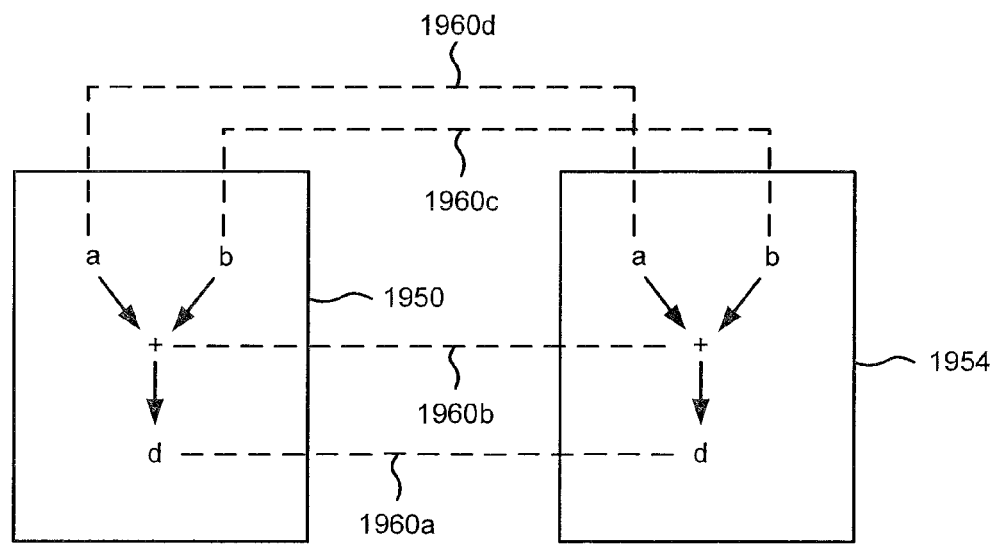
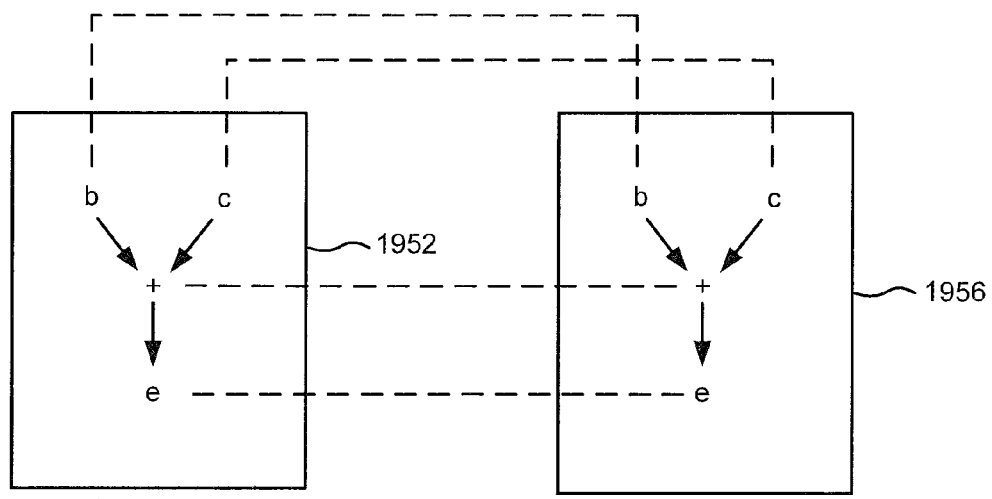
FIG. 19E

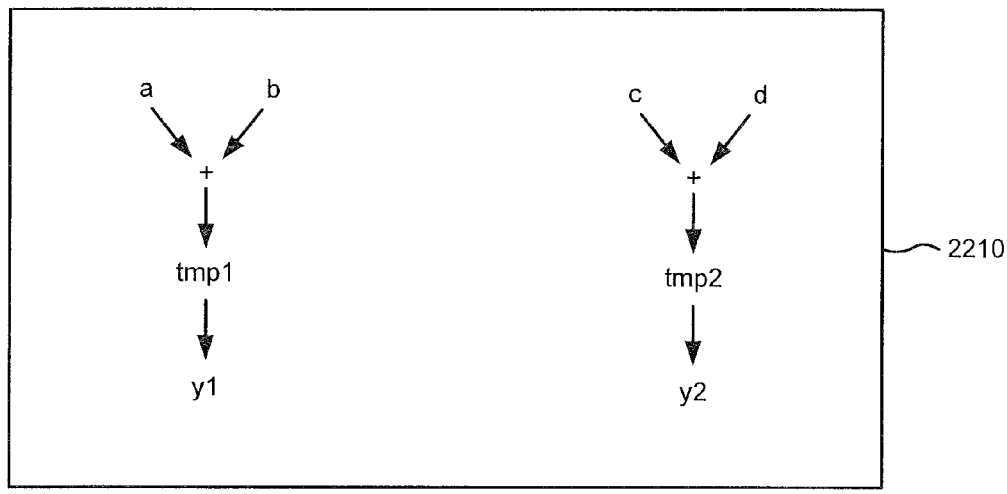
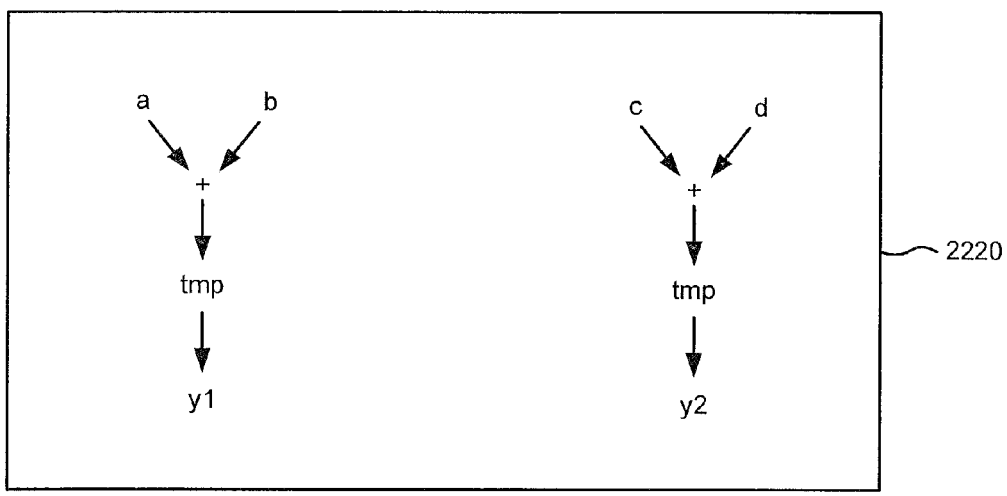
FIG. 22

VERIFICATION OF COMPUTER-EXECUTABLE CODE GENERATED FROM A MODEL

RELATED APPLICATIONS

This application is a continuation of U.S. patent application Ser. No. 13/250,590, filed Sep. 30, 2011, which claims priority to and the benefit of U.S. Provisional Patent Application No. 61/494,274, titled "VERIFICATION OF COMPUTER EXECUTABLE CODE GENERATED FROM A MODEL", which was filed on Jun. 7, 2011 and U.S. Provisional Patent Application No. 61/509,371, titled "VERIFICATION OF COMPUTER-EXECUTABLE CODE GENERATED FROM A MODEL", which was filed on Jul. 19, 2011. Also this Application is a continuation-in-part of U.S. patent application Ser. No. 12/559,233, titled "VERIFICATION OF COMPUTER-EXECUTABLE CODE GENERATED FROM A MODEL", which was filed on Sep. 14, 2009 and which claims the benefit of U.S. Provisional Patent Application No. 61/103,167, titled "MODEL STYLE GUIDELINE VERIFICATION AND ANNOTATION", which was filed on Oct. 6, 2008, and U.S. Provisional Patent Application No. 61/103,161, titled "VERIFICATION OF COMPUTER READABLE CODE GENERATED FROM A MODEL", which was also filed on Oct. 6, 2008. All of the above-identified applications are hereby incorporated by reference in their entirety as though fully set forth herein.

BRIEF DESCRIPTION OF THE DRAWINGS

The accompanying drawings, which are incorporated in and constitute a part of this specification, illustrate one or more embodiments described herein and, together with the description, explain these embodiments. In the drawings:

FIG. 7 illustrates an example of a model that may be used with an embodiment of the invention;

FIG. 8 illustrates an example of code that is marked up in accordance with an embodiment of the invention;

FIG. 9 illustrates an example of code that is marked up to indicate code that has been verified and code that has not been verified;

FIG. 10 illustrates examples of steering tables that they may be used to determine one or more code components for model element verification;

FIG. 19A-E illustrate an example of a model that is sliced in accordance with an embodiment of the invention;

FIG. 22 illustrates IRs that may be generated from the code illustrated in FIG. 21 and/or the model illustrated in FIG. 20;

DETAILED DESCRIPTION

Figure 1:
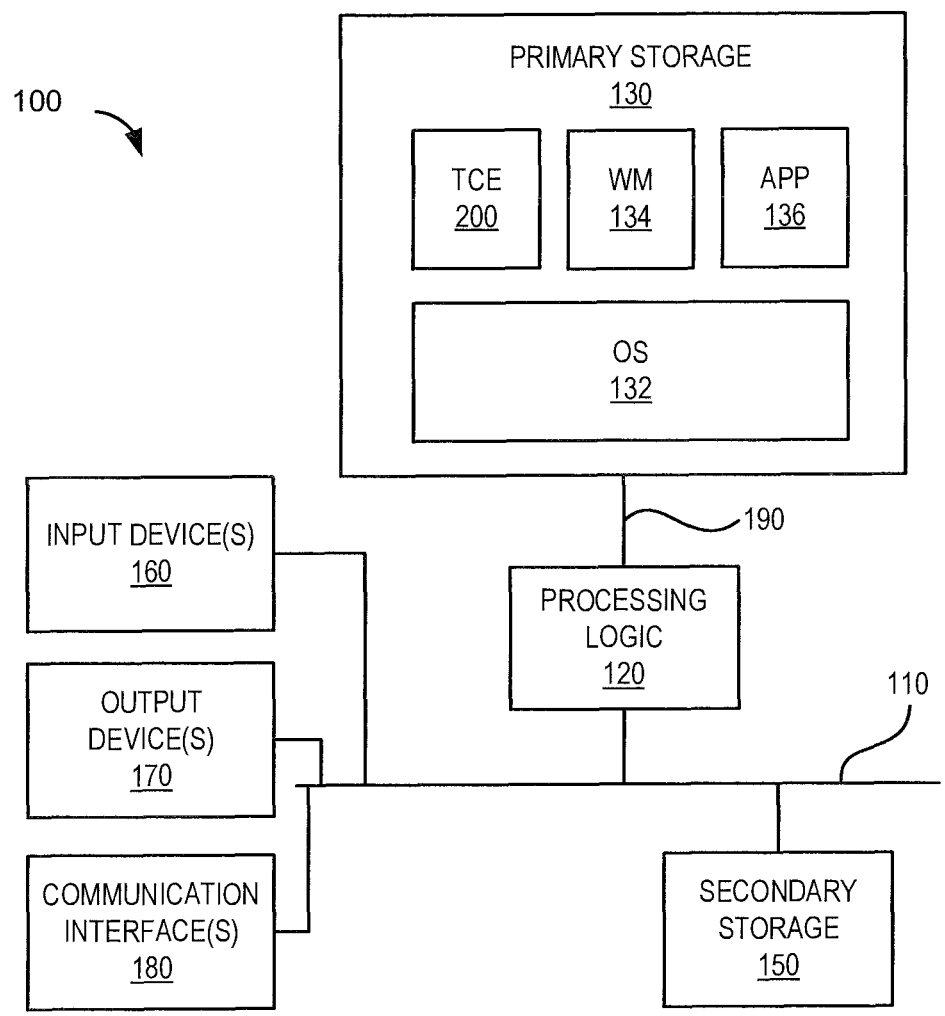
FIG. 1 illustrates a block diagram of an example of a computing device that may implement one or more embodiments of the invention.

The following detailed description refers to the accompanying drawings. The same reference numbers in different drawings may identify the same or similar features illustrated in the drawings. Also, the following detailed description does not limit the invention.

Code generated from a model may need to be verified to ensure, for example, that the code properly represents the model and does not introduce unintended side-effects. The code may be generated by a code generator and verified by a code verifier. Different verification objectives may be of interest depending on a specific verification task at hand. Code verification may be important to safety critical software systems. Moreover, code verification may be required by various government, industry or company-wide standards, and/or may be useful for testing or implementing a system using the generated code.

Code verification may focus, for example, on analyzing data dependencies without verifying aspects related to execution times. Moreover, code verification may emphasize verifying algorithmic parts (e.g., operands, operators) of the code instead of verifying data types of operands used by the code. Here, for example, the algorithmic parts of a fixed-point algorithm may be verified even if chosen fixed-point scalings may not be verified.

Verifying generated code by hand may be a costly and time-consuming process. As the complexity of models grow, complexity of verifying code generated for the models may grow. In addition to an automation of the verification, it may be desirable to do an additional limited manual review. In some instances, automating a full verification of code may not be possible. Here, the code may be partially verified automatically and partially verified manually. Regardless, providing at least a partial verification of the code automatically may still be useful and may involve less effort than if the code were to be completely verified manually.

A code verifier may be used to automatically verify that code generated from a model represents functionality of the model. The code verifier may receive a model, which may be in an intermediate representation (IR) form, and the generated code, which may also be in an IR form. The code verifier may create further IRs of the model and/or the generated code to compare functionality and/or other verification objectives presented in the received model and generated code.

The code verifier may create an element connectivity list (ECL) for the model. An ECL may be an example of an IR that may be created by the verifier. The ECL may represent elements of the model (model elements), such as, for example blocks, and connections between the elements. The model, from which the ECL may be created, may be, for example, a graphical model, a textual representation of a graphical model, and/or a textual model.

The model may comprise graphical aspects (e.g., graphical blocks) and textual aspects (e.g., blocks defined textually). The model may be, for example, a time-based model, an event based model, or another type of model. A time-based model may be a model where state transitions in the model depend on time. A time-based model may include model elements that are represented by entities in an ECL for the model. An event-based model may be a model whose execution is event driven. An example of an event-based model may be a state chart (e.g., a Simulink® statechart). States may constitute model elements in an event-based model and may be represented by entities in an ECL for the model.

The code verifier may also receive or create an internal representation of the generated code. Such internal representation may be, for example, an abstract syntax tree (AST). The AST may be an IR that may represent statements, data, data flow, and control flow within the generated code.

To verify the generated code, the code verifier may locate code components in an AST that correspond to entities in an ECL and note the correspondence or lack thereof. The code verifier may also generate a report of verification details and verification failures, if any. A verification failure may be signified, for example, by one or more AST components that are not identified as corresponding to one or more ECL elements and/or by one or more ECL elements for which certain corresponding AST components have not been found.

The code verifier may create or receive one or more program dependency graphs (PDGs) including a PDG for the model (PDG_M). PDGs are also examples of IRs. The PDG_M may represent model elements and data and control relationships associated with the model. The PDG_M may be created from, for example, the model, a graphical representation of the model (e.g., a block diagram), and/or a textual representation of the model. The model may include both graphical and textual features. The model may be a time-based model, an event based model, or other type of model. The model may contain blocks, which may be considered model elements of the model. The blocks may be represented by entities in a PDG_M. Moreover, a model may be event driven and contain states, which may be considered model elements of the model. The states may be represented by entities in a PDG_M.

Code may be generated from the model. The code verifier may create or receive a graph that may be generated from the code. The graph may be a PDG for the code (PDG_C). The PDG_C may represent elements of the code, such as statements and data, and data and control relationships in the code.

To verify the generated code, the code verifier may (1) locate code components in a PDG_M for the model that correspond to entities in a PDG_C for the generated code and (2) identify a correspondence or lack thereof between the code components and the entities. The verification tool may also transform the PDG_M, the PDG_C, or both into a normal form before attempting to identify the correspondence. The code verifier may also generate a report of verification details and verification failures, if any. To support partial verification, the report may also identify model or code elements that were outside of the scope of the actual verification.

The code verifier may slice an IR to identify parts of an IR that may be, for example, verified independently of each other. The code verifier may attempt to verify the different slices sequentially or in parallel. A report, which may be generated by the code verifier, may include information about the slices. To support partial verification, the report may also include verification results for different slices separately. As an example, the code verifier may create one or more slices for a model output that contain those model elements contributing to the output.

The code verifier may provide information to a user that indicates changes may be made to the model to improve slicing.

Elements of an IR, generated from a model or generated code, may also be tagged with type information to identify elements of the model or generated code that may be relevant with respect to a given verification objective.

In a code generation stage of the code, optimization of the generated code may be desirable. Optimization may remove some elements of the model. In addition, a single statement of the generated code may represent functionality from multiple model elements. To provide meaningful verification of the generated code, the code verifier may use information regarding kinds of optimizations or transformations that may take place during code generation.

The code verifier may support a restricted subset of possible model elements and/or a restricted subset of connections. The restricted subset may be determined based on model elements that may generate allowable patterns in the generated code and/or based on various code verification considerations.

A received model may be checked for compliance with the restricted subset of possible model elements before, during, or after generating the ECL or PDG_M. The code verifier may report violations within the model when, for example, one or more elements in the model are not supported by the code verifier or are outside a particular restricted subset within which the code verifier may operate. Verification may be aborted or not started until some or all of the violations are removed. For example, verification may proceed on the subset of the code generated from the portions of the model supported by the code verifier, and the remaining sections of the generated code may remain unverified or left for manual verification. The generated code, the model, or one or more of the IRs may be marked-up in accordance with determinations made by the code verifier.

If the code verifier encounters, for example, an unsupported model element, the code verifier may treat the model element as a black-box and may focus verification on interfaces to the unsupported model element. Other features associated with the model element (e.g., the model element itself, output interfaces associated with the element) may be left for manual verification. Model elements that are partially verified by the code verifier may be marked-up in results provided by the code verifier. For example, the model elements may be noted as conditionally verified model elements in the results. A report containing the results may include information about remaining model elements or objectives left for manual verification and information about tracking a success of steps taken during manual verification.

The code verifier may wrap unsupported model elements into containers (e.g., blocks) with well-defined interfaces to simplify interface verification. The code verifier may attempt to group multiple unsupported model elements into a single container.

Annotations may be provided for unsupported model elements. The annotations may include tokenized information of what code is expected for a particular model element. The verification tool may use this information when verifying the model element in its specific context (for the actual model and code pair) or in future verifications that include the same model element. In addition, annotations may be added to a library to extend a supported subset.

Depending on a corresponding code pattern found for an unsupported model element, the code verifier may suggest a corresponding code pattern for this model element. Instead of annotating the tokenized information from scratch, a user may check the tokenized information suggested by the code verifier for correctness. A compliance checker may interactively or automatically modify the model to replace unsupported model elements or user settings with equivalent model elements or settings that are within a supported subset.

Marking of the generated code, model, and/or IRs may be performed in many different ways. For example, markups may include color visualization that may be used to differentiate sections of code corresponding to different sections of the model. Here, a first color may be used to mark portions of the generated code that correspond to portions of the model that have been verified by the code verifier and are not found to contain errors; a second color may be used to mark errors located by the code verifier; a third color may be used to mark portions of the generated code for which the presence or absence of errors could not be verified; and a fourth color may be used to mark portions of the generated code that correspond to portions of the model that are not supported by the code verifier. Moreover, mark-ups may be shown through text and/or visual clues. In addition, a user may be presented with a user interface for browsing the generated code according to what portions of the model it comes from, and/or according to mark-ups. Portions of a model or code that are upstream or downstream of an unsupported or unverifiable portion of the model or code may be marked with yet another color.

A user may be able to manually review sections of the generated code that are not supported by the code verifier. The user may want to manually verify the sections of the generated code that correspond to sections of the model that fall outside of that predetermined set. Provisions may be provided to assist the user in locating and verifying the sections of the code that have not been verified by the code verifier.

Generated code may refer to code generated from a model or a portion of a model. Moreover, generated code may include code generated from an IR. The generated code may be generated as source code or executable code. The generated code may include statements/instructions written in such languages as FORTRAN, ADA, Python, C, C++, Java, Java bytecodes, Assembly, MATLAB programming language, Structured Text, hypertext markup language (HTML), extensible markup language (XML), hardware description language (HDL), or unified modeling language (UML). Models need not be solely graphical models and may be textual models, and/or a combination of graphical and textual models.

An element of an IR, received or created by the code verifier, may be linked to its corresponding counterpart in the model, the generated code, and/or an IR. This linking may be provided for traceability purposes. The links may be called traceability links. Traceability links may be preserved when the IRs are transformed or modified by the verification tool. Traceability tags may be used to produce code-to-model or model-to-code traceability reports.

The code verifier may provide a mapping between elements of the model and portions of the generated code that have been verified to correspond to those elements. The code verifier may also indicate sections where verification is inconclusive or sections containing verification failures. Mapping between the model and the generated code may be bi-directional. For example, a graphical model may be mapped to generated code and vice-versa. Bi-directional mapping may facilitate graphical identification of portions of the graphical model that correspond to selected segments of the generated code. Bi-directional mapping may also facilitate graphical identification of segments of generated code that correspond to selected portions of a graphical model.

Models may be developed based on a set of requirements that may be contained in one or more machine-readable structures, such as a text file, a spreadsheet, a word processing file, a presentation application file, database, or repository. Such machine-readable structures may be generally referred to as requirement documents for the model. The requirement documents may be subject to version control by a version control system to enable tracking of versions when requirements change. In some instances, the tracing to requirements may be included in the model such that the traces to the requirements for the model and the design (i.e., the model) are in the same location. The requirements may be traced to the graphical model and/or generated code to facilitate identification of requirements that trace to graphical affordances in a model and/or segments in generated code.

Generated code may be generated in a programming language, such as Sequential Function Chart, Structured Text or another IEC 61131 language, C, C++, SystemC, Java, Javascript, Python, FORTRAN, ADA, an assembly language; a hardware description language (HDL), such as Verilog, VHDL (very high speed integrated circuit hardware description language); a register transfer language (RTL); or some other type of language. Implementations may further generate information about a graphical model using a programming language, alone or in combination with the generated code discussed above. In an example, an XML representation (such as part of, for example, the Autosar standard) may be used to include information and meta-information about the model, such as, which functions should be called and in what order; which task should be called and at what rate; what types input arguments have; or other information.

During the code generation process, one or more IRs may be generated. An IR may be in the form of a data structure that is stored in memory, a file, a database, or any other acceptable storage medium. The IR may be constructed from input data contained within a source language (e.g., a language used by a graphical model) and from which part or all of the target language information (e.g., generated code) is constructed. One example of an IR that may be used with is a control flow graph (CFG). An IR may have meta tags to identify where content of the IR is derived from. A meta tag may associate the content of the IR with content that is used to generate the IR. The content of an IR may be derived from, for example, elements in a model, optimization rules, and/or model configuration options.

One or more embodiments of the invention may be implemented on one or more computing devices. The one or more computing devices may be a system or part of a system. The one or more computing devices may include, for example, a desktop computer, laptop computer, client computer, server computer, mainframe computer, personal digital assistant (PDA), netbook computer, tablet computer, web-enabled cellular telephone, smart phone, or some other computing device.

FIG. 1 illustrates an example of a computing device 100 that may implement one or more embodiments of the invention. Referring to FIG. 1, the computing device 100 may include one or more components, such as processing logic 120, primary storage 130, secondary storage 150, one or more input devices 160, one or more output devices 170, and one or more communication interfaces 180, that may be connected together by one or more buses, such as input-output (I/O) bus 110 and memory bus 190. Note that computing device 100 is an example of a computing device that may implement one or more embodiments of the invention. Other computing devices that may implement one or more embodiments of the invention may be less complicated or more complicated than computing device 100.

The I/O bus 110 may be an interconnect bus that may enable communication between various components in the computing device 100, such as processing logic 120, secondary storage 150, input devices 160, output devices 170, and communication interfaces 180. The communication may include, among other things, transferring information (e.g., data, control information, executable instructions) between the components.

The memory bus 190 may be an interconnect bus that may enable information to be transferred between the processing logic 120 and the primary storage 130. The information may include instructions and/or data that may be executed, manipulated, and/or otherwise processed by processing logic 120. The instructions and/or data may include instructions and/or data that may implement one or more embodiments of the invention.

Processing logic 120 may include logic that may interpret, execute, and/or otherwise process information contained in, for example, the primary storage 130 and/or secondary storage 150. The information may include computer-executable instructions and/or data that may implement one or more embodiments of the invention. Processing logic 120 may comprise a variety of hardware. The hardware may include, for example, some combination of one or more processors, microprocessors, field programmable gate arrays (FPGAs), application specific instruction set processors (ASIPs), application specific integrated circuits (ASICs), complex programmable logic devices (CPLDs), graphics processing units (GPUs), or other types of processing logic that may interpret, execute, manipulate, and/or otherwise process the information. Processing logic 120 may comprise a single core or multiple cores. Moreover, processing logic 120 may comprise a system-on-chip (SoC) or system-in-package (SiP). An example of a processor that may be used to implement processing logic 120 is the Intel® Xeon® processor available from Intel Corporation, Santa Clara, Calif.

The secondary storage 150 may provide a storage (e.g., a persistent storage) that is accessible to the processing logic 120 via I/O bus 110. The secondary storage 150 may store information for the processing logic 120. The information may be executed, interpreted, manipulated, and/or otherwise processed by the processing logic 120. The secondary storage 150 may comprise, for example, a storage device, such as a magnetic disk, optical disk (e.g., CD-ROM, DVD player), random-access memory (RAM) disk, tape unit, and/or flash drive. The information may be stored on one or more non-transient tangible computer-readable media contained in the storage device. This media may include, for example, magnetic discs, optical discs, magnetic tape, and/ or memory devices (e.g., flash memory devices, static RAM (SRAM) devices, dynamic RAM (DRAM) devices, or other memory devices). The information may include data and/or computer-executable instructions that may implement one or more embodiments of the invention. The information may be stored in various storage entities contained in the secondary storage 150. These storage entities may include, for example, files, databases, records, tables (e.g., contained in one or more databases), or other storage entities.

Input devices 160 may include one or more devices that may be used to input information into computing device 100. Examples of devices that may be used to input information into computing device 100 may include a keyboard (e.g., hardware keyboard, software keyboard), computer mouse, microphone, camera, trackball, gyroscopic device (e.g., gyroscope), mini-mouse, touch pad, stylus, graphics tablet, touch screen, joystick (isotonic or isometric), pointing stick, accelerometer, palm mouse, foot mouse, eyeball controlled device, finger mouse, light pen, light gun, neural device, eye tracking device, gesture tracking device, steering wheel, yoke, jog dial, space ball, directional pad, dance pad, soap mouse, haptic device, tactile device, neural device, multipoint input device, discrete pointing device, or some other input device. The information may include spatial (e.g., continuous, multi-dimensional) data that may be input into computing device 100, for example, using a device such as a computer mouse. The information may also include other forms of data, such as, for example, text that may be input using a keyboard.

Output devices 170 may include one or more devices that may output information from the computing device 100. Examples of devices that may output information from the computing device 100 may include a cathode ray tube (CRT), plasma display device, light-emitting diode (LED) display device, liquid crystal display (LCD) device, vacuum florescent display (VFD) device, surface-conduction electron-emitter display (SED) device, field emission display (FED) device, haptic device, tactile device, neural stimulation device, printer (e.g., a three-dimensional (3D) printer, laser printer), speaker, video projector, volumetric display device, plotter, actuator (e.g., electrical motor) or some other output device.

Output devices 170 may be directed by, for example, the processing logic 120, to output the information from the computing device 100. The information may be presented (e.g., displayed, printed) by output devices 170. The information may include, for example, graphical user interface (GUI) elements (e.g., windows, widgets, dialog boxes, or other GUI elements), graphical representations, pictures, text, or other information that may be presented by output devices 170. Note that the information may be presented on output devices 170 in a stereoscopic view to enable, for example, a perception of depth.

Communication interfaces 180 may include one or more devices that contain logic that may (1) interface the computing device 100 with, for example, one or more communication networks and (2) enable the computing device 100 to communicate with one or more devices connected to the communication networks. An example of a communication network that may be used with computing device 100 will be described further below with respect to FIG. 42.

Communication interfaces 180 may include one or more transceiver-like mechanisms that enable the computing device 100 to communicate with devices connected to the communication networks. Communication interfaces 180 may include a built-in network adapter, network interface card (NIC), Personal Computer Memory Card International Association (PCMCIA) network card, card bus network adapter, wireless network adapter, Universal Serial Bus (USB) network adapter, modem, or other device suitable for interfacing the computing device 100 to the communication networks.

The primary storage 130 may provide a storage that is accessible to the processing logic 120 via bus 190. The primary storage 130 may be a non-transient tangible computer-readable media that may store information for processing logic 120.

The information may include computer-executable instructions and/or data that may implement operating system (OS) 132, windows manager (WM) 134, an application 136 (APP), and a technical computing environment (TCE) 200. The instructions may be executed, interpreted, and/or otherwise processed by processing logic 120. The information may be stored in various storage entities contained in the primary storage 130. These entities may include, for example, files, databases, tables (e.g., contained in databases), or other storage entities.

The primary storage 130 may comprise a RAM that may include RAM devices that may store the information. The RAM devices may be volatile or non-volatile and may include, for example, one or more DRAM devices, flash memory devices, SRAM devices, zero-capacitor RAM (ZRAM) devices, twin transistor RAM (TTRAM) devices, read-only memory (ROM) devices, ferroelectric RAM (Fe-RAM) devices, magneto-resistive RAM (MRAM) devices, phase change memory RAM (PRAM) devices, or other types of RAM devices.

OS 132 may be a conventional operating system that may implement various conventional operating system functions. These functions may include, for example, scheduling one or more portions of APP 136 and/or TCE 200 to run on the processing logic 120, managing the primary storage 130, controlling access to various components associated with the computing device 100 (e.g., secondary storage 150, input devices 160, output devices 170, communication interfaces 180), and controlling access to data received and/or transmitted by these components.

Examples of operating systems that may be used to implement OS 132 include, but are not limited to, the Linux operating system, Microsoft Windows operating system, the Symbian operating system, Mac OS, Chrome OS, and the Android operating system. A version of the Linux operating system that may be used is Red Hat Linux available from Red Hat Corporation, Raleigh, N.C. Versions of the Microsoft Windows operating system that may be used include Microsoft Windows 7, Microsoft Windows Vista, Microsoft Windows Phone, and Microsoft Windows XP operating systems available from Microsoft Inc., Redmond, Wash. The Chrome OS and Android operating systems are available from Google, Inc., Mountain View, Calif. The Mac OS operating system is available from Apple Inc., Cupertino, Calif. The Symbian operating system is available from the Symbian Foundation, London, United Kingdom.

WM 134 may be a conventional window manager that may manage GUI elements, such as widgets, dialog boxes, and windows, that may be part of the OS 132, TCE 200, and APP 136. The GUI elements may be displayed on an output device 170. The WM 134 may also be configured to (1) capture one or more positions of interactions with an input device 160 and/or other data associated with the input device 160, and (2) provide the positions and/or data to, for example, OS 132, APP 136, and/or TCE 200. The positions and/or data may be provided in messages that are sent to the OS 132, APP 136, and/or TCE 200. Examples of window managers that may be used to implement WM 134 may include, but are not limited to, X windows, GNOME, Unity, Compiz, and KDE, which are often used with the Linux operating system, and window managers used with the Microsoft Windows XP, Microsoft Windows Vista, Microsoft Windows Phone, and Microsoft Windows 7 operating systems. It should be noted that other window managers or components that implement various functions associated with window managers may be used to implement WM 134.

APP 136 may be designed to perform a particular task or tasks. APP 136 may be an executable and/or interpretable version of a software application that may be written in a programming language, such as, for example, C, C++, Java, the MATLAB® language, or some other programming language. Some or all of APP 136 may be written by a user of computing device 100, supplied by a vendor, or generated by TCE 200. Some or all of APP 136 may operate under the control of OS 132. APP 136 may include computer-executable instructions and/or data that may implement one or more embodiments of the invention.

TCE 200 may be a modeling environment, such as a graphical modeling environment or textual modeling environment. Some or all of TCE 200 may operate under the control of OS 132. TCE 200 may include computer-executable instructions and/or data that may implement one or more embodiments of the invention.

Figure 2:
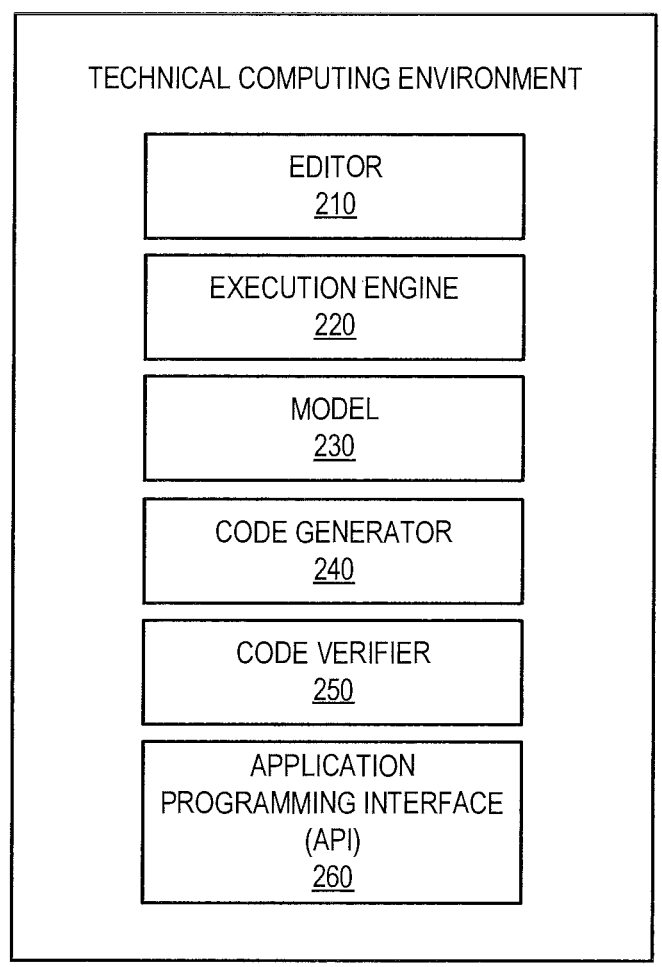
FIG. 2 illustrates a block diagram of an example of a technical computing environment (TCE) that may implement one or more embodiments of the invention.

FIG. 2 illustrates an example embodiment of TCE 200. Referring to FIG. 2, TCE 200 may comprise various components including editor 210, execution engine 220, model 230, code generator 240, code verifier 250, and an application programming interface (API) 260. TCE 200 may be used to construct, compile, verify, execute, and/or interpret model 230.

The TCE 200 may include hardware logic, software, or some combination of hardware logic and software that may provide a computing environment that allows, for example, a user to perform tasks related to disciplines, such as, but not limited to, mathematics, science, engineering, medicine, business, biology, and/or finance. The TCE 200 may include a dynamically-typed programming language (e.g., the MATLAB® language) that can be used to express problems and/or solutions in mathematical notations.

For example, the TCE 200 may use an array as a basic element, where the array may not require dimensioning. The array may be used to support array-based programming where an operation can apply to an entire set of values included in the array. Array-based programming may allow array-based operations to be treated as a high-level programming technique that may allow, for example, operations to be performed on whole aggregations of data without having to resort to explicit loops of individual non-array operations.

The TCE 200 may include a dynamically-typed programming language (e.g., the MATLAB® language), where a data type of data may be determined at runtime. The dynamically-typed programming language may use an array as a basic data element where the array may not require dimensioning. The array may be used to support array-based programming where an operation may apply to a set of values included in the array. Array-based programming may allow array-based operations to be treated as a high-level programming technique that may allow, for example, operations to be performed on aggregations of data without having to resort to explicit loops of individual non-array operations.

In addition, the TCE 200 may perform matrix and/or vector formulations that may be used for data analysis, data visualization, application development, simulation, modeling, and/or algorithm development. These matrix and/or vector formulations may be used in many areas, such as statistics, image processing, signal processing, control design, life sciences modeling, discrete event analysis and/or design, state-based analysis and/or design, and so on.

The TCE 200 may further provide mathematical functions and/or graphical tools or blocks (e.g., for creating plots, surfaces, images, volumetric representations, or other representations). The TCE 200 may provide these functions and/or tools using toolboxes (e.g., toolboxes for signal processing, image processing, data plotting, and/or parallel processing). In addition, the TCE 200 may provide these functions as block sets. The TCE 200 may also provide these functions in other ways, such as via a library, local or remote database, and so on.

The TCE 200 may include provisions for creating, compiling, executing, and/or interpreting models, such as model 230. A model may be graphical and may be executable (e.g., an executable block diagram model). TCE 200 may contain computer-executable instructions and data that perform various tasks. The tasks may include, for example, (1) constructing model 230 through an interface, such as a GUI; (2) allowing an augmentation of a pre-defined set of blocks with custom user-specified blocks that may be associated with model 230; (3) using model 230 to compute and trace an evolution, such as a temporal evolution, of outputs associated with a dynamic system represented by the model 230; and (4) automatically producing, for example, deployable software systems, and descriptions of hardware systems that mimic a behavior of either the entire model 230 or portions of the model 230. The blocks may be represented in a graphical representation (e.g., a block diagram) of the model 230. The graphical representation may be presented by the TCE 200 to, for example, a user via an interface, such as a GUI.

Examples of TCEs that may be adapted to incorporate one or more embodiments of the invention may include, but are not limited to, MATLAB®, Simulink®, Stateflow®, and SimEvents®, which are available from The MathWorks, Inc.; Unified Modeling Language (UML); profiles associated with UML (e.g., Modeling Analysis and Real-Time Embedded Systems (MARTE), Systems Modeling Language (SysML), Avionics Architecture Description Language (AADL)); GNU Octave from the GNU Project; MATRIXx and LabView® from National Instruments; Mathematica from Wolfram Research, Inc.; Mathcad from Mathsoft Engineering & Education Inc.; Maple from Maplesoft; Extend from Imagine That, Inc.; Scilab and Scicos from The French Institution for Research in Computer Science and Control (INRIA); Modelica or Dymola from Dynasim AB; VisSim from Visual Solutions; SoftWIRE from Measurement Computing Corporation; WiT from DALSA Coreco; Advanced Design System, VEE Pro and SystemVue from Agilent Technologies, Inc.; Vision Program Manager from PPT Vision, Inc.; Khoros from Khoral Research, Inc.; VisiQuest from Pegasus Imaging Corporation; Gedae from Gedae, Inc.; Virtuoso from Cadence Design Systems, Inc.; Rational Rose, Rhapsody, and Tau from International Business Machines (IBM), Inc.; SCADE from Esterel Technologies; and Ptolemy from the University of California at Berkeley.

Editor 210 may be a block diagram editor that may allow, for example, a user, to construct model 230. Constructing model 230 may include, for example, specifying, editing, annotating, saving, publishing, and printing a block diagram of model 230. The editor 210 may contain provisions for editing code (e.g., source code), requirements, and/or tests that may be associated with model 230.

The execution engine 220 may enable a computation and/or tracing of a dynamic system's outputs from the model 230. The execution engine 220 may carry out the task of compiling and linking the model 230 to produce an "in-memory executable" version of model 230 that may be used for simulating, verifying, generating code, trimming, or linearizing the model 230.

The execution engine 220 may receive and execute the model 230. The execution engine 220 may generate data from the execution of the model 230. The data may be presented (e.g., displayed to a user) in a textual or graphical form. The TCE 200 may use a centralized data viewer to view the data generated by the execution engine 220.

The execution engine 220 may use numerical integration methods to compute behavior for differential equation as well as difference equation models. These numerical integration methods may be explicit and/or implicit as well as fixed step or variable step. The execution engine 220 may use a zero-crossing detection and location mechanism to identify and locate times at which events occur, such as a modeled collision between two rigid bodies. The execution engine 220 may handle difference equations by pre-computing a static schedule of times for when various values may change. This static schedule may employ a base rate that may be a greatest common denominator of all sample times that are scheduled for execution by the execution engine 220. The execution engine 220 may handle discrete event systems based on a base rate or by using a dynamical scheduling mechanism, such as an event calendar. The execution engine 220 may employ a combination and/or permutation of these features.

Model 230 may be, for example, a time-based graphical block diagram model, a state transition diagram, a discrete event model, an activity diagram, a UML diagram, a sequence diagram, a data flow model, a structural model (e.g., a software architecture model), an electronics hardware model, a network architecture model, a mechanical structure model, or some other type of model or diagram. Model 230 may represent a system. Model 230 may be graphical, textual, or some combination of graphical and textual. The system represented by model 230 may be dynamic, linear, non-linear, or some other type of system.

A dynamic system (either natural or man-made) may be a system whose response at any given time may be a function of its input stimuli, its current state, and a current time. Such systems may range from simple to highly complex systems. Natural dynamic systems may include, for example, a falling body, the rotation of the earth, bio-mechanical systems (muscles, joints, etc.), bio-chemical systems (gene expression, protein pathways), weather, and climate pattern systems. Examples of man-made or engineered dynamic systems may include, for example, a bouncing ball, a spring with a mass tied on an end, automobiles, airplanes, control systems in major appliances, communication networks, audio signal processing, nuclear reactors, and a stock market.

The system represented by model 230 may have various execution semantics that may be represented in model 230 as a collection of modeling elements, such as blocks. A modeling element may generally refer to a portion of functionality that may be used in the model 230. The modeling element may be graphically represented, however, it can be appreciated that the modeling element does not necessarily need to be represented graphically. For example, a modeling element may be represented textually or stored in some form of internal representation. Also, a particular visual depiction used to represent the modeling element, for example in a graphical block diagram, may generally be an arbitrary design choice.

A modeling element may be hierarchical in that the block itself may comprise one or more modeling elements that make up the modeling element. A modeling element comprising one or more modeling elements (e.g., sub-blocks) may be referred to as a subsystem block. A subsystem block may be configured to represent a subsystem of the overall system represented by the model.

A modeling element may represent for example continuous and/or discrete dynamic aspects of a system, such as, for example, integration, unit delay, algorithms (e.g., sum, product or lookup tables), and/or structural aspects (e.g., multiplexers, switches, signal or bus selectors). A modeling element may also represent one or more states and the block may include a state diagram model.

The code generator 240 may generate code, such as, for example, source code, object code, a compiled executable, or a library, for forming an executable representation of the model 230. The code generator 240 may also be used to generate a hardware description language (HDL) or a register transfer language (RTL) representation of the model 230. The generated code may be stored in multiple files. For example, part of the generated code may be stored in a header file, while another part of generated code may be stored in a source file. To generate code, the code generator 240 may convert a source model language representation of the model 230 to a target language representation.

During the code generation process, the code generator 240 may generate one or more IRs prior to generating code from the model 240. The IR may be a CFG that may capture one or more semantics of model 230. An IR represented by a CFG may include nodes that may represent algorithmic aspects of the model 230 and edges that may indicate a flow (e.g., data flow, control flow) of algorithmic aspects represented by the nodes.

The code generator 240 may generate code for an execution of the model 230. The code generator 240 may also compile generated code into object code and build an executable program, library, or other forms of executable instructions. The generated code may be designed to be executed by, for example, a processor, microprocessor, dual-core processor, multi-core processor, cluster of processors, digital signal processor (DSP), programmable logic device (PLD), system on chip (SOC), System in Package (SiP), reconfigurable signal conditioning hardware, operating system, computational hardware device, component of a computational hardware device, or other processing logic.

Code generated by code generator 240 may be deployed on various target hardware. This target hardware may include, for example, field programmable gate arrays (FPGAs), programmable logic arrays (PLAs), application specific integrated circuits (ASICs), and application specific integrated processors (ASIPs).

The generated code may include embedded code targeted to run on an embedded system. For example, generated code may be implemented as firmware in an electronic system that uses a microprocessor or a microcontroller. Additionally, the code generator 240 may be configured to customize the generated code based on target hardware that may execute the generated code. For example, generated code may include fixed-point code to run a fixed-point processor or generated code may emulate fixed-point behavior on a floating-point processor.

Optimizations such as, for example, expression folding, function inlining, function outlining, constant propagation, strength reduction, loop unrolling, or other optimization, may be applied to code generated by code generator 240. Expression folding may include reducing multiple expressions to a single expression in generated code. Function inlining may involve replacing replaces a function (e.g., a function, procedure, method) call site with the body of the function. Function outlining may include outlining an inlined function such that when the function is executed, the function may go to a call site that is not part of the body of generated code. Constant propagation may include replacing variables that reference a constant with the constant. Strength reduction may include replacing a computation with an equivalent but less expensive computation in terms of processor cost (such as speed, power usage). Loop unrolling may include making iterations of a loop explicit so a looping construct may be removed.

Code generated by code generator 240 may be verified by code verifier 250. Code verifier 250 may verify, for example, that the code reproduces functionality of model 230 and does not introduce functionality that is not associated with model 230. Code verifier 250 may generate a report. The generated report may be, for example, a document structured with sections corresponding to different blocks of model 230 and indications of whether any verification failures have been detected in sections of model 230 that may contain those blocks, a report detailing use of the temporary variables, a report detailing compliance of the code with the functionality of the model, or other report.

The generated report may use navigable links. For example, the generated report may be in the form of a document in a markup language, such as, for example, the hypertext markup language (HTML). The navigable links may contain information relating to model 230, settings of code generator 240, or other information.

When generating an IR, code, a report, or other entity, TCE 200 may use transformation rules. Transformation rules, for example, may determine how an element in model 230 is represented in the IR or generated code. For example, there may be a transformation rule relating to the element for transforming the element into a section of the IR. Moreover, there may be another transformation rule for transforming the section of the IR into generated code. The transformation rules may exist on a non-transitory computer readable medium and may be contained in a file, database, repository, or some other structure.

TCE 200 may incorporate a graph rewriting system that may be used to implement a transformation rule. The graph rewriting system may use a graph grammar. The graph grammar may use pattern matching for replacing one graph structure with another. Various ways may be used to implement pattern matching. The graph grammar may employ heuristics, which may be used to manage computational complexity. The graph grammar may employ one or more rewriting rules (transformation rules) that may be extended by textual transformation information. The graph rewriting system may implement triple graph grammar or a higher order of graph grammar when generating an IR, code, a report, or other entity. Transformation rules, such as those implemented using triple graph grammar, may allow, for example, mapping between a first entity (e.g., an IR, generated code, a generated report), a second entity that may be generated from the first entity, and information (e.g., transformation rules) used to generate the second entity.

API 260 may provide a programming interface to various functions performed by the TCE 200. The programming interface provided by the API 260 may be used by programs, such as, for example, application programs that may be run outside of TCE 200 or application programs that operate under control of TCE 200, to access these various functions.

Figure 3:
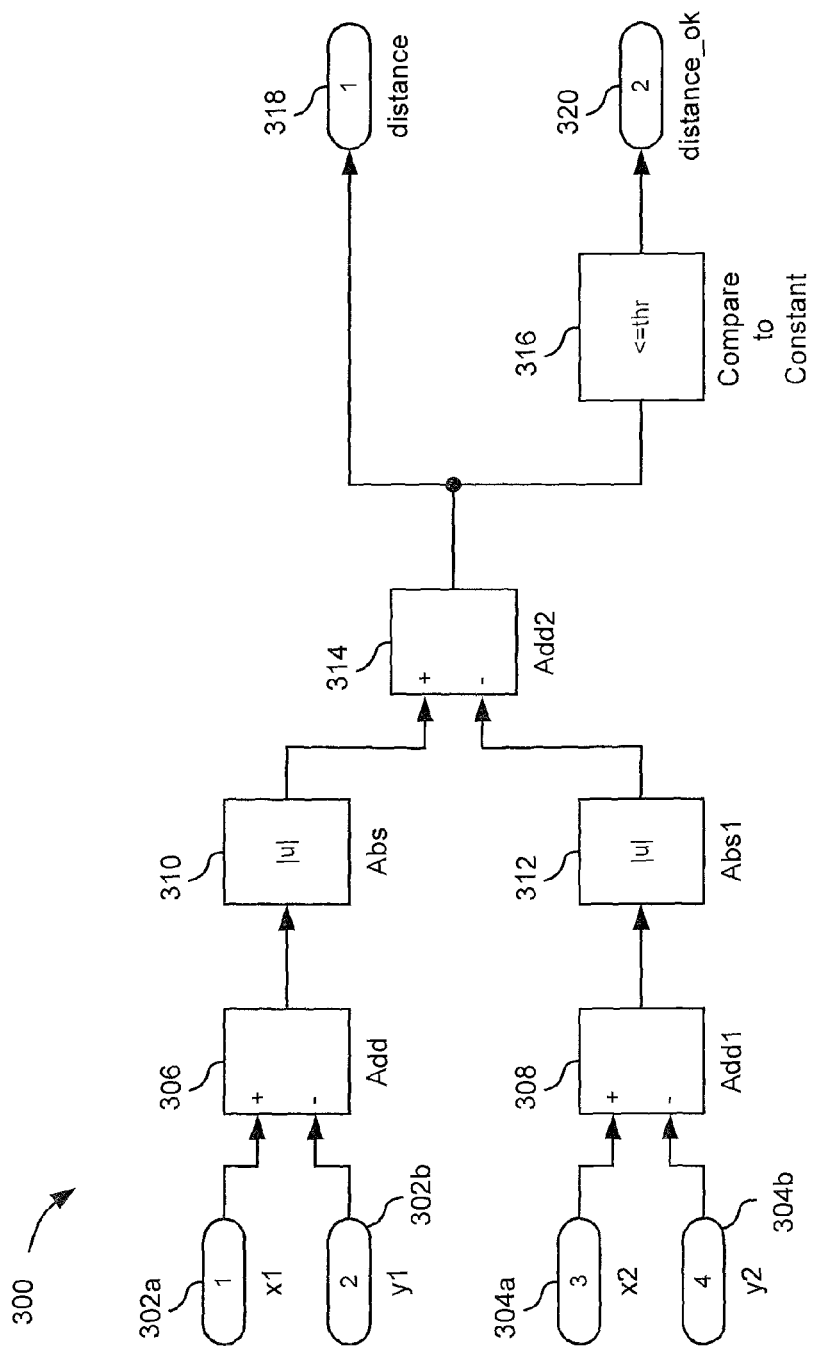
FIG. 3 illustrates a block diagram of an example of a model that may be used with an embodiment of the invention.

FIG. 3 illustrates a block diagram of an example embodiment 300 of model 230 that may be used with an embodiment of the invention. Referring to FIG. 3, embodiment 300 includes four input ports (inports) 302*a-b*, 304*a-b*, which provide signals that are fed into adders 306, 308. The adders 306, 308 add the signals and produce resultant signals. The resultant signals are fed into blocks 310, 312, which determine absolute values of the resultant signals. The absolute values are added together in adder 314 and are outputted at output port (outport) 318, as well as compared to a constant at block 316. The result of the comparison is outputted at outport 320. An external interface presented by this embodiment 300 may include the four inports 302*a-b*, 304*a-b* and two outports 318, 320.

Figure 4:
FIG. 4 illustrates an example of code that may be generated for the model illustrated in FIG. 3.

FIG. 4 illustrates an example of a code segment 400 that may be generated from the embodiment 300 of model 230 illustrated in FIG. 3. Corresponding statements and commands are marked with corresponding numbers to the blocks in the embodiment 300. For example, the code at 408 corresponds to functionality provided by block 308 in the embodiment 300. Likewise, for example, the code at 406, 412, 414, and 416 corresponds to functionality provided by blocks 306, 312, 314, and 316, respectively, in the example embodiment 300.

As can be observed in FIG. 4, there is no statement corresponding to the absolute value block 310. This lack of correspondence may be explained by an optimization operation that may have occurred when the code segment 400 was generated. In embodiment 300, the output of the adder block 306 is an unsigned integer, which is guaranteed to be positive, so no additional operations may be needed to find its absolute value. Code verifier 250 may respond to such optimizations by not treating the lack of the corresponding statement as an error. It should be noted that code shown in FIG. 4 is not the only possible code that could be generated from embodiment 300. There may be many different code variations that still properly reflect the functionality of embodiment 300. As such, code verifier 250, may account for those variations to properly verify code generated from embodiment 300.

Figure 5:
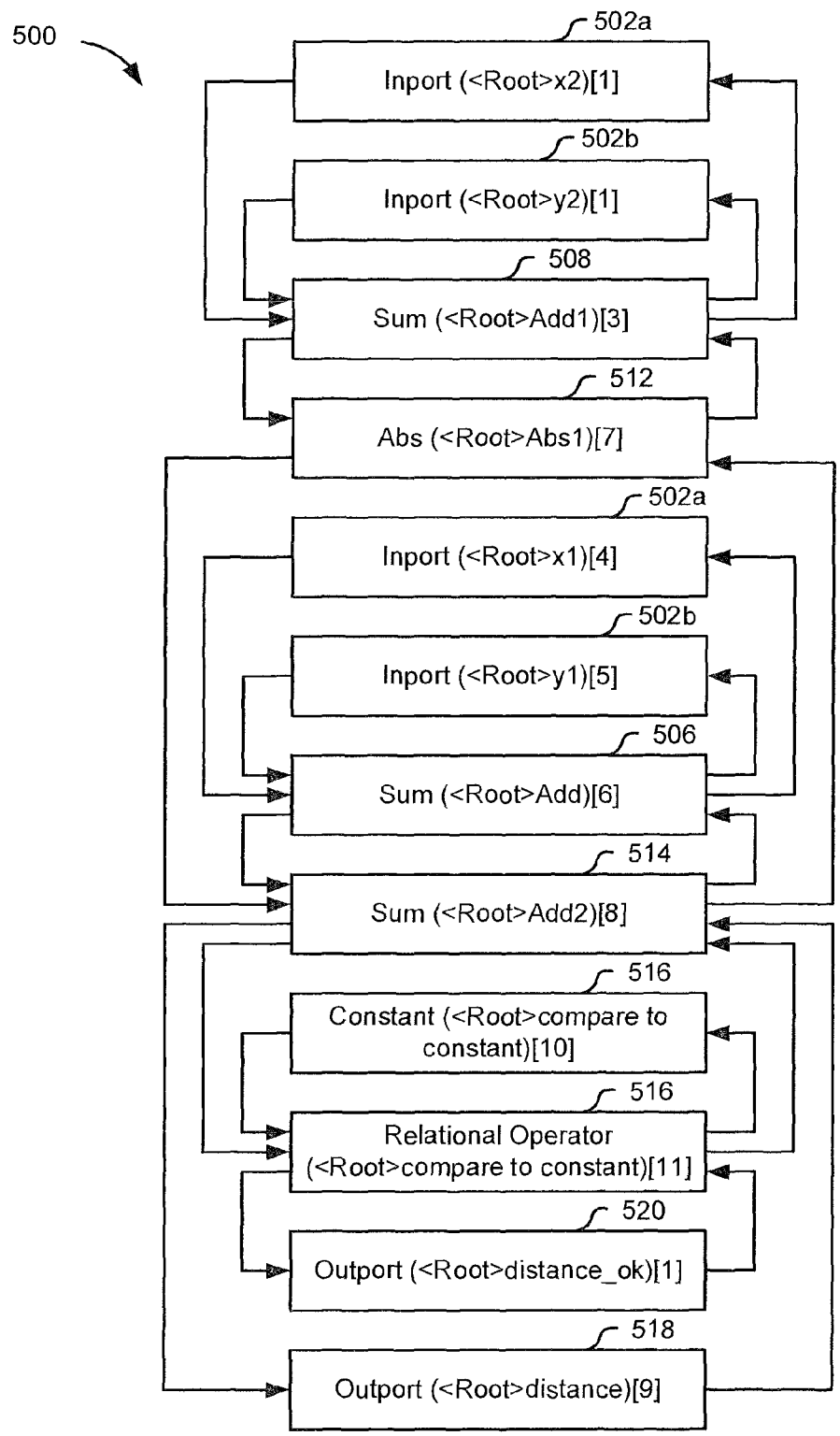
FIG. 5 illustrates an example of an element connectivity list (ECL)
Figure 6:
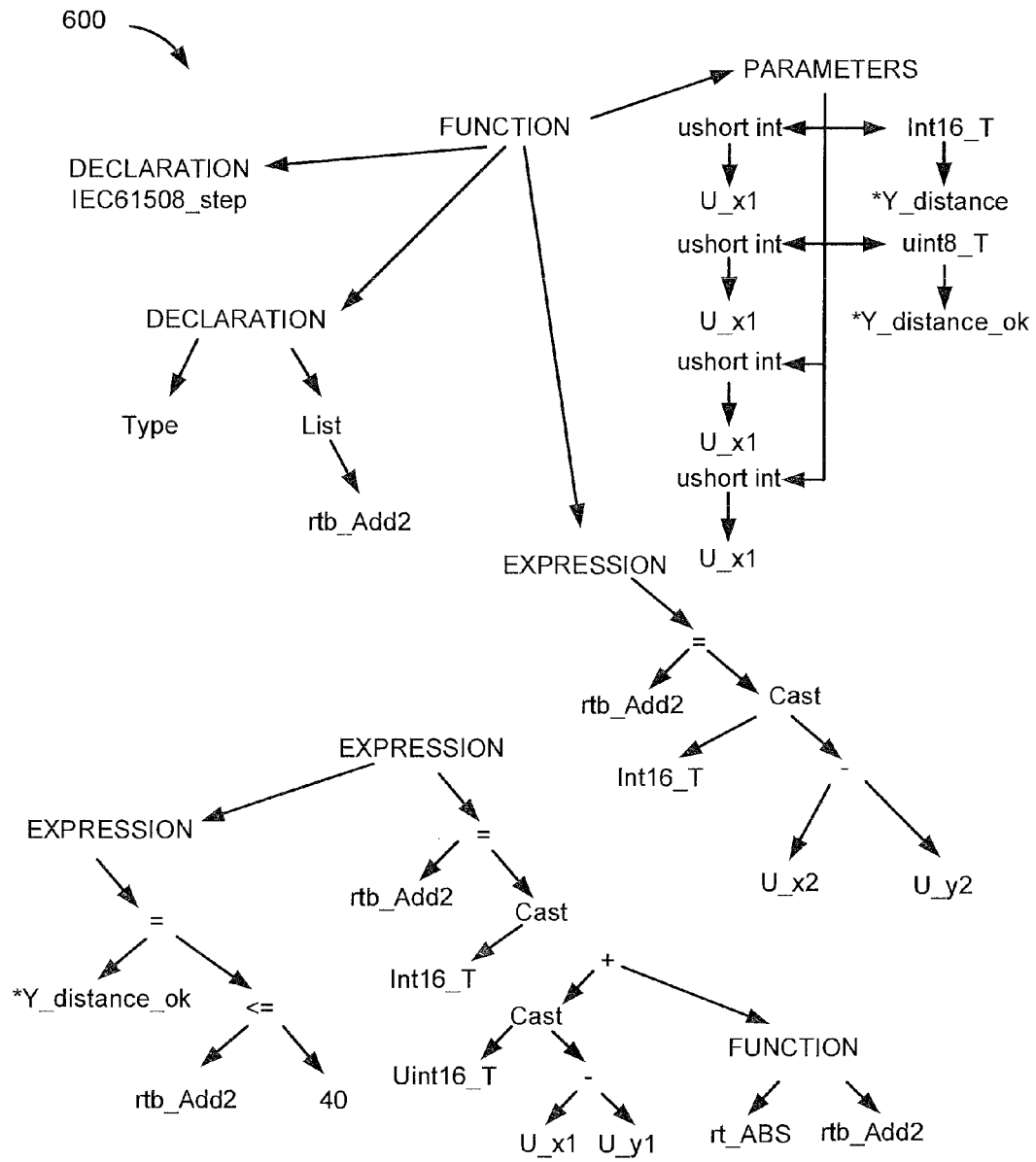
FIG. 6. illustrates an example of an abstract syntax tree (AST)

FIGS. 5 and 6 illustrate an ECL 500 and an AST 600, respectively, for embodiment 300. Note that neither ECL 500 nor AST 600 contains a node for block 310. Again, this may be due to optimization. In ECL 500, nodes 504*a*, 504*b*, 508, 512, 502*a*, 502*b*, 506, 514, 518, 516, 520, and 518, correspond to blocks 304*a*, 304*b*, 308, 312, 302*a*, 302*b*, 306, 314, 318, 316, 320, and 318 in embodiment 300, respectively. ECL 500 is illustrated using the following convention for the arrows: the arrows to the left of the nodes indicate relationships from a source element to a destination element, while the arrows to the right of the nodes indicate relationships from the destination block to the source block. These connections may be useful in navigating the nodes in the ECL 500 to order it, as well as to verify generated code, such as code 400.

FIG. 6 illustrates the AST 600 for the embodiment 300. In AST 600, a node may represent an operator or a control, and its children nodes may represent operands associated with the operator or control. The interface to the embodiment 300 is included in AST 600 in the node titled "PARAMETERS" 610. As shown, the interface includes input variables and output variables, just as it is in the interface to the embodiment 300. Note that there are no unexpected entry points into AST 610.

FIG. 7 illustrates another example embodiment 700 of model 230 and FIG. 8 illustrates corresponding code 800, marked-up in accordance with an embodiment. In code 800, code that has been derived from supported language features (e.g., features supported by code verifier 250) is marked in FIG. 8 with checked checkboxes (802a-c), and code that has been derived from unsupported features (e.g., features not supported by the code verifier 250) is marked with a question mark (804a-b). A user is then able to inspect the code and/or make appropriate mark-ups.

FIG. 9 illustrates another example of code 400 that is marked up in accordance with an embodiment. In this example, the code includes the code segment 400 generated from the embodiment 300. Verified code 902a-c may be marked in a first way (e.g., in the color green) and unverified code 904 may be marked in a second way (e.g., in the color grey). Sections of the code containing errors that may be detected during verification 906 may be marked in a third way (e.g., in the color red).

FIG. 10 illustrates examples of steering tables 1002, 1004. Referring to FIG. 10, the steering tables 1002 and 1004 may be employed in determining code that should correspond to a block in a model. Note that steering tables 1002 and 1004 are one example of steering tables that may be used to make this determination. In FIG. 10, table 1002 may serve to determine a lookup index into a table 1004.

Table 1002 may include an input data type column 1012, an output data type column 1014, a rounding method column 1016, and a saturation on integer overflow column 1018. A column may contain various values. For example, the input data types column 1012 may contain values representing double, float, 32-bit signed integer (int32), 16-bit signed integer (int16), 8-bit signed integer (int8), 32-bit unsigned integer (unsigned32), 16-bit unsigned integer (unsigned16), 8-bit unsigned integer (unsigned8), Boolean, or other data types. It should be noted that the values need not be arranged in the order illustrated in FIG. 10. Similarly, the table may contain values other than the values illustrated in FIG. 10.

The rounding method column 1016 may include values indicating ceiling, simplest, floor, zero, or nearest rounding methods. The saturation on integer overflow column 1018 may include values indicating whether the saturation is required or not. Note that table 1002 may include additional columns and/or values based on which functionality is looked up.

Table 1002 may be used as a lookup table that may provide information associated with various variables that may be contained in code that is generated from a model. For example, a variable contained in code generated for model 230 may be a 32-bit integer type (int32). Using table 1002, a rounding method for the variable (i.e., floor) may be identified knowing the data type of the variable (which in this example is int32).

Steering table 1002 may provide a key into steering table 1004 that may list control values, specifying which transformations, if any, may be needed to make sure that a particular operation in the generated code inputs an appropriate input and outputs an appropriate output. Additional steering tables may be used to determine other details about the generated code that may need to be taken into account when matching portions of a model with portions of the generated code. Note that steering tables similar to the steering tables 1002 and 1004 may be used to match portions of expected code that may be associated with corresponding portions of the model.

Figure 11:
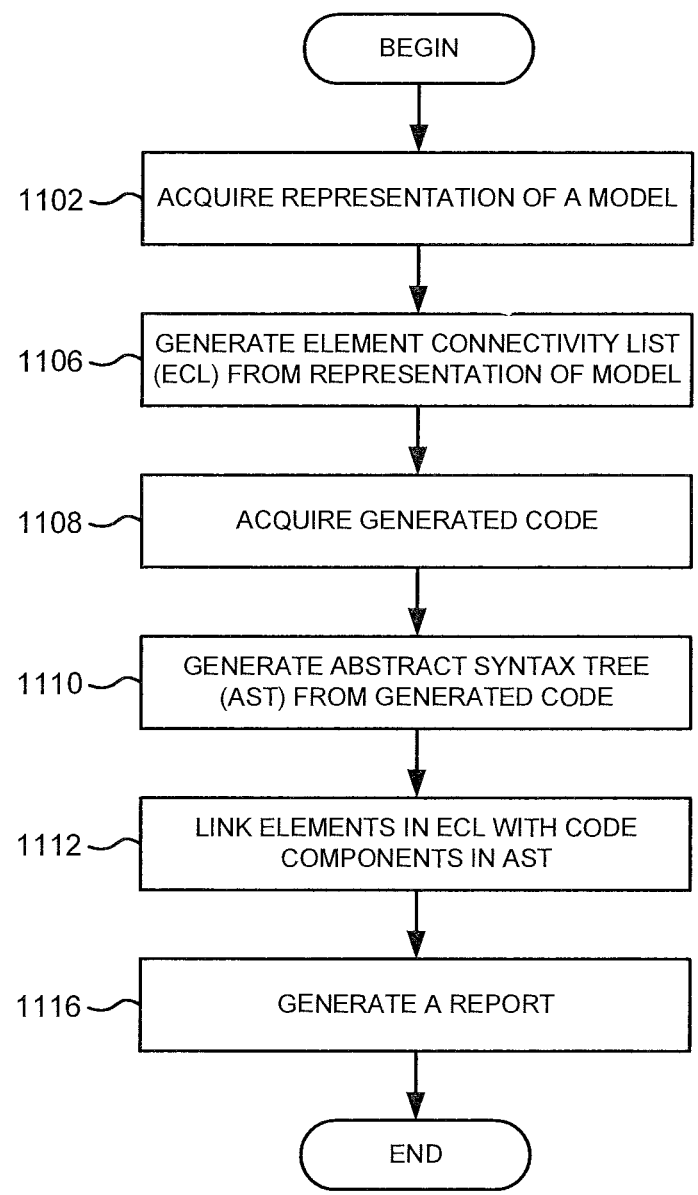
FIG. 11 illustrates a flow diagram of example acts that may be used to verify a correctness of code generated from a model.

FIG. 11 illustrates a flow diagram of example acts that may be used to verify a correctness of code generated from a model, such as model 230. The acts may be performed by a TCE, such as TCE 200. Referring to FIG. 11, at block 1102, a representation of the model is acquired. The representation may be, for example, a textual representation, a graphical representation (e.g., block diagram), and/or an internal representation. Acquiring may involve, for example, reading (e.g., from a file, from a database, from memory), receiving (e.g., over a communications network), or otherwise acquiring.

At block 1106, an ECL is generated from the acquired representation. The ECL may be an internal representation of information of the model that may be contained in the acquired representation. Such information may include, for example, information about one or more elements in the model, information about connectivity of elements in the model, information internal to elements in the model, or other information about the model. Information internal to the elements in the model may include, for example, element names, element types, parameters that may be required by the elements, parameter types, size, data types, vector sizes, types of inputs and/or outputs, or other information about the elements. If the acquired representation includes a block diagram of the model, for example, the ECL may include a list of blocks contained within the model that may provide arithmetic and/or logical actions and/or may have functionality beyond providing, for example, connectivity, grouping, containers, or information for model elements contained within containers.

Some of the information for the ECL may be derived from a compiled version of the model. A compiled model may be a model for which its attributes have been determined, so that an executable representation may be derived. Determining model attributes may involve, for example, inferring sample times, data types, or signal dimensions from the model. The ECL may be generated as described above.

At block 1108, code generated from the model is acquired. The code may be generated by the TCE or may be generated outside of the TCE. Code generation may be initiated by a user in a sequence with code verification, and the generated code may be provided to the TCE upon completion of the code generation or it may be made available incrementally. The generated code may contain artifacts or markers inserted in portions of the generated code. The artifacts or markers may include, for example, links back to the model, an indication of where different code statements are derived from within the model, or other information.

At block 1110, an AST may be created from the generated code. The AST may be a tree representation of the syntax of the generated code, which relates to its functionality. A component of the AST may denote a construct that may occur in the generated code. Note that some constructs that appear in the generated code may not be explicitly represented in the AST. For instance, the AST may exclude some grouping parenthesis of the source code, and in the AST the grouping of the operands may be implicit in the tree structure. The AST may be built by a parser part of a verifier, such as code verifier 250, an external parser tool, or otherwise built. Semantic analysis information may be included in the AST. For example, the AST may include a file location for the generated code and a list of temporary variables declared within the generated code source file.

At block 1112, elements represented in the ECL are linked to code components represented in the AST. Here, the TCE may find correspondences between entities in the ECL with nodes in the AST. There may be a one-to-many correspondence between an entity in the ECL and components in the AST, although the correspondence may also be one-to-one. Components in the AST that correspond to an entity in the ECL may be found as described above.

An entity in the ECL may have, for example, a corresponding component in the AST or information about transformations that may have resulted in the corresponding model element being removed by an optimization during the code generation. If a model element is found that does not have a corresponding component in the AST or that matches the transformation, for example, for which there is no reason to expect it being removed by an optimization, this situation may be considered a verification failure. At block 1116, a report may be generated (e.g., by a TCE such as TCE 200). The report may contain information about one or more verification failures.

The AST may be traversed to find one or more components that may not have been associated with a corresponding entity in the ECL. The traversal may be a top-down traversal or may employ tree search or traversal techniques. The components in the AST that do not have corresponding entities in the ECL or that are not traced to a particular model or model element setting may be considered to represent functionality that is not present in the model, and may thus also represent verification failures. These verification failures may also be included in the report generated at block 1116.

Different types of verification failures may be tracked (e.g., by the TCE) and may be included in the report. Moreover, the report may include an indication of the failures and locations where they occur. For example, the failures may be marked on the generated code and/or on the model. Links may be provided between elements of the model and corresponding elements in the marked code and/or model. The report may include a pass/fail indication that represents whether the code overall has passed the verification.

Users may also be apprised of results of the code verification in various ways. For example, code verifier 250 may keep statistics about the code examined and about the particular patterns found therein. The report may include information about temporary variables used in the generated code and where they are used. The report may be in a format prepared according to user's settings or specifications. API 260 may provide routines and/or an interface for specifying what information to include in the generated report.

Figure 12:
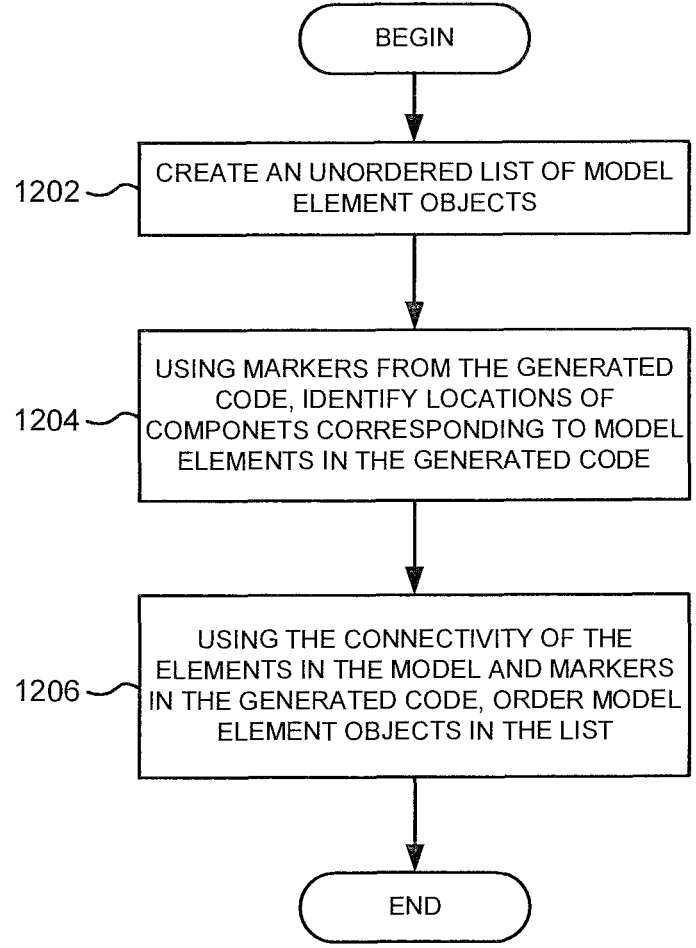
FIG. 12 illustrates a flow diagram of example acts that may be used to create an ECL from a model.

FIG. 12 illustrates a flow diagram of example acts that may be used to create an ECL from a model. The ECL may be an ordered list of structures or objects representing model elements. An entity of the ECL may correspond to an element of the model or a portion of the element of the model. For example, in the case of a block diagram model, there may be one or more entities corresponding to one or more blocks of the model. There may also be some blocks of the model that do not have corresponding entities in the ECL. For example, virtual blocks of the model need not have a corresponding entity in the ECL. A virtual block of a model may be a block that may represent a grouping of one or more model elements without affecting the functionality of the model. If a model has other model elements that do not affect the functionality of the model, such model elements may also not be included in the ECL. An entity of the ECL may also represent functionality of the model not embodied in a model element.

The ECL may be ordered based, in part, on the connectivity of the model and, in part, based on the arrangement of the generated code. For example, portions of the model that are independent from each other from the standpoint of control and/or data flow of execution may be arranged in multiple different ways in the generated code, while still preserving the functionality of the model. As such, there may be multiple different orderings of the entities in the ECL that also correctly represent the model functionality.

Referring to FIG. 12, at block 1202, an unordered list or vector of entities may be created. Creating the unordered list will be described in further detail with respect to FIGS. 13A-B, below. An unordered list of entities may be represented using various data structures, such as, for example, a linked list, a vector, an array, a dictionary, a set, a collection of objects, or a heap.

At block 1204, the generated code may be scanned to locate one or more markers that may identify locations of code components corresponding to model elements in the generated code. Such markers may be contained, for example, in one or more comment sections of the code, to avoid being processed by, for example, certain compiler or execution environments (e.g., during generation or execution of the code). The markers may be presented in various formats. The markers may mark a beginning and/or end of a section of code that corresponds to one or more elements of the model.

The code need not contain statements appropriately corresponding to the model element indicated—code verifier 250 may identify this case. Therefore, the markers in the code may be consulted to aid the verification process and not as a means of verifying that the code within the marked section contains what the marker specifies it does. The AST may include information related to the markers and the code components may be located by searching the AST.

There may be some sections of the generated code that are not marked by any markers. Furthermore, in some cases the markers may be incorrect in that they incorrectly identify a section of code as corresponding to a particular model element. Even in these cases, the verification may still proceed, because code verifier 250 may check that the code reproduces the model functionality, not that it is marked correctly. Code verifier 250 may identify correspondences between model elements and code components. Code verifier 250 may generate a report indicating these correspondences with more precision than the code markers inserted by code generator 240. At block 1206, the unordered list of entities may be ordered using the connectivity of the elements in the model and markers in the generated code. Ordering the unordered list of entities will be described in further detail below with respect to FIG. 14.

Figure 13A:
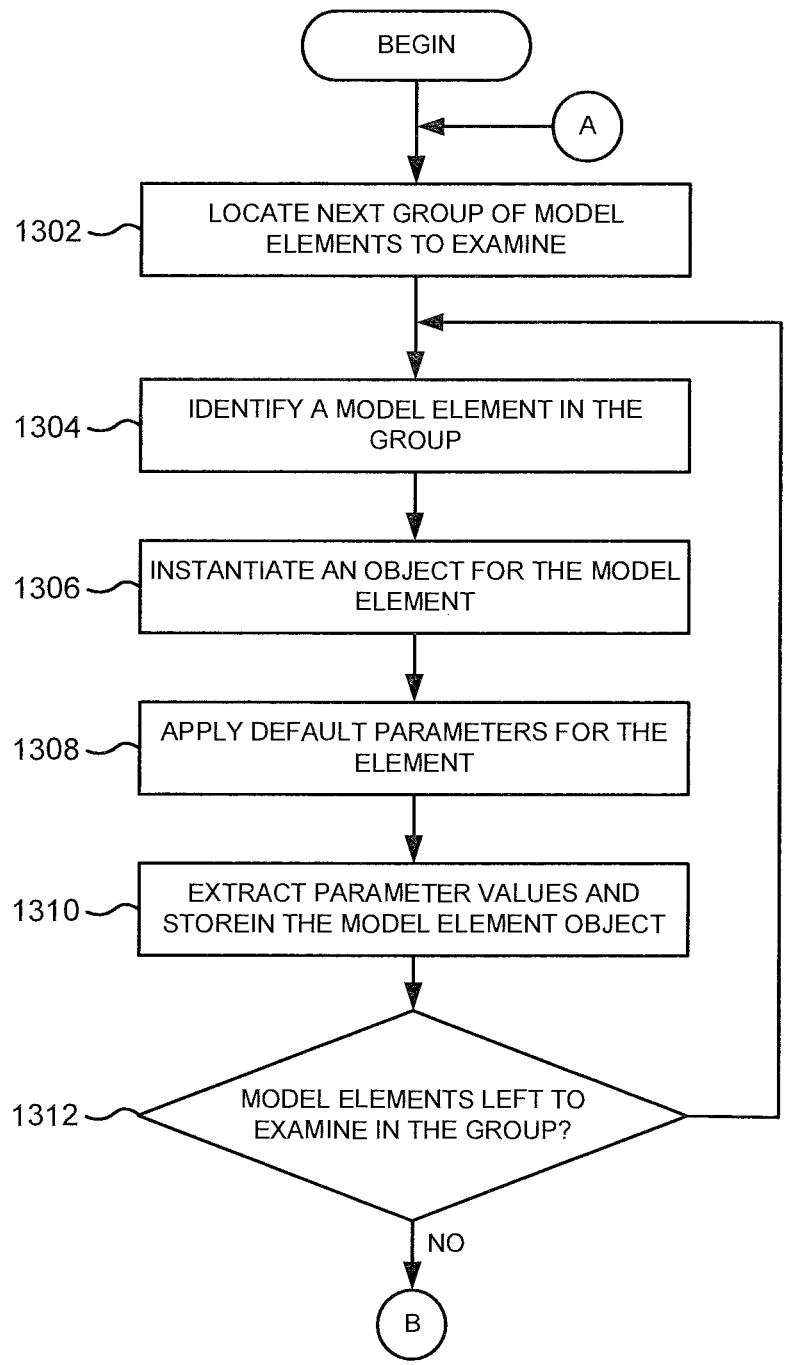
FIGS. 13A-B illustrate a flow diagram of example acts that may be used to create an unordered list of entities for an ECL.
Figure 13B:
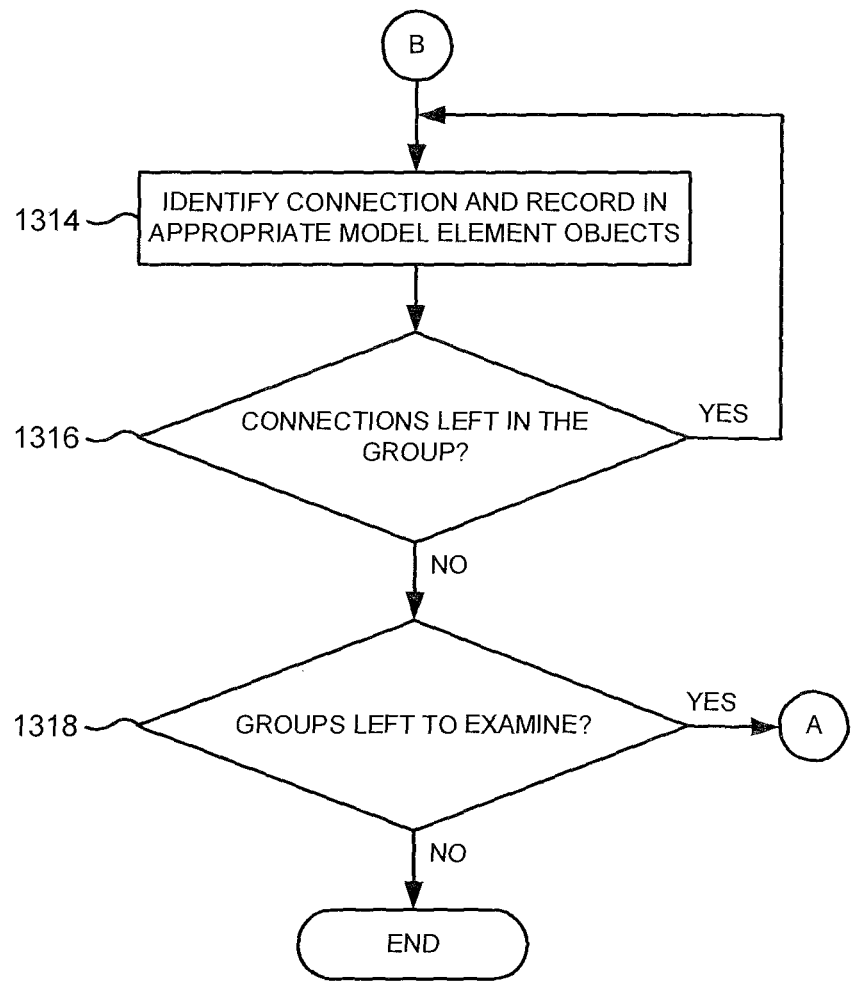

FIGS. 13A-B illustrate a flow diagram of example acts that may be used to create an unordered list of entities for an element connectivity list. A model may be stored in a file created by TCE 200. Such a file may contain information about groups of one or more model elements. The information may include a list of the elements and a description of connections between the elements contained in the groups. In an embodiment, a grouping of model elements may be itself considered a model element.

At block 1302, the file may be scanned to locate a group of model elements to examine. At block 1304, for each model element in a group, an object may be instantiated to hold information about that model element (block 1306). An object may be of a class specifically designed to hold information about a model element. Such information may include information about the functionality of the model element, its settings, its input and output parameters, default options, or other information about the model element. An object may also be any other data structure employed to store information about one or more model elements. An object stored in an ECL or a list that is to become an element connectivity list, may be referred to as an entity of the ECL.

At block 1308, default model element parameters are applied and recorded for the model element. The actual model element parameter values may then be extracted and stored in the corresponding entity (block 1310). Applying default model element parameters may be useful in case the actual model element parameters do not specify all of the possible parameters, leaving the other ones to be set to defaults.

At block 1312, if there are model elements left to examine in the group, at block 1314 (FIG. 13B) objects may be created for those model elements, otherwise connections between model elements are examined one by one. Each identified connection may be recorded in the appropriate entities. A single connection may need to be recorded in more than one object. In particular, it may be noted in the source object, which is then indicated as the source for the destination object, as well as in the destination object, which is then indicated as a destination for the source object. Other information about the connection, such as the number and parameters, may be recorded as well.

A connection may have properties such as an interface (e.g., service interface) specified. These properties may cause additional entities in the ECL to be created to capture the functionality. At block 1314, while there are connections left to examine, they are processed one by one (block 1316), after which the processing moves on to the next group, if any (block 1318). In such a way, the entire model file is processed to extract information about model elements and to create an unordered list of entities.

It should be noted that the textual representation of the model need not be as described above. In particular, the model elements need not be grouped into distinct groups. Provided the model representation contains information about the model elements and connections between them, it may be appropriately processed into a list of entities.

Figure 14:
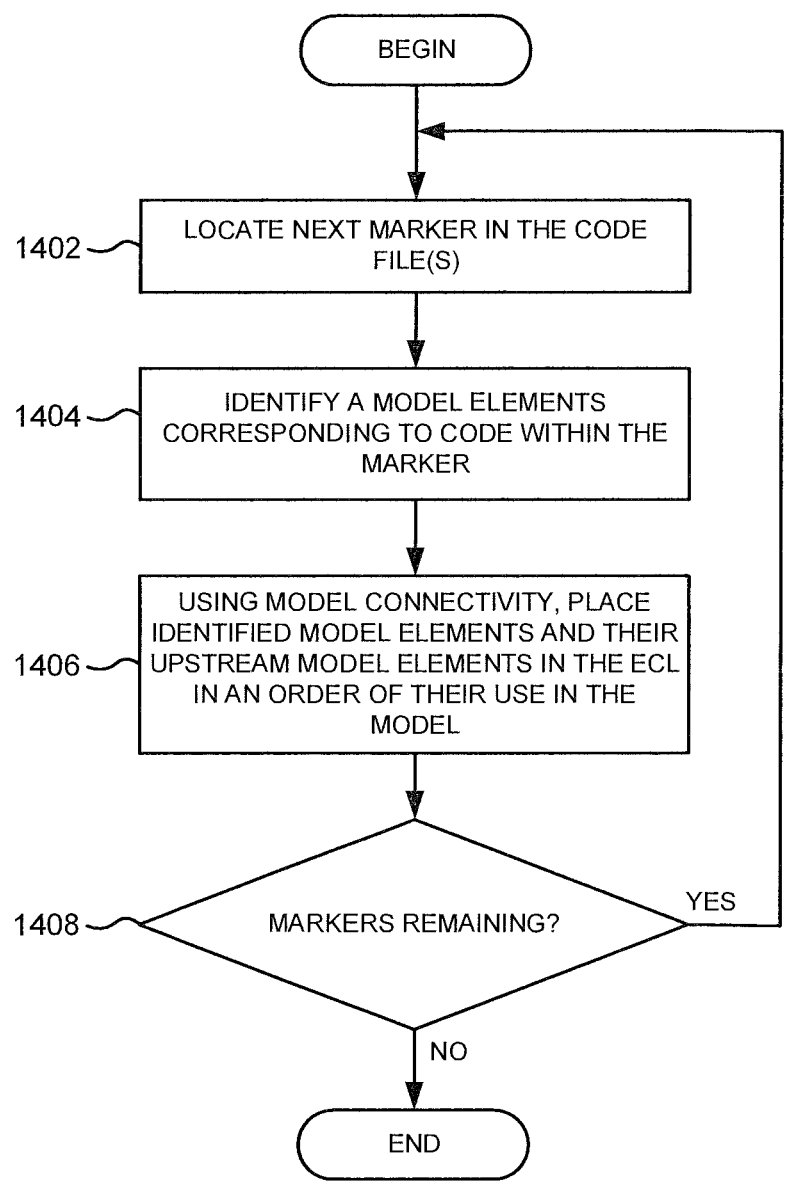
FIG. 14 illustrates a flow diagram of example acts that may be used to order entities in an ECL.

FIG. 14 illustrates a flow diagram of example acts that may be used to order entities in an element connectivity list. As discussed above, the ECL entities are ordered using information from the markers in the generated code. Referring to FIG. 14, at block 1402, after a marker is located, a model element corresponding to the code within the marker is identified (block 1404). The code marker may be in a predetermined format, from which it may be possible to extract the model element identifier. Using that model element as a starting point, the model elements upstream from it may be used to order the ECL entities based on the model connectivity structure (block 1406) of the model elements. That is, entities corresponding to those model elements may be ordered based on the connectivity of the model elements. In an embodiment, connections recorded in the entities may be links from one element to another, and may be followed to locate elements upstream from a particular model element. In such a way, in some models some or all of the model structure may be discovered even from a single model element, so long as it is located sufficiently far downstream.

In other models, it may be necessary to scan for additional markers (block 1408) to locate additional model elements and to order those model elements upstream from them.

Thus, if there are two or more sections of the model that are not dependent on each other in terms of an execution pattern—e.g. an order of execution—they may be ordered in the ECL based on the ordering in the generated code. However, if the model imposes an ordering based on the execution patterns, such order may be preserved in the resulting ECL.

In an alternative embodiment, a structure different from the ECL may be used to hold an internal representation of the model for code verification, so long as it is capable of being traversed to match model elements with their corresponding code components.

Figure 15A:
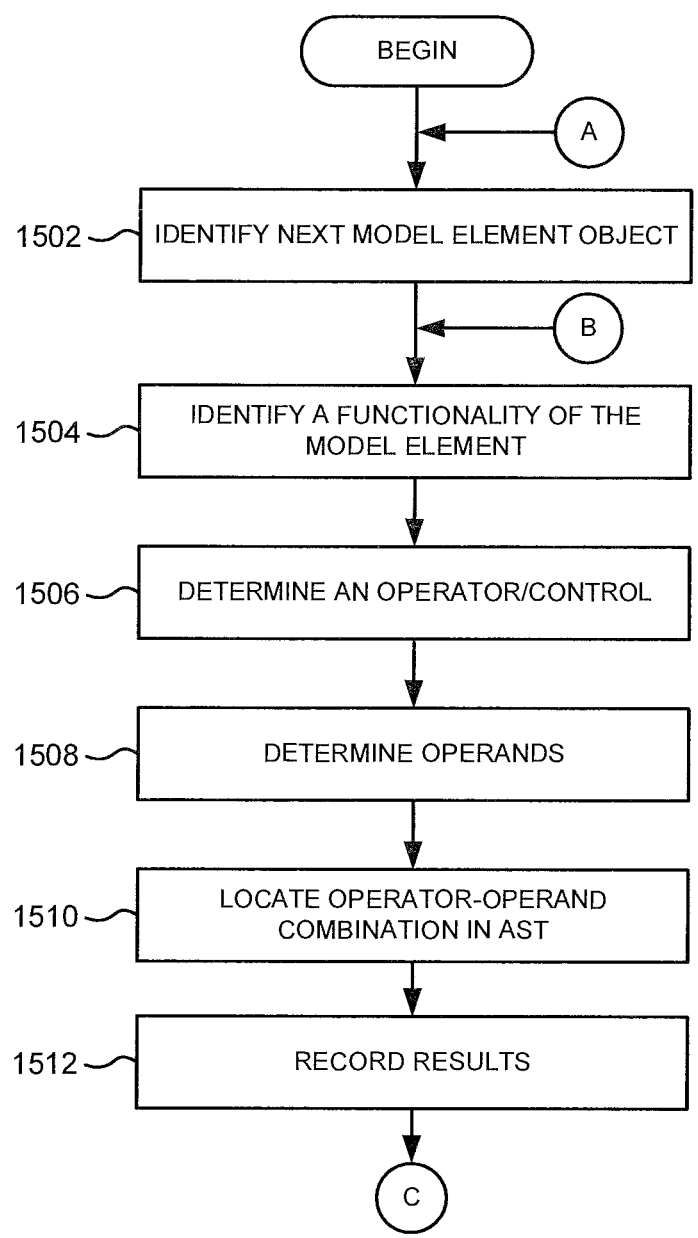
FIGS. 15A-B illustrate a flow diagram of example acts that may be used to determine code components for a model element.
Figure 15B:
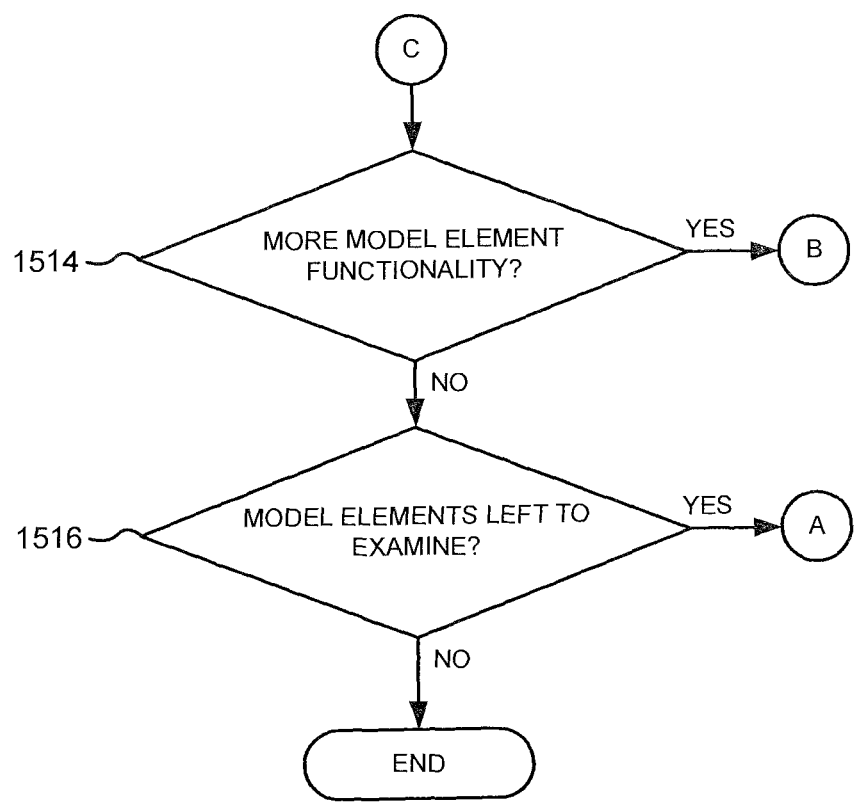

FIGS. 15A-B illustrate a flow diagram of example acts that may be used to determine code components for a model element. Referring to FIGS. 15A-B, the processing proceeds from one entity (model element object) to another within the ordered list (block 1502) identifying for each entity one or more code functionalities of a model element that corresponds to that entity (block 1504).

Model element functionality may be generally viewed as something requiring code functionality. Code functionality may be represented by one or more statements. Such statement may be an operator or a control. For example, an adder model element may have, among other functionalities, the functionality of adding two or more inputs. However, even though on the face of the model that may be all that the adder does, its functionality may not be limited only to the addition. In some cases, it may be necessary, for example, to modify parameters of input and/or output to ensure that the parameters are of the correct type as specified. Modifying model parameters may be performed by casting them and/or setting appropriate overflows and other information relating to the parameter type.

Thus, the extent of the entity functionality may be determined not only by what model element it corresponds to, but also by what inputs and outputs are for that model element. It may also be affected by other model and code generation parameters. Whether any casting or any additional operations are required in the code to represent the functionality of the model element may be determined using parsers and/or objects designed for each type of a model element. In addition, one or more steering tables, such as the steering tables described above, may be used to determine what additional operations, if any, are needed in the code to represent the model element functionality.

For a functionality of a model element, an operator or a control statement is determined (block 1506). An operator may act upon operands. A control may be a statement directing control flow of the code, such as, for example, loop commands, case commands, IF/ELSE commands, etc.

Depending on the operator or control, there may be one or more operands that are needed for that operator (block 1508). Those operands are determined based, in part, on the operator and based on what has already been determined for other entities. For example, an operand for a plus operator may be an expression or a variable. Values of that expression and/or variable may have been predetermined in conjunction with a previously verified model element. Therefore, they can be retrieved from storage associated with an entity corresponding to that model element. As such, the ordering of the entities in the ECL may be employed for traversal to match model elements with corresponding components in the code.

After the operator-operand combinations have been determined, they are located in the generated code (block 1510). As discussed above, the generated code may be represented using an AST. However, alternative representations may be possible, so long as they permit searching and allow for locating of operator-operand combinations. If the AST representation is used, in an embodiment there may be search functions employed to locate the operator-operand combinations, as implemented by one of skill in the art.

The results of searching the AST are recorded (block 1512) to note whether the corresponding code has been found and where. Additional information from the code components may be recorded in the corresponding entities. Such information may be, for example, expressions and/or values of the output of the operands, temporary variables involved, etc. The information may be recorded in the entities, and/or directly in a report or other memory structures holding information for the report.

At block 1514 (FIG. 15B), after the match information has been recorded, if there is more model element functionality remaining to be examined, the matching process proceeds to the additional functionality. Otherwise, the matching process moves on to the next model element to examine (block 1516), until all model elements have been examined and matches with the code components have been attempted to be found.

Figure 16:
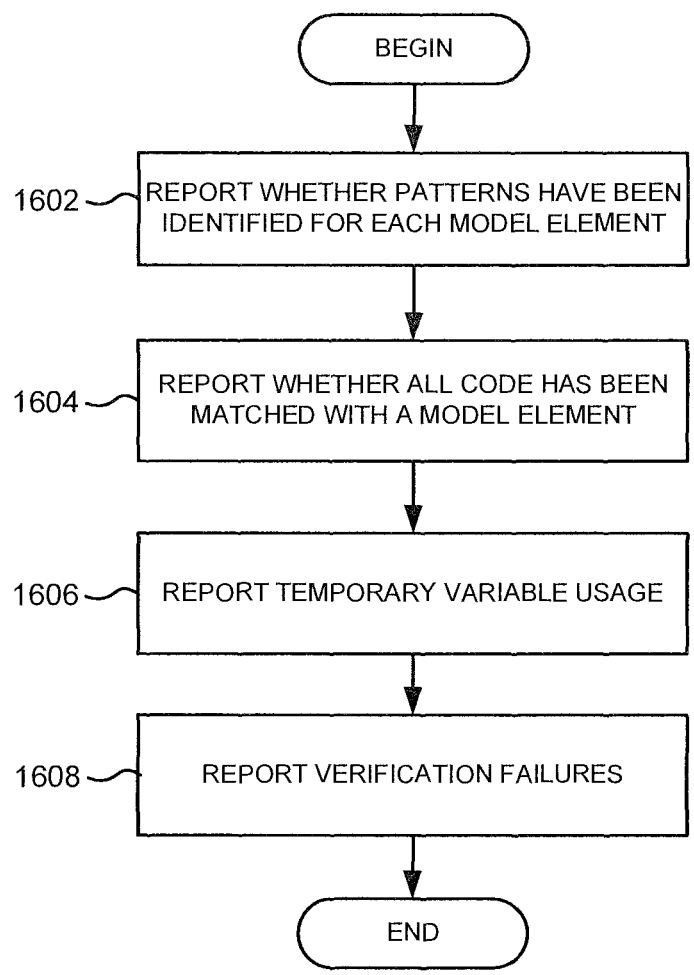
FIG. 16 illustrates a flow diagram of example acts that may be used to generate a report of code verification results.

FIG. 16 illustrates a flow diagram of example acts that may be used to generate a report of code verification results. The report may be compiled as the code verification proceeds, with information added as it is generated, or it may be created afterwards, using the information recorded in different places.

Referring to FIG. 16, a report may include a section reporting whether code patterns have been identified for each model element (block 1602), as well as an indication of whether all code components have been matched with an element (block 1604). Any model elements and/or code components that have not been matched may be reported specifically, so that the user may be apprised of specifics of the verification failures (block 1608).

The report may also include a description and/or accounting of temporary variables usage in the generated code (block 1606). The temporary variables may be listed with indication as to where they are used in the code.

The report may also go into additional details, as determined by one of skill in the art. For example, the code verification process may check whether the generated code provides an expected interface to the model, and the results of this check may be reported to the user. Verifying the correct interface may also involve verifying that a reusable code interface is correctly contained in the generated code and the corresponding AST. If the model indicates it contains non-reusable code, then the verification tool 270 may verify that the non-reusable code interface is contained in the generated code. In addition, the verification tool may check that structures storing values during time steps (e.g., DWORK structures) are properly contained in the interface, as well as that the model element I/O structures are properly contained in the interface to the generated code. All of these interface details may be included in the report.

There may be also additional verifications that are performed by the code verifier and the results of which are included in the report. For example, code verifier 250 may determine that all of the expected entry points into the generated code have been correctly generated by the code generation. A model may be processed in stages, such as evaluating its output, updating its state, computing its derivatives, etc. These stages may constitute entry points. Some models may also have a single step stage.

The model options settings, such as, for example, code reuse, exported functions, combining model output and model update calls, etc., may partially determine what code entry points are expected. In addition, some model elements such as, for example, a rate transition element may require specific entry points into the generated code, for example, to evaluate functionality at different rates that may be in different paths. In addition the code verifier 250 may determine whether there are unexpected entry points in the generated code. Such entry points may be determined based on scanning the AST for the entry points and determining whether they correspond to the expected entry points. Furthermore, the report generation tool may determine whether all model element names have been generated correctly. In some embodiments these names may be "mangled" in some cases, if the length of the name is restricted and there are unintentional matches, and part of the verification activities may be determining that the mangled names have been generated correctly. The report may list these mangled names and/or indicate whether they have been generated correctly.

Furthermore, as part of the verification and/or reporting activities, code verifier 250 may inspect the generated code to verify that in-line and non-in-line model subsystems have been generated correctly. For in-line model subsystems, the corresponding code may need to be contained within the same file as the code for the rest of the model. For the non-in-line model subsystems, the generated code may need to be contained in a separate file. In addition, for the non-in-line model subsystems, the generated code may need to have its own interface accessible from outside the model subsystem and it may be verified that this interface is called from within the generated code for the rest of the model. It may also be verified that the interface is external to the model.

The results of these and other verification activities may be reported to the user. The report may be provided as a document or a set of documents. There may be a user interface for viewing the code verification report and browsing corresponding code and/or model sections where appropriate. The results of code verification activities may be reported visually in conjunction with the model. For example, the model elements for which no corresponding code components have been found, may be visually indicated as such to the user. The report may be incrementally generated and displayed to the user as it is being created.

Figure 17:
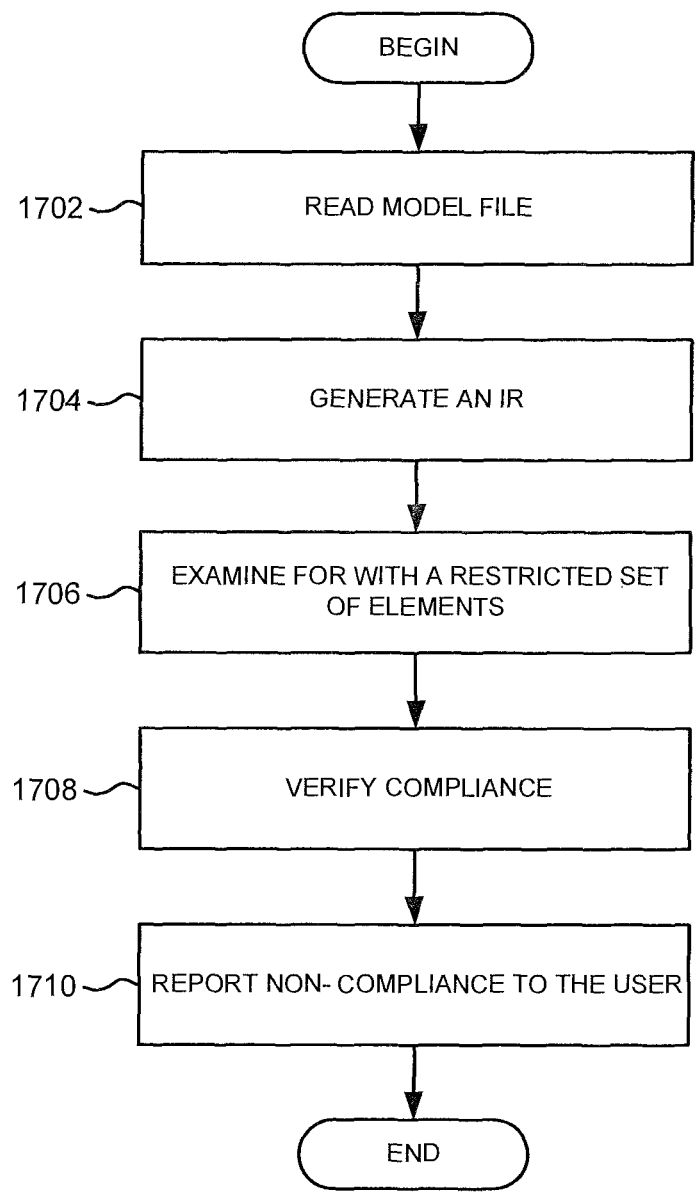
FIG. 17 illustrates a flow diagram of example acts that may be used to inspect a model for compliance with a restricted subset of model elements and configurations of model elements supported by a code verifier.

A code verifier, such as code verifier 250, may, for example, support all of the features and elements allowed in a model in a particular modeling environment or a restricted subset of the model elements. FIG. 17 illustrates a flow diagram of example acts that may be used to inspect a model for compliance with a restricted subset of elements and configurations of elements supported by a code verifier, such as code verifier 250. After the model source file is received by the code verifier (block 1702), an IR is generated (block 1704), and is examined for compliance with a restricted subset of elements (block 1706). The compliance may be verified based on all elements belonging to the restricted subset of elements and/or based on additional factors (block 1708). If there are elements of the model that fall outside of the supported set, a code generator, such as code generator 240, may report non-compliance to the user (block 1710).

Figure 18:
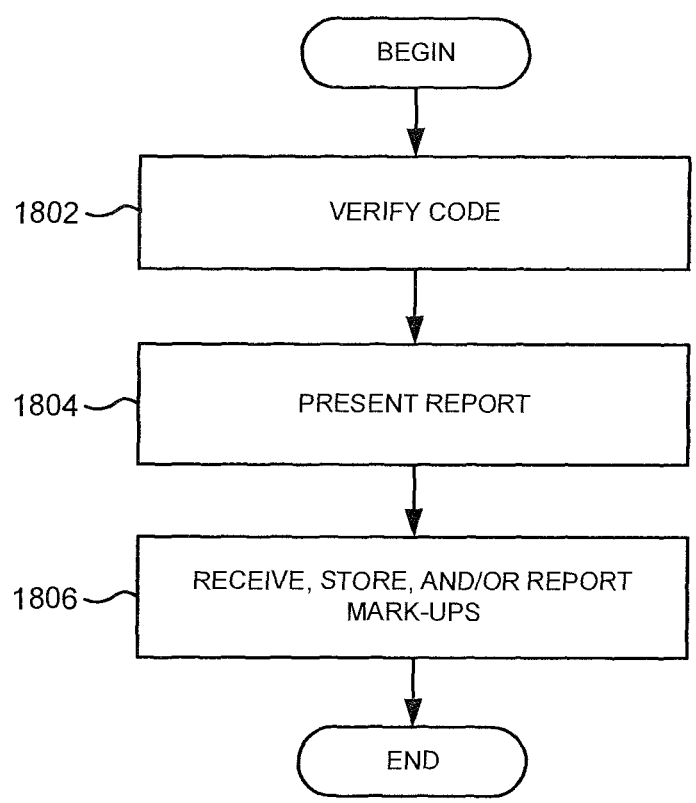
FIG. 18 illustrates a flow diagram of example acts that may be used to provide an interface for browsing and/or marking sections of generated code and corresponding sections of a model.

The verification results may be visually marked up for the user on the model and/or code. In addition, the user may be able to mark up the model and/or code after receiving the verification report. FIG. 18 illustrates a flow diagram of example acts that may be used to provide an interface for browsing and/or marking sections of generated code and corresponding sections of a model. After the code is verified (block 1802), a report may be presented to the user (block 1804) or the user may be shown marked-up code. The user may then choose to manually verify portions of the code, whether those that have been verified by the code verifier or not, and to mark-up the code in accordance with the manual verification. User-generated mark-ups may be received, stored and/or reported (block 1806). Reporting may include reflecting the mark-ups on the model and/or the code.

Figure 19A:
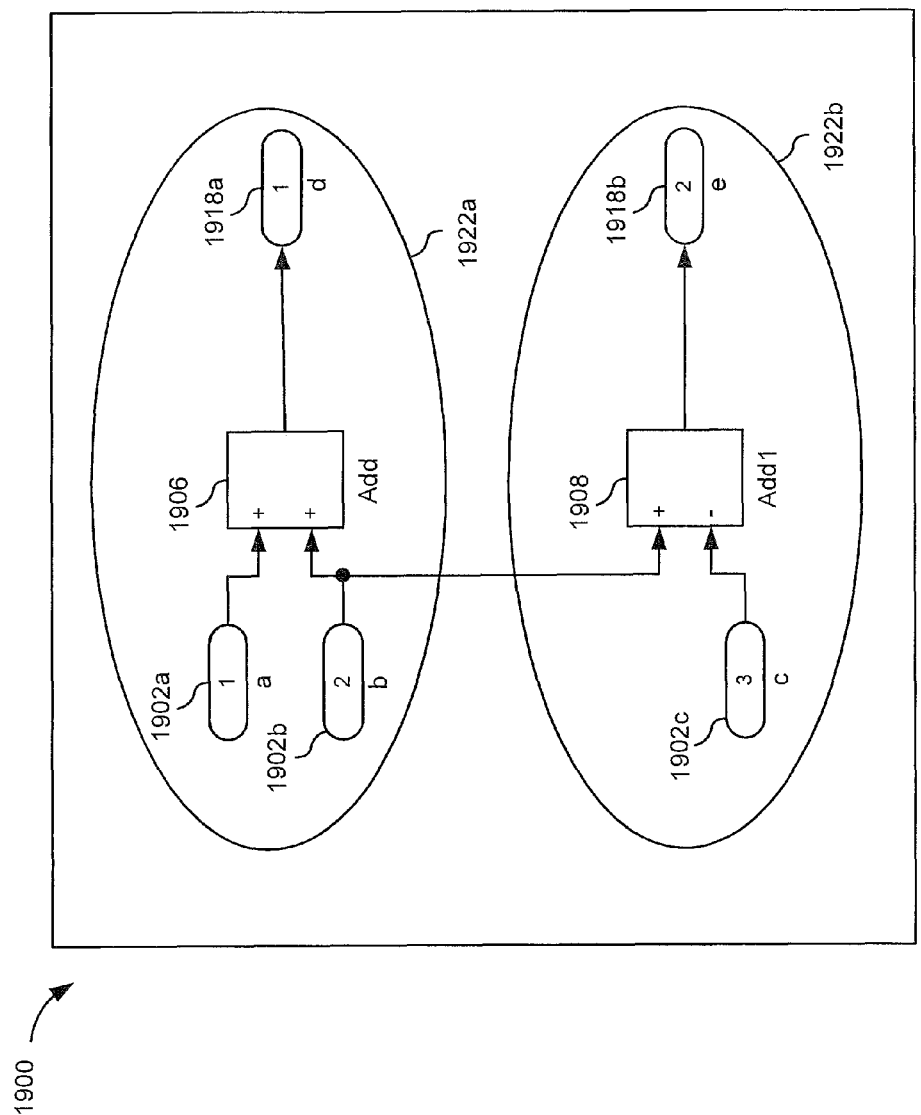

FIG. 19A illustrates an example embodiment 1900 of model 230 that is sliced in accordance with an embodiment of the invention. Referring to FIG. 19A, the example embodiment 1900 includes inports 1902a-c, blocks 1906 and 1908, and outports 1918a-b. The inports 1902a-b provide input values (e.g., signals) for block 1906 and inports 1902b-c provide input values for block 1908. Outports 1918a and 1918b may output values (e.g., signals) from blocks 1906 and 1908, respectively.

The example embodiment 1900 may be sliced by TCE 200. The model may be sliced into two slices 1922a-b. Slices of example embodiment 1900 may be based on various criteria, such as outputs of the model, verifiable portions of the example embodiment 1900, or other criteria. In this example, the slices are based on verifiable portions of example embodiment 1900. Specifically, slice 1922a includes a portion of example embodiment 1900 that is considered verifiable. Slice 1922b, on the other hand, includes a portion of model 1900 that is considered unverifiable.

A slice may be considered verifiable if code generated for that portion of the model represented by the slice is verifiable. FIG. 19B illustrates examples of expected code 1940 and actual (generated) code 1945 for slices 1922a-b. Referring to FIG. 19B, the expected code 1940 may be identified by TCE 200. Identifying the code may involve, for example, generating code 1940 (e.g., using code generator 240), receiving code 1940 from a user via an interface, receiving code 1940 over a communications network, reading code 1940 from a file or database, or otherwise identifying code 1940.

Likewise, the actual code 1945 may identified by TCE 200. Identifying the code 1945 may likewise involve, for example, generating code 1945 (e.g., using code generator 240), receiving code 1945 over a communications network, reading the code 1945 from a file or database, or otherwise identifying code 1945.

The code at lines 1941 and 1942 may be expected code for slice 1922a and the code at lines 1943 and 1944 may be expected code for slice 1922b. Likewise, the code at lines 1946 and 1948 may be generated code for slice 1922a and the code at lines 1947 and 1949 may be generated code for slice 1922b. Note that TCE 200 may consider slices 1922a and 1922b verifiable because the TCE 200 may be able to identify the expected code for these portions of model 1900.

The identified expected code 1940 and the actual code 1945 may be analyzed to determine whether the expected code 1940 and the actual code 1945 meet certain criteria. The criteria may include, for example, whether the expected code 1940 is equivalent to the actual code 1945. Note that equivalence does not necessarily mean the expected code 1940 is identical to the actual code 1945. Rather, equivalence may refer to other forms of equivalence. For example, equivalence may refer to equivalent functionality, equivalent data types, equivalent performance, semantic equivalence, structural equivalence, numerical equivalence, and/or other forms of equivalence between the expected code 1940 and the actual code 1945.

Semantic equivalence may be determined in accordance with a definition of languages (e.g., C, C++, Java) used to implement the expected and/or actual code. Semantic equivalence may be found if semantics of the expected code is equivalent to semantics of the actual code regardless of, for example, syntactic/grammatical details of languages used to implement the expected and actual code.

Structural equivalence may be based on a control and/or data flow analysis of the expected and/or actual code. Structural equivalence may be found if a control and/or data flow analysis shows that the expected code is structurally equivalent to the actual code.

Numerical equivalence may be based on an equivalence between a first numerical value associated with the expected and/or actual code, and a second numerical value associated with the expected and/or actual code. A value at a point of interest in the actual code may be considered numerically equivalent to a value in the expected code if the value in the actual code falls within a certain tolerance or range of the values with respect to the expected code. For example, if a value produced at a point of interest in the expected code is 10 and a tolerance factor is 20%, a value produced at a corresponding point of interest in the actual code that fall between 8 and 12 may cause the expected code to be considered equivalent to the actual code.

It should be noted that equivalence may be defined using, for example, a rule. Here, a user may specify a rule that is used to define equivalence. Moreover, the user may specify a parameter that may be associated with the rule. For example, the user may define a rule that defines a numerical equivalence. The rule may contain a parameter that may specify a tolerance value used by the rule to determine equivalence, such as described above. A user may have control over specifying the tolerance value.

Also note that criteria may be based on metrics other than equivalence. For example, criteria may be based on various performance considerations, code efficiency, utilization of special hardware/software, storage occupied by the code, readability of the code, traceability of the code to the model, or other considerations. Moreover, criteria may be defined using a rule that may be, for example, evaluated to identify the criteria.

FIG. 19C illustrates examples of IRs that may be generated from code associated with slices 1922a-b. Referring to FIG. 19C, IR 1950 represents expected code for slice 1922a. IR 1950 may be generated from code at lines 1941 and 1942. Likewise, IR 1952 represents expected code generated for slice 1922b. IR 1952 may be generated from code at lines 1943 and 1944.

IR 1954 represents generated code that was generated from slice 1922a. IR 1954 may be generated from code at lines 1946 and 1948. Likewise, IR 1956 represents generated code that was generated from slice 1922b. IR 1956 may be generated from code at lines 1947 and 1949.

TCE 200 may determine whether the expected code for slice 1922a is equivalent to the generated code for slice 1922a by, for example, determining whether IR 1950 is equivalent to IR 1954. Likewise, TCE 200 may determine whether the expected code for slice 1922b is equivalent to the actual code for slice 1922b by, for example, determining whether IR 1952 is equivalent to IR 1956. For slice 1922a, as can be seen in IRs 1950 and 1954, the IRs 1950, 1954 are equivalent except for the name of temporary variables used in an intermediate result. Thus, TCE 200 may find, as a result of examining the IRs 1950, 1954, that the expected code for slice 1922a and the actual code for slice 1922a are equivalent. Likewise, for slice 1922b, as can be seen in IRs 1952 and 1956, the IRs 1952, 1956 are equivalent except for the name of temporary variables used in an intermediate result. Thus, TCE 200 may find, as a result of examining the IRs 1952, 1956, that the expected code for slice 1922b and the actual code for slice 1922b are equivalent.

It should be noted that slicing may be viewed as a projection on a model. The projection may not necessarily lead to mutual exclusivity of contents contained in slices of the model. Rather, in some situations, two or more slices may contain the same element of the model. For example, an element contained in a model may be contained in a first slice of the model and a second slice of the model.

FIG. 19D illustrates a result that may be attained after a normalization is applied to the IRs illustrated in FIG. 19C. The normalization may involve removing temporary variables contained in the IRs. For example, the variables "temp", "temp1", and "temp2" in the IRs illustrated in FIG. 19C may be considered temporary variables by TCE 200. TCE 200 may normalize the IRs illustrated in FIG. 19C, which may involve removing these temporary variables. FIG. 19D illustrate IRs 1950, 1952, 1954, 1956 after this normalization is performed.

FIG. 19E illustrate a verification that may be performed using the IRs illustrated in FIG. 19D to determine whether the expected code 1940 and the actual code 1945 are equivalent. Referring to FIG. 19D, the dashed lines indicate portions of the IRs that may be compared to determine equivalency. For example, dashed line 1960a indicates that the nodes labeled "d" may be compared for equivalence. Likewise, dashed line 1960b indicates that the nodes labeled "+" may be compared for equivalence.

The verification process may begin by comparing the nodes labeled "d". If these nodes are found to be equivalent, verification may proceed to the next nodes labeled "+" to determine if they are equivalent, the nodes associated with dashed line 1960c to determine if they are equivalent, and the nodes associated with dashed line 1960d to determine if they are equivalent. If, for example, all of the nodes in an IR generated from the expected code 1940 are found to be equivalent to their corresponding nodes in the IR generated from the actual code, the expected code 1940 may be considered equivalent to the actual code 1945. Otherwise, the expected code 1940 and the actual code 1945 may be considered not equivalent.

Figure 20:
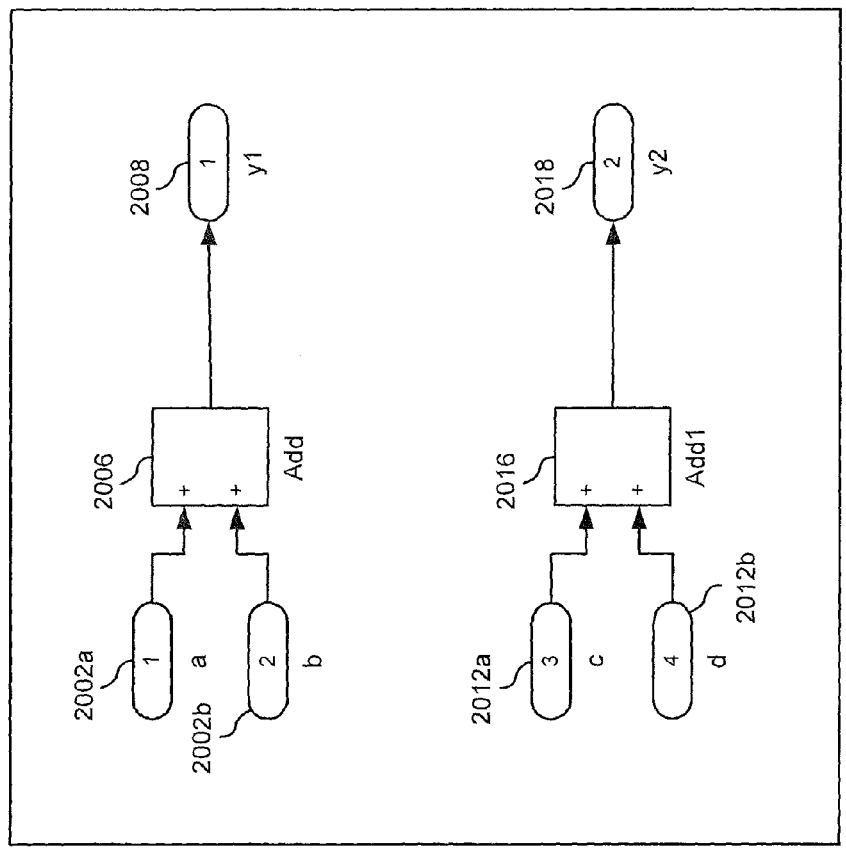
FIG. 20 illustrates an example of a model that may be verified in accordance with an embodiment of the invention.

FIG. 20 illustrates an example embodiment 2000 of model 240 that may be verified in accordance with an embodiment of the invention. Referring to FIG. 20, example embodiment 2000 includes inports 2002a-b which may feed values (held in variables "a" and "b") to block 2006. Block 2006 may add the values and produce an output value (held in variable "y1") which may be output from the example embodiment 2000 via outport 2008. Likewise, example embodiment 2000 includes inports 2012a-b which may feed values (held in variables "c" and "d") to block 2016 which may add the values and produce an output value (held in variable "y2") from the example embodiment 2000 via outport 2018.

Figure 21:
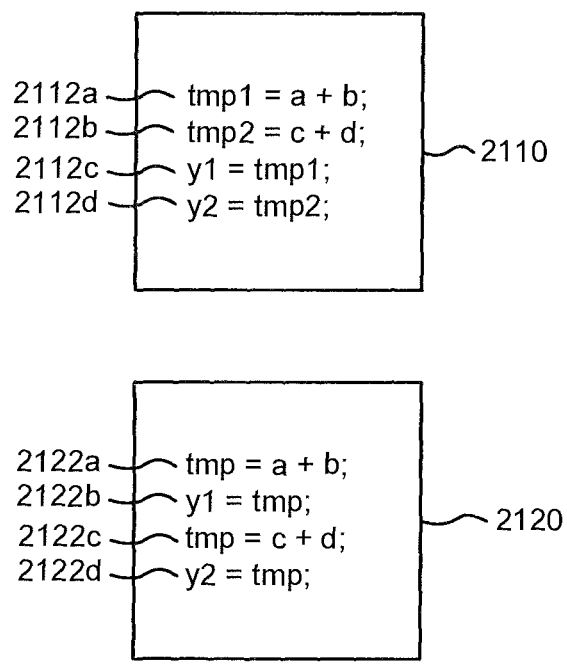
FIG. 21 illustrates examples of code that may be generated from the example model illustrated in FIG. 20.

FIG. 21 illustrates examples of code that may be generated from the example embodiment 2000. Referring to FIG. 21, the code at block 2110 is an example of code that may be generated from example embodiment 2000. At line 2112a, the values of variables "a" and "b" are added. The result of the addition is stored in a variable named "tmp1". Likewise, at line 2112b, the values of variables "c" and "d" are added and the result of the addition is stored in a variable named "tmp$_2$". At line 2112c, the value stored in variable "tmp1" is stored in variable "y1". Likewise, at line 2112c, the value stored in variable "tmp2" is stored in variable "y2". Note that the code in block 2110 utilizes storage for two "temporary" variables, i.e., "tmp1" and "tmp2".

The code at block 2120 is another example of code that may be generated from example embodiment 2000. At line 2122a, the values of variables "a" and "b" are added. The result of the addition is stored in a variable named "tmp". At line 2122b, the value in variable "tmp" is stored in variable "y1". At line 2122c, the values of variables "c" and "d" are added and the result of the addition is stored in the variable named "tmp". At line 2122d, the value stored in variable tmp is stored in variable y$_2$. Note that the code in block 2110 utilizes storage for only one "temporary" variables, i.e., "tmp".

TCE 200 may evaluate the code in 2110 and 2120 to determine if they are equivalent. Equivalence may depend on a point of interest (which may be predetermined/predefined). For example, if the point of interest is to ensure that the resultant values stored in "y1" and "y2" by the code in block 2110 is the same as the resultant values stored in these variables by the code in block 2120, both blocks of code may be considered equivalent because both store the same resultant values in these variables. However, if the point of interest is efficiency, especially from a standpoint of memory usage, the code in block 2110 may not be considered equivalent to the code in block 2120 because the code in block 2110 uses two temporary variables whereas the code in block 2120 uses only one temporary variable.

FIG. 22 illustrates IRs that may be generated form the code illustrated in FIG. 21 and/or the example embodiment 2000 illustrated in FIG. 20. Referring to FIG. 22, the IRs in block 2210 may be generated from the code in block 2110. As can be seen, the IRs in block 2210 show that two temporary variables are used to store intermediate results of operations performed in the code in block 2110.

The IRs in block 2220 may be generated from code in block 2120. As can be seen, only one temporary variable is used to store intermediate results of operations performed in the code in block 2120.

An analysis of the IRs in blocks 2210 and 2220 may show that the code in blocks in 2110 and 2120 may or may not be equivalent based on a point of interest, as described above.

Figure 23:
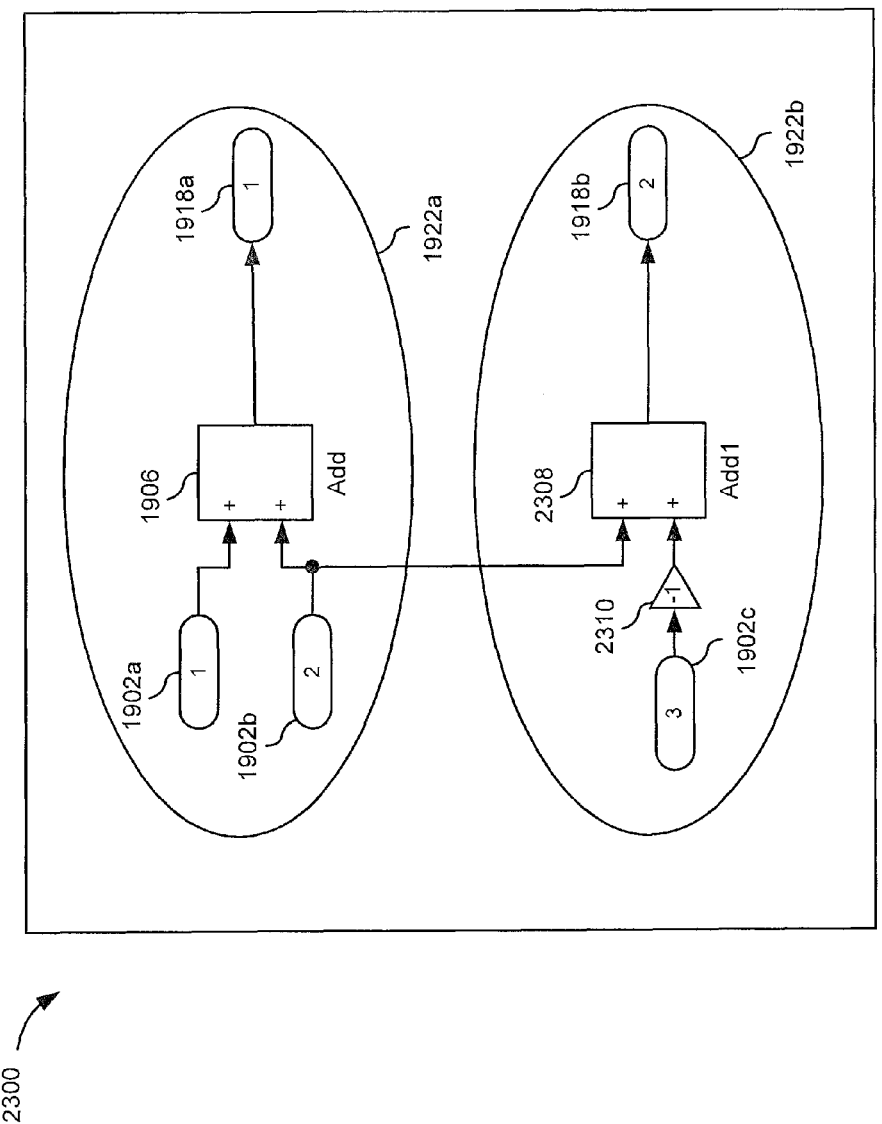
FIG. 23 illustrates a model that has been modified in accordance with an embodiment of the invention.

FIG. 23 illustrates an example embodiment 2300 of model 230 that may be generated by modifying example embodiment 1900 (FIG. 19) in accordance with an embodiment of the invention to make slice 1922b verifiable. Referring to FIG. 19, suppose that TCE 200 determines that slice 1922b is unverifiable because the code generated for block 1908 is unverifiable. TCE 200 may make this determination based on its inability to find an expected pattern for code generated for block 1908.

Suppose that TCE 200 may consider code generated for block 1906 verifiable because TCE 200 may find an expected pattern for the generated code. Further suppose that TCE 200 may be capable of finding an expected pattern for code that may be generated for a gain block and thus code generated for a gain block may be considered verifiable by TCE 200. TCE 200 may suggest (for example to a user) a change to example embodiment 1900 (or, for example, automatically make a modification to example embodiment 1900) that may make slice 1922b verifiable. The change may involve changing block 1908 to a block similar to block 1906 and adding a gain block. The combination of the changed block and gain block may be functionally equivalent to block 1908.

Referring now to FIG. 23, TCE 200 may replace block 1908 with blocks 2308 and 2310 to make slice 1922b verifiable. Block 2308 may be functionally equivalent to block 1906. Block 2310 may be a gain block. A parameter associated with the gain block may be set to "−1" to cause the gain block to be functionally equivalent to a negation function that may be performed by block 1908. The combination of gain block 2210 and block 2308 may duplicate the functionality of block 1908. Since TCE 200 may find an expected pattern for generated code for gain block 2310 and block 2308, TCE 200 may consider slice 1922*b* to be verifiable after the change is made.

Note that the change may be suggested via a GUI to, for example, a user. The user may they provide authorization to make the change. The change may be automatically performed by the TCE 200 (with or without user authorization). The change may be performed temporarily. Here, the change may be made temporarily (e.g., by TCE 200) for purposes of verification. After verification, the model may be reverted back to its original design (e.g., by TCE 200).

Also note that after a change has been made to the model, the model may be re-sliced. For example, in FIG. 23, example embodiment 2300 may be sliced in the same arrangement or a different arrangement after block 2308 is replaced with gain block 2008 and block 2010.

Figure 24:
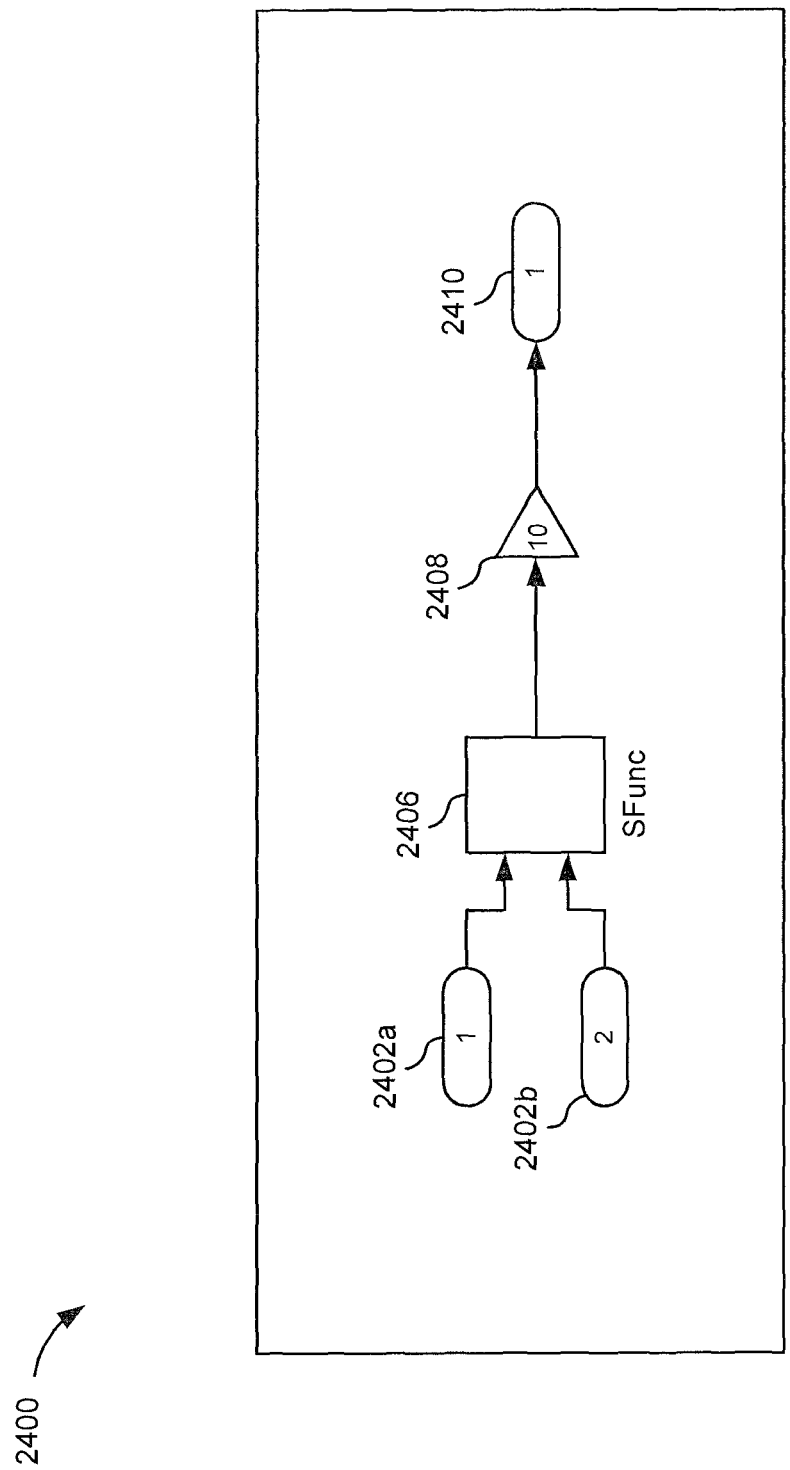
FIG. 24 illustrates an example of a model that may be verified in accordance with an embodiment of the invention.

FIG. 24 illustrates an example embodiment 2400 of model 230 that may be verified in accordance with an embodiment of the invention. Referring to FIG. 24, example embodiment 2400 may include inport blocks 2402*a-b*, S-function block 2406, gain block 2408, and outport block 2410. The S-function block may contain code that may be specified, for example, by a user. Modeling environment 100 may treat the code associated with the S-function block as unverifiable. For example, modeling environment 100 may not be able to find an expected pattern for the code. Thus, the modeling environment 100 may not be able to verify that code generated for the S-function block 2406 is equivalent to the code contained in the S-function block.

Figure 25:
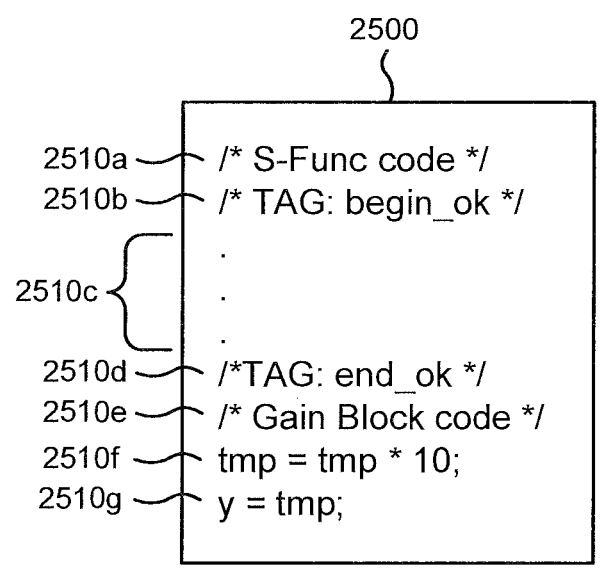
FIG. 25 illustrates an example of code that may be tagged in accordance with an embodiment of the invention.

FIG. 25 illustrates example code 2500 that may be tagged in accordance with an embodiment of the invention. Line 2510*a* of the code may be a comment that may indicate that the following code is code that is associated with the S-function block 2406. The code at line 2510*b* may include a tag that may indicate the beginning of code associated with the S-function block 2406. The code may be contained at line 2510*c*. Line 2510*d* may include a tag that may indicate an end of code associated with the S-function block 2406. Note that in processing the code 2500, the TCE 200 may assume that code between the tags at lines 2510*b* and 2510*d* (i.e., the code at line 2510*c*) is correct and thus may skip verifying this code. Moreover, the tags at line 2510*b* and 2510*d* may be inserted by the TCE 200 to flag that the code at line 2510*c* is being skipped. Note that skipped code may have to be manually verified, such as described above.

Lines 2510*e-g* contain code associated with the gain block 2408. TCE 200 may consider this code verifiable (e.g., TCE 200 may be able to find an expected pattern for the code that may be used to verify the code), thus, in this example, the code is not tagged.

Figure 26:
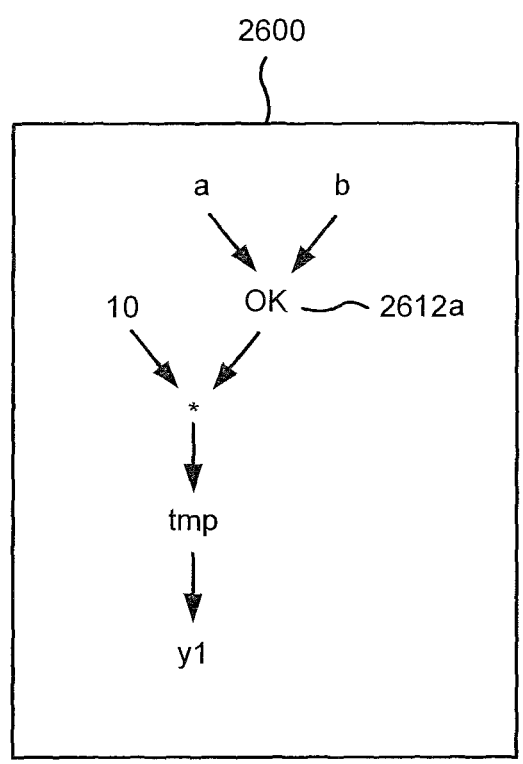
FIG. 26 illustrates an example of an IR that may be tagged in accordance with an embodiment of the invention.

FIG. 26 illustrates an example of an IR 2600 that may be tagged in accordance with an embodiment of the invention. IR 2600 may be generated from example embodiment 2400 and/or code 2500 by, for example, TCE 200. The IR 2600 may be analyzed by TCE 200 to determine which portions of the example embodiment 2400 and/or code 2500 may be omitted from a verification of code generated from the example embodiment 2400 and which portions of the example embodiment 2400 and/or code 2200 may be included in the verification. Portions that may be omitted may be tagged in the IR 2600 with a tag. For example, the node 2612*a* contains the tag "OK" to indicate that this portion of IR 2600 omitted from the verification.

Figure 27:
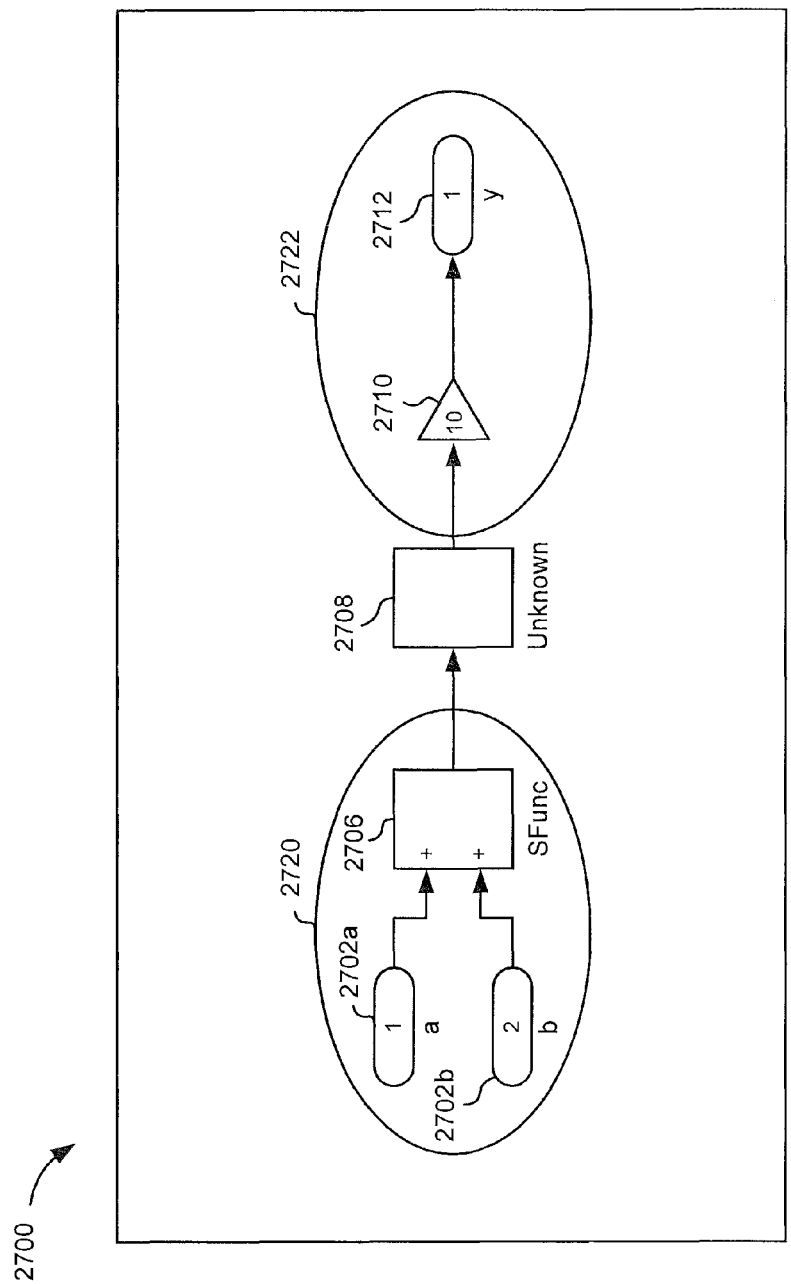
FIG. 27 illustrates an example of a model that may indicate certain status with respect to verification in accordance with an embodiment of the invention.

FIG. 27 illustrates an example embodiment 2700 of model 230 that may indicate certain status with respect to a verification of code generated from example embodiment 2700. Suppose that TCE 200 may consider the portion 2720 of example embodiment 2700 verifiable and block 2708 unverifiable. Further, suppose that TCE 200 has verified code generated from portion 2720, cannot verify code generated from block 2408, and has not verified code generated from portion 2722 in example embodiment 2700. TCE 200 may indicate this status in a presentation (e.g., display) of the example embodiment 2700 using, for example, color, texture, graphics, tags, annotations, and/or tactile feedback. For example, TCE 200 may present blocks 2702*a-b* and 2706 contained in portion 2720 in a first color to indicate that code generated from those blocks have been verified. TCE 200 may also present block 2708 in a different color to indicate that code generated from block 2708 is unverifiable. Moreover, TCE 200 may present blocks 2710 and 2712 in section 2722 in a yet a different color (e.g., greyed out) to indicate that code generated from section 2722 has not been verified. Note that other statuses associated with a verification of a model may be presented. Moreover, statuses associated with a verification of a model may be presented in other ways.

Figure 28:
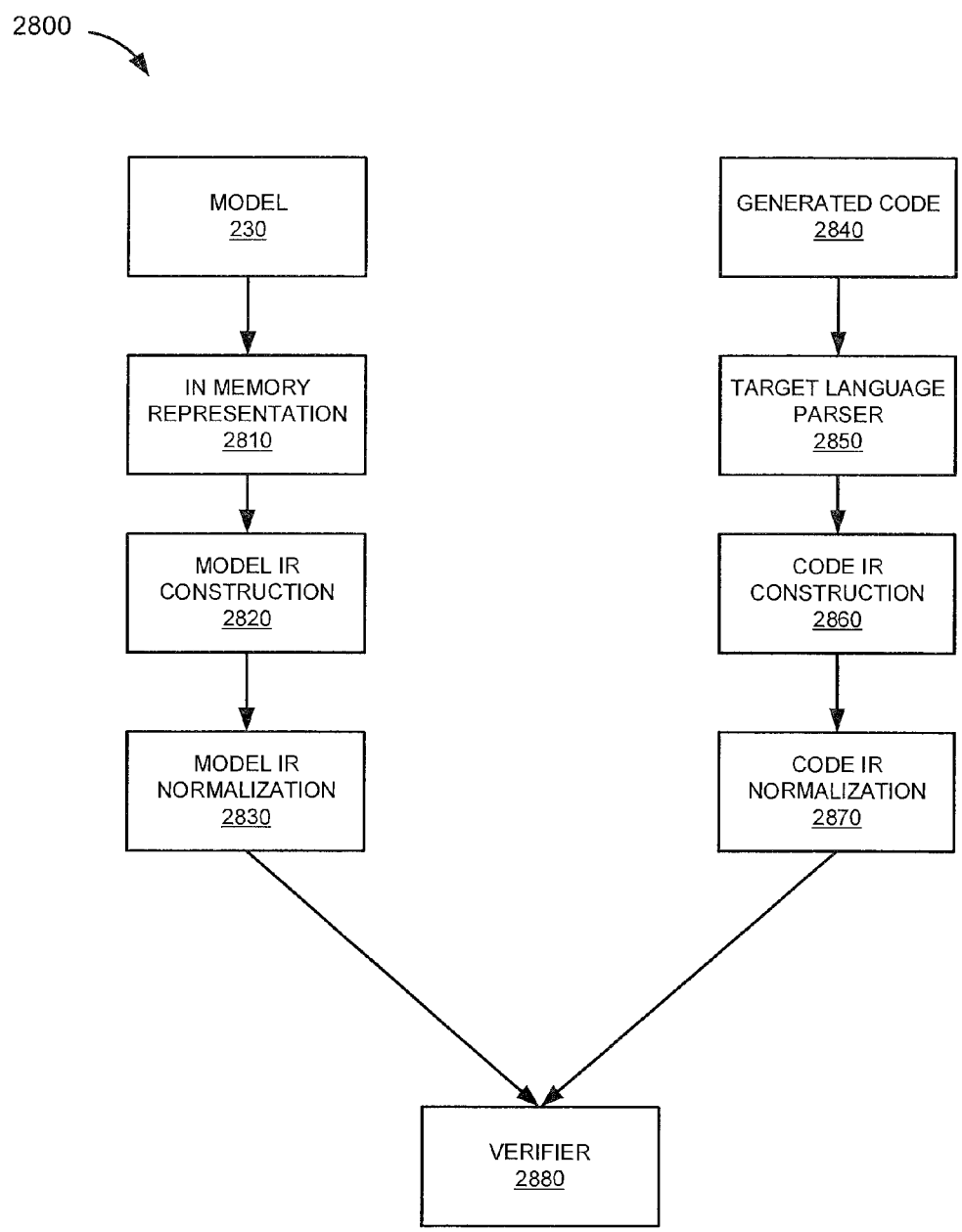
FIG. 28 illustrates an example of an architecture that may be used for code verification in an embodiment of the invention.

FIG. 28 illustrates an example of an architecture 2800 that may be used for code verification in an embodiment of the invention. The architecture may be implemented by TCE 200 (e.g., portions of which may be contained in components 250 and/or 270). Referring to FIG. 28, the architecture may include an in memory representation component 2810, a model IR construction component 2820, a model IR normalization component 2830, a target language parser 2850, a code IR construction component 2860, a code IR normalization component 2870, and a verifier component 2880. An "expected" pattern may be generated from the in memory representation component 2810, the model IR construction component 2820, and the model IR normalization component 2830. A "to-be-verified" pattern may be generated from the target language parser component 2850, the code IR construction component 2860, and the code IR normalization component 2870. The expected pattern and the to-be-verified pattern may be compared by the linker component 2880 to determine whether they are equivalent.

Operationally, the in memory representation component 2810 may generate an in memory representation of model 230. The model IR construction component 2820 may construct an IR of the in memory representation of the model 230, which may be called a model IR. The model IR may be generated from information that describes the model. This information may be contained, for example, in a file, database, block diagram of the model, or some other source. The model IR may include expected code that represents functionality of the model, such as the described above. The model IR may be normalized by the model IR normalization component 2830 to produce a normalized model IR. The normalized model IR may be considered the expected pattern.

For example, suppose that a block diagram of embodiment 1900 (FIG. 19A) is provided. The model IRs generated from the provided block diagram may include the expected code 1940 (FIG. 19B) and/or IRs 1950 and 1952 (FIG. 19C). IRs 1950 and 1952 may be a normalized as illustrated in FIG. 19D. The normalized IRs and/or the expected code 1940 may be considered the expected pattern.

Code 2840 generated from the model 230 may be input to the target language parser component 2850. An output from the target language parser component 2850 may be input into the code IR construction component 2860, which may generate a code IR. The code IR may be considered the to-be-verified pattern.

For example, given the above example, the code generated for the embodiment 1900 may be code 1945. IRs produced from the code may include IRs 1954 and 1956. These IRs 1954, 1956 may be normalized as illustrated in FIG. 19D. The normalized IRs and/or the actual code 1945 may be considered the to-be-verified pattern for embodiment 1900.

The expected pattern and the to-be-verified the pattern may be fed to the verifier 2880, which may determine whether the to-be-verified pattern is equivalent to the expected pattern.

It should be noted that equivalence should not be limited to mean that the expected pattern and the to-be-verified pattern are identical. Equivalence may refer to, for example, equivalent functionality, equivalent performance, and/or other forms of equivalence between the expected pattern and the to-be-verified pattern. Also note that criteria (e.g., various performance considerations, code efficiency, utilization of special hardware/software, storage occupied by the code, readability of the code, traceability of the code to the model) other than equivalence between the expected pattern and the to-be-verified pattern may be checked for by the verifier 2880.

A model, such as model 230, may contain a series of blocks and connectivity among the blocks. Here, a block may define certain functionality of the model and the connectivity may define a data flow relationship among functionalities defined by multiple blocks. The model may be described by the following equations.

In general, functionality of a block may be described by equation $y_{block}=f(u_{block},p_{block},d_{block})$ (1), where, f may represent functionality of the block, $u_{block}$ may represent inputs of the block, $p_{block}$ may represent parameters of the block and $d_{block}$ may represent states that may be used by the block. Together f, $u_{block}$, $p_{block}$, and $d_{block}$ may determine an output $y_{block}$ of the block. A block parameter $p_{block}$, may generally be set manually using, for example, a user interface and equation $p_{block}=P$ (2) may be used to describe the parameter. Similarly, the equation $d_{block}=D$ (3) may be used to describe $d_{block}$. It should be noted here, that state may be internal to the block and may be unknown.

A model may include various types of blocks that may not necessarily be described by the above equations. For example, a model may include source blocks and sink blocks that may be defined by equations that are different than equations described above. Source blocks may include blocks that produce and output sources of signals. An example of a source block may include a signal generator block, which may produce and output a sine wave signal. Sink blocks may include blocks that provide sinks for signals that are inputted into the source blocks. An example of a sink block may include a scope block, which may display a signal that is input into the block.

An output $y_{block}$ of a source block may be defined with by a known state U that may be input into the source block. Thus, an equation that may be used to describe a source block may be $y_{block}=U$ (4). Similarly, a sink block's state Y may be defined by the sink block's input $u_{block}$. An equation that may be used to describe a sink block may be $Y=u_{block}$ (5).

Connectivity may determine a direction of data-flow among blocks. An output of a block $y_{block}$ may be a source of connectivity between blocks. An input of a block $u_{block}$ may be a destination of connectivity between blocks. Equation $u_{block}^{dest}=y_{block}^{src}$ (6) may be used to describe connectivity among blocks in the model, where the superscripts dest and src are used to denote "source" and "destination", respectively. Note that $y_{block}$ and $y_{block}^{src}$ may be used, herein, interchangeably depending on context. Likewise, $u_{block}$ and $u_{block}^{dest}$ may be used, herein, interchangeably depending on context.

A model may contain a list of blocks and connectivity among these blocks. A portion of a model may be formulated using the following equation $[Y_1, Y_2, \ldots Y_N]=F(U_i, P_m, D_n)$, where $0<i<N$, $0\leq m$, $n<N$ (7), where $Y_n$ are outputs associated with the portion of the model, F is a function associated with the portion of the model, $U_i$ are inputs associated with the portion of the model, $P_m$ are parameters associated with the portion of the model, and $D_n$ are states associated with the portion of the model.

TCE 200 may generate code (generated code). The code may be generated in various languages, such as, for example, C, C++, C#, Python, Java, machine language, and assembly language. Given a piece of generated code, equation $[Y'_1, Y'_2, \ldots Y'_N]=F'(U'_i)$, where $0<i<N$ (8) may be used to describe its functionality, where $[Y'_1, Y'_2, \ldots Y'_N]$ are outputs produced by the code, F' is a function performed by the code, and $U'_i$ are inputs to the code. Equation $Y_i=Y'_i$, where $0<i<N$ (9) may represent a definition of an equivalence of equations (7) and (8).

One way to determine whether equations (7) and (8) are equivalent may involve treating F and F' as a black box, serve the same test vector to both equations, and observe the outputs of the equations. If the same output is observed, it could be said that equation (7) and (8) are equivalent.

Another way to determine whether equation (7) and (8) are equivalent may involve assuming that F and F' are equivalent. Then the outputs of equations (7) and (8) should be the same. The TCE 200 may use the above assumption to establish equivalence between equations (7) and (8).

Slicing may be used to show equivalence between various outputs that may be associated with a model and/or code generated from the model. Slicing may involve converting equations (7) and (8) to the equations $Y_j=F_j(U_i,P_m,D_n)$, where $0<i$, $j<N$, $0\leq m$, $n<N$ (10) and $Y'_j=F'_j(U'_i)$, where $0<i$, $j<N$ (11), respectively. Determining equivalence may involve identifying a slice of the code, identifying a portion of the model associated with the slice, and determining whether $Y_j$ of the identified portion of the model is equivalent to (e.g., equal to) $Y'_j$ of the identified slice of code.

For code, slicing may involve determining, for example, which statements in the code may affect a value x at a point P in the code. TCE 200 may define x as $Y_i$, where $0<i<N$, and P may be where a point in the code where the last $Y_i$ occurs.

Suppose the tuple <P,x> is used to represent x and P. Slicing may involve identifying which statements in the code affect <P,x>. Or stated differently, slicing may involve finding those statements in the code that are coupled with <P,x>. An approach to slicing may include, for example, examining dependencies in the code. Here, dependencies may include data dependencies and/or control dependencies in the code.

A statement may be said to include a true data dependency if a value of a data associated with the statement depends on a value of data associated with a previous statement. Consider, for example, the following code:

```
line 1: temp = a + b
line 2: y = temp
```

In the above example, the code at "line 1" defines a value of the variable "temp" and the code at "line 2" uses the value of variable "temp". It may be said that the value produced by the code at "line 1" is consumed by the code at "line 2" and a value produced by "line 2" is data dependent on a value produced by "line 1". Therefore, it may be further said that a data dependency exists between the code at "line 1" and the code at "line 2". Moreover, given the above code, there may be no way to reorder the code at "line 1" and "line 2" and preserve the semantics of the original program.

An output dependency may be where an ordering of instructions may affect an output value of a variable. For example, consider the following code:

```
line 1: temp = a + b
line 2: temp = c + d
```

In the above example, the code at "line 1" and "line 2" define values for the variable "temp". If the order of code at "line 1" and "line 2" is changed, then the value held by "temp" may change as well. It may be said that the code at "line 1" and "line 2" are coupled. Rewriting the above code as follows may decouple the above code since the order of the following code does not impact the values held by variables "temp1" and "temp2".

```
line 1: temp1 = a + b
line 2: temp2 = c + d
```

An anti-dependency may involve a variable that is used by a statement in code whose value may be updated by a later statement in the code. For example, consider the following code:

```
line 1: y = temp + a
line 2: temp = c + d
```

In the above example, "line 1" uses the value held by the variable "temp" and "line 2" updates the value held by the variable "temp". If the order of "line 1" and "line 2" were to change, the value held by the variable "y" may be incorrect. An anti-dependency may be similar to the output dependency, described above, in that certain statements may be coupled. In the above example, the statements at "line 1" and "line 2" are coupled. Rewriting the above example as follows, may decouple the statements at "line 1" and "line 2". Note that the order of the statements becomes less critical in the rewritten code with regards to impacting the value of the output variable "y".

```
line 1: y = temp + a
line 2: temp1 = c + d
```

Output dependencies and anti-dependencies may be said to be "name dependent". As can be seen from the above rewritten examples, output dependencies and anti-dependencies may be avoided by carefully choosing the names of variables.

A control dependency may also affect a value of a statement. For example, a control dependency may also affect a value of a statement if the execution of the statement is dependent on another (e.g., preceeding) statement. This concept is illustrated in the following example code:

```
line 1: IF ( C )
line 2:   y = temp
line 3: ELSE
line 4:   y = 5
line 5: END
```

In above example code, the value of variable "y" depends on the condition specified by "C". If the condition specified by "C" is satisfied (e.g., true), then the value of variable "y" is set to the value held by the variable "temp". Otherwise, if the condition specified by "C" is unsatisfied (e.g., false), then the value of variable "y" is set to "5". Note that since the value of "y" depends on the condition specified by "C", it may be said that "y" has a control dependency on (or "y" is control dependent on) the condition specified by "C".

A PDG may include a graph G(e, v), where "e" represents a set of edges among a set of vertices "v". A vertex "v" may represent a statement of a program. An edge "e" may represent a dependency relationship between two distinct vertices "$v_i$" and "$v_j$" may be said to exist. If "$v_j$" is data dependent on "$v_i$", a data dependent edge "$e_d$" (which may represent the data dependency "$v_j$" between and "$v_i$"), may be added to graph G(e, v). If "$v_j$" is control dependent on $v_i$, an edge "$e_c$" (which may represent a control dependency between "$v_j$" and "$v_i$") may be added to graph G(e, v).

Figure 29:
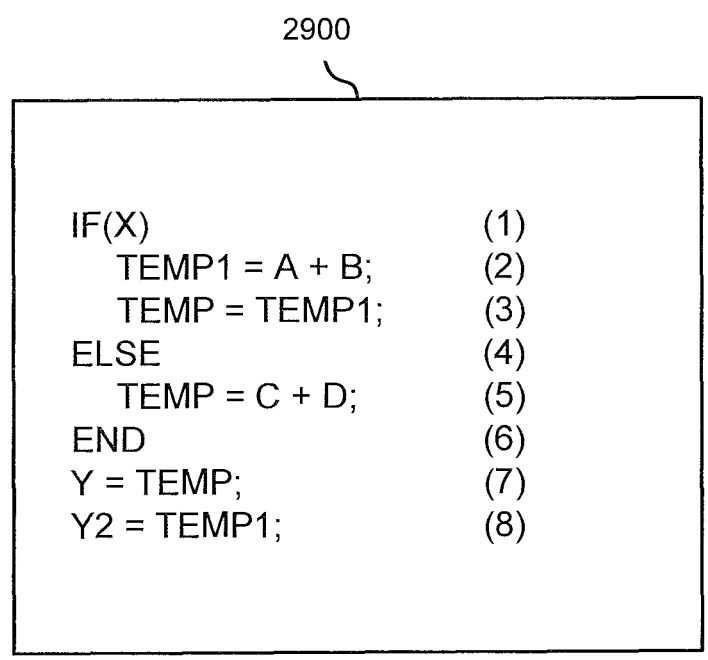
FIG. 29 illustrates a listing of example code that may be generated from a model.

For example, FIG. 29 illustrates example code 2900 that may be generated from a model, such as model 230, by an environment, such as TCE 200. The listing 2900 including a column 2910 of line numbers, where a particular line number is associated with a line of code. Referring to FIG. 29, at line 1, a test is performed to determine whether a value of a variable named "X" is a Boolean TRUE. If so, the code at lines 2 and 3 are performed; otherwise, the code at a line 5 is performed. At line 2, the values of variables named "A" and "B" are added together and the result of the addition is stored in a variable named "TEMP1". At line 3, a value of a variable named "TEMP" is assigned the value of the variable named "TEMP1". At line 5, the values of variables named "C" and "D" are added together and the result of the addition is stored in a variable named "TEMP". At line 7, the value of a variable named "Y" is set to the value of the variable named "TEMP". At line 8, the value of the variable named "Y2" is set to the value of the variable named "TEMP1".

Figure 30:
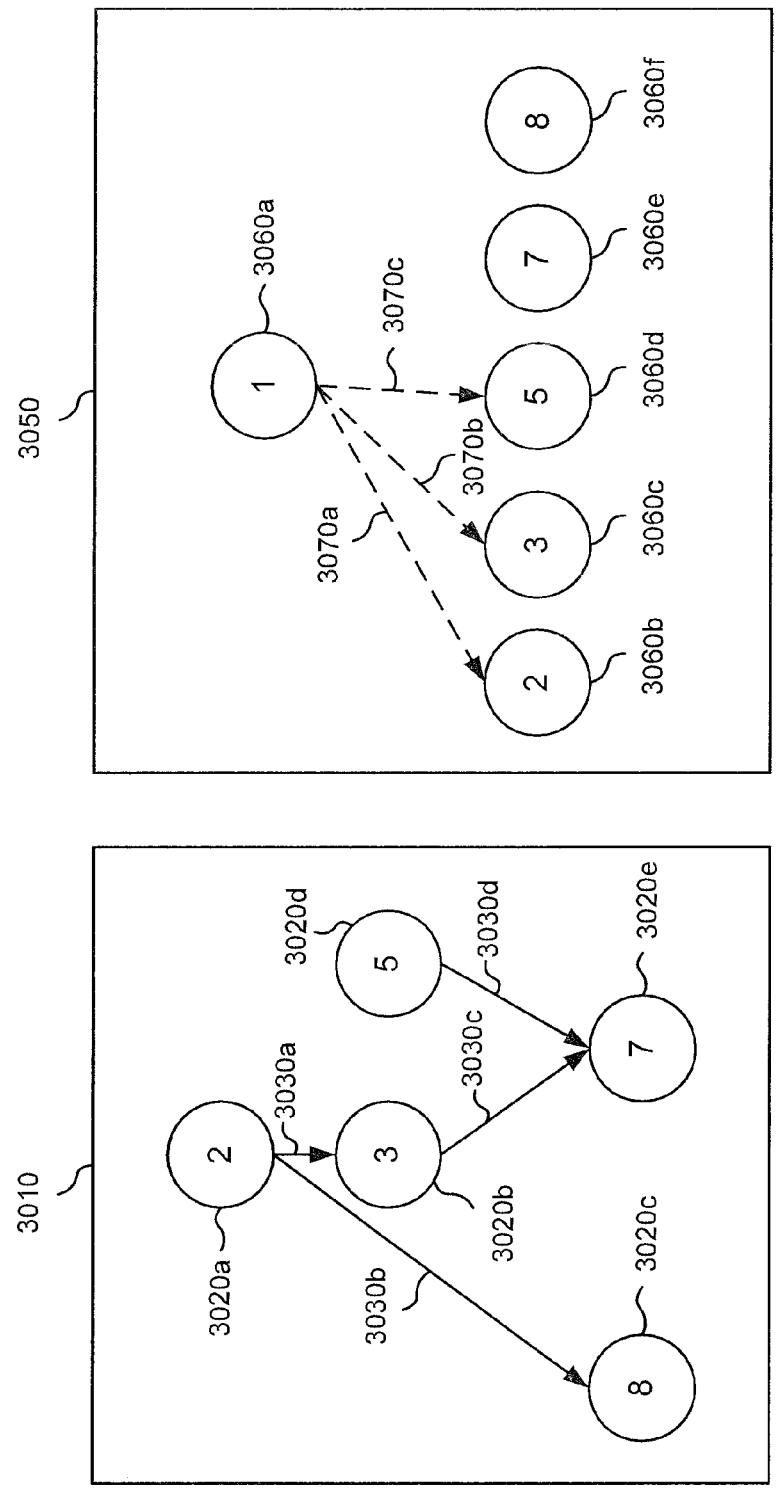
FIG. 30 illustrates an example of a data dependency graph and a control dependency graph that may be generated from code illustrated in FIG. 29.

FIG. 30 illustrates an example of a data dependency graph 3010 and a control dependency graph 3050 that may be generated from code illustrated in FIG. 29. Referring to FIG. 30, the data dependency graph 3010 includes a series of nodes 3020*a-e* and a series of edges 3030*a-d*. Nodes 3020*a-e* represent statements in code 2900 where the number inside a node 3020 indicates a line number associated with a statement represented by the node 3020. For example, node 3020*a* contains the number "2" which indicates that node 3020*a* represents the statement at line 2 (i.e., "TEMP1=A+B") in code 2900. Edges 3030*a-d* represent data dependencies between statements in code 2900. Thus, for example, edge 3030*a* represents a data dependency between the statement at line 2 and the statement at line 3 in code 2900.

Control dependency graph 3050, likewise, includes a series of nodes 3060a-f and a series of edges 3070a-c. Nodes 3060a-f represent statements in code 2900. The number inside a node 3060 indicates a line number of the statement represented by the node 3060. Thus, for example, node 3060a contains the number "1" which indicates that node 3060a represents the statement at line 1 (i.e., "IF(X)") in code 2900. Edges 3070a-c represent control dependencies between statements in code 2900. For example, edge 3070a represents a control dependency between the statement at line 1 and the statement at line 2 in code 2900.

Figure 31:
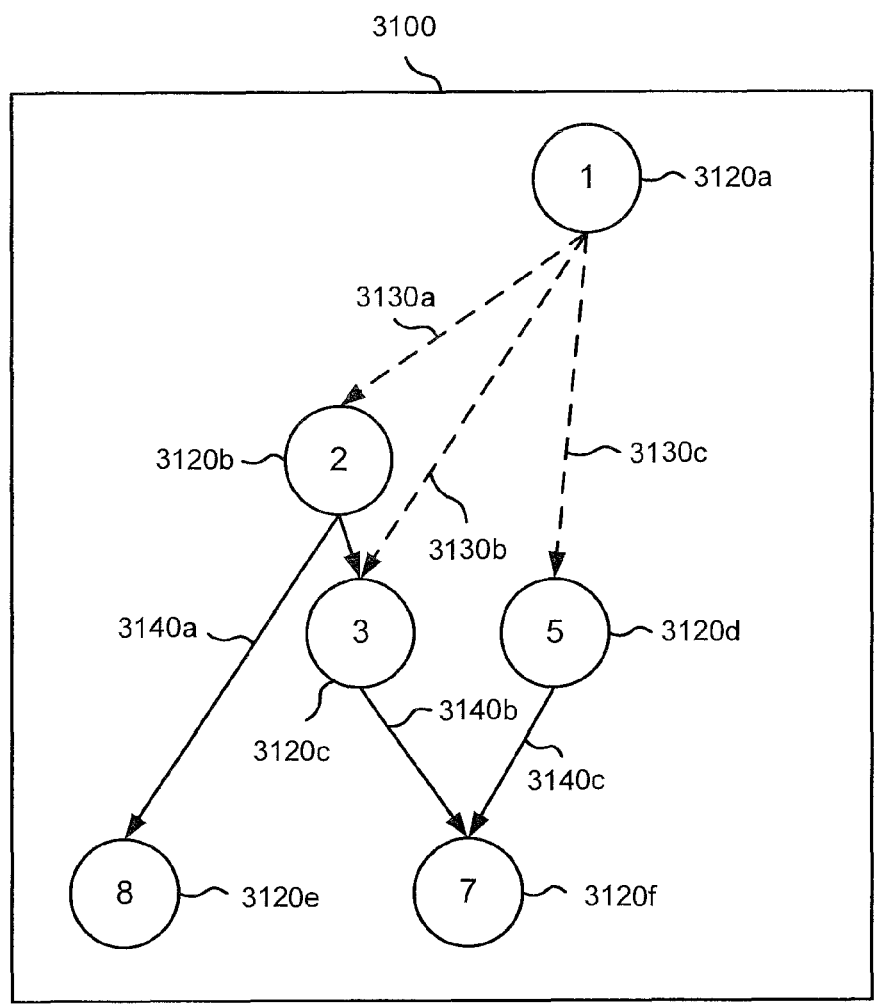
FIG. 31 illustrates an example program dependency graph (PDG) that may be generated from the data dependency graph and control dependency graph illustrated in FIG. 30.

FIG. 31 illustrates an example program dependency graph (PDG) that may be generated from the data dependency graph and control dependency graph illustrated in FIG. 30. Referring to FIG. 31, nodes 3120a-f represent statements in code 2900. The number inside a node 3120 indicates a line number the statement represented by the node 3120. Thus, for example, node 3120a contains the number "1", which indicates that node 3120a represents the statement at line 1 (i.e., "IF(X)") in code 2900. Edges 3130a-c represent control dependencies between statements in code 2900. For example, edge 3130a represents a control dependency between the statement at line 1 and the statement at line 2 in code 2900. Edges 3140a-c represent data dependencies between statements and code 2900. For example, edge 3140a represents a data dependency between the statement at line 2 and the statement at line 8 in code 2900.

A PDG may be sliced as follows. Given a vertex "$v_i$" of the PDG graph G(e,v), the slice of G(e,v) with respect to "$v_i$" is a graph G'(e',v') containing all vertices of which "$v_i$" has a transitive flow or control dependency. All vertices can reach "$v_i$" via data flow or control edges.

Figure 32:
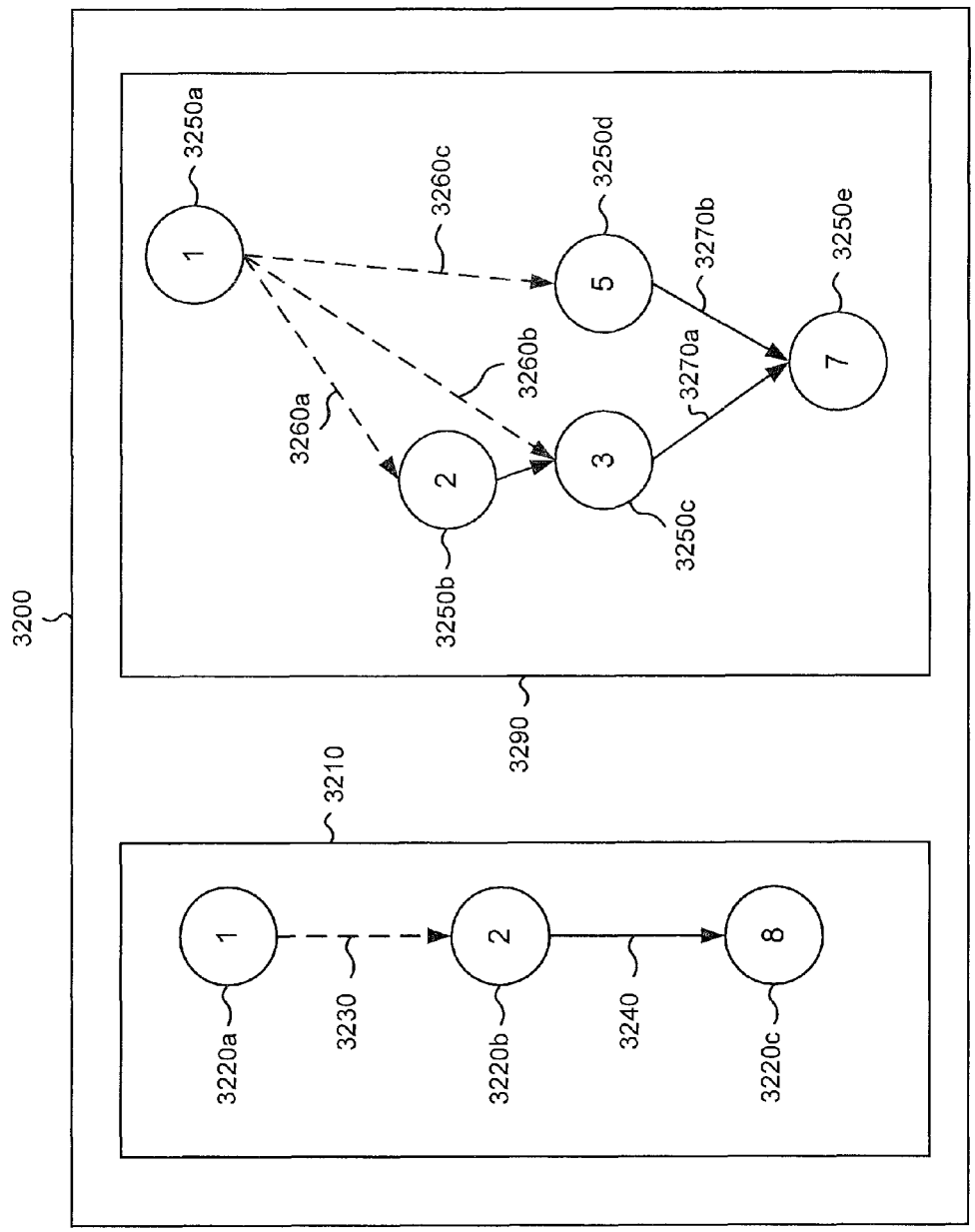
FIG. 32 illustrates an example of a sliced PDG.

For example, FIG. 32 illustrates an example 3200 of how PDG 3100 may be sliced. Referring to FIG. 32, PDG 3100 may be sliced into two slices. A first slice 3210 may include nodes 3220a-c, edge 3230, and edge 3240. A second slice 3290 may include nodes 3250a-e, edges 3260a-c, and edges 3270a-b. Nodes 3220a-c include numbers that represent line numbers of statements in code 2900 that are associated with the nodes 3220a-c. For example, node 3220a contains the number "1", which is associated with the statement at line number 1 (i.e., "IF(X)") in code 2900. Edge 3230 indicates a control dependency between the statement at line number 1 (represented by node 3220a) and the statement at line number 2 (represented by node 3220b) in code 2009. Edge 3240 indicates a data dependency between the statement at line number 2 and the statement at line number 8 in code 2900.

Likewise, in slice 3290, nodes 3250a-e includes numbers that represent line numbers of statements in code 2900 that are associated with the nodes 3250a-e. For example, node 3250a contains the number "1", which is associated with the statement at line number 1 (i.e., "IF(X)") in code 2900. Edge is 3260a-c indicate control dependencies between statements in code 2900 that are represented by nodes 3250a-d. For example, edge 3260a indicates a control dependency exists between the statement at line number 1, represented by node 3250a, and the statement at line number 2, represented by node 3250b, in code 2900. Edges 3270a-b indicate data dependencies between statements in code 2900 that are represented by nodes 3250c-e. For example, edge 3270a indicates a data dependency exists between the statement at line 3, represented by node 3250c, and the statement at line number 7, represented by node 3250e, in code 2900.

Slicing code, such as described above, may be used to identify pieces of generated code that may be separately verified. For example, based on the above slices 3210 and 3290, the statements in code 2900 represented by nodes 3220a-c may be verified separately from the statements in code 2900 represented by nodes 3250a-e. Moreover, after a piece of code is identified, a corresponding portion of the model, which corresponds to the identified piece of code, may be identified. After identifying the piece of code and its corresponding portion of the model, equations (10) and (11) may be identified.

After equations (10) and (11) have been identified, a determination may be made as to whether the following equations holds: $F_j(U_i,P_m,D_n)==F'_j(U'_i)$ (12). The following determinations may be derived from equation (12): $(U_i,P_m,D_n)==(U'_i)$ (13) and $F_j==F'_j$ (14).

For equation (13), The meaning of an argument may be highly predictable by examining a limited number of use cases. A framework may be provided (e.g., in the form of an API), which may support describing a behavior of generated code. The TCE 200 may leverage this framework to determine whether equation (13) holds (e.g., is true).

Equation (14) may be further decomposed into pattern, normalization, and verifier. Pattern may refer to an expected pattern and an actual pattern. In equation (14), $F_j$ may represent the expected pattern and $F'_j$ may represent the actual pattern. The expected pattern may be derived from an IR of the model and the actual pattern may be derived from the code generated from the model.

Normalization may involve performing a semantic equivalent transform on both $F_j$ and $F'_j$, which may convert $F_j$ and $F'_j$ into $F_j^{normalized}$ and $F'_j^{normalized}$, respectively. Assuming $F_j^{normalized}$ is equivalent to $F_j$ and $F'_j^{normalized}$ is equivalent to $F'_j$, then it may be said that equation (14) may hold if $F_j^{normalized}==F'_j^{normalized}$ (15). Linker may involve performing a structural equivalence check of $F_j^{normalized}$ and $F'_j^{normalized}$ to determine whether equation (15) holds.

F may be a collection of f of one or more blocks contained in a model. A semantic of a block may be deterministically determined by the block's type and configuration. An initial state f of a block semantic may be constructed prior to verification. The initial state f of a block, may serve as an expected pattern.

A "to verify" pattern may be derived from code that is generated from blocks in the model that are associated with F. The TCE 200 may use a parser (e.g., ELSA), to parse the generated code to generate an AST associated with the "to verify" pattern. The TCE 200 may further convert the AST to an IR that may be used by the TCE 200 compare the "to verify" pattern with the expected pattern to determine whether they are equivalent.

Due to various functions performed during code generation, such as optimization and lowering of code, high-level semantics of a model, such as model 230, the code generated for the model may follow various patterns. For example, a functionality of a gain block may be defined as "y=k×u", where "y" represents a value of a signal that may be output from the gain block, "u" represents a value of a signal that is input into the gain block, and "k" represents a gain of the gain block. Code generated from the block may follow the following semantically equivalent patterns:

(1) y = k x u
(2) y = u x k
(3) y = u << k', where k = $2^{k'}$
(4) y(i) = k(i) x u(i), where i = 1, 2, ..., N
(5) y(i) = k x u(i), where i = 1, 2, ..., N Pattern (1) may be a default form that is used as a default for code generated from the gain block. Pattern (2) may be a form that may be used due to a commutative operation being allowed in a target language of the generated code. Pattern (3) may be used due to a performance oriented transform. The transform may be premised on a left shift operation being faster that a multiplication operation. Patterns (4) and (5) may relate to the concept of "lowering". Lowering may be related, for example, to a semantic intensity of a language. For example, if a first target language for the generated code is an array-based language, such as the MATLAB language, the array operation in patterns (4) and (5) may be performed in a single statement. On the other hand, if a second target language for the generated code is a non-array based language, such as C, the array operation may be performed using several statements rather than a single statement. The first target language may be said to be more semantically intense than the second target language, with respect to the array operation, because the first target language may perform the array operation in a single statement whereas the second target language may require more than one statement to perform the same array operation. In addition, moving from a language that may handle the operation in a single statement to a language that may handle the same operation using several statements may be considered a form of lowering.

A way to perform verification of the code generated from the gain block may include constructing various forms and then try to match them. This approach may require that conditions related to different patterns be known in advance.

A pattern of a semantic may vary because of the following:
a) Model configuration
b) Block configuration
c) Lowering
d) Optimization
e) Semantic(s) of a different language In some environments, "a", "b" and "e" above may be readily determined whereas "c" and "d" may not (e.g., they may be somewhat "black box"). Here, predicting what optimization may happen and how it works may generally be impractical. However, suppose the optimization involves, for example, performing a verification-oriented transform (e.g., semantic equivalence transform) instead of a performance or other optimization transform. The verification transform may transform patterns in code that have the same semantics to a particular (formal) pattern. Then it may be expected that the generated code is verifiable.

For example, the form "y=u<<k', where k=$2^{k'}$" may be re-written into the form "y=u×k, where k=$2^{k'}$". This rewriting may be a semantic equivalent transform and if the latter pattern is verified, it may be said that the former pattern is verified as well. TCE 200 may implement various semantic equivalent transforms to handle different patterns of generated code. These equivalent transforms may include one or more of the following.

In equation (1) code generated by TCE 200 may include different identifiers for $y_{block}$ and $y_{block}$ if temporary variables are used. This situation may be related to the following cases: (1) Optimizations to eliminate temporary variable usage and (2) Semantics of the target language may require that temporary variables be used to implement functionality.

Case "1" may be related to an optimization that may involve eliminating superfluous local variables (sometimes referred to as expression folding). This optimization, in general, may control whether generated code should use temporary variables or not. Verification may perform global expression folding to mask the effect of this optimization.

Case "2" may be related to the target language itself. The language may not provide an option to control this case or alternatives may be difficult to implement. A typical scenario may be the presence of switch logic. Global expression folding may not get rid of the usage of temporary variables in this scenario. However, during verification of generated code, the generated code verification process may introduce an IR, i.e., a phi node, to handle temporary variables in this scenario. A phi node may be used to represent various code in generated code.

Figure 33:
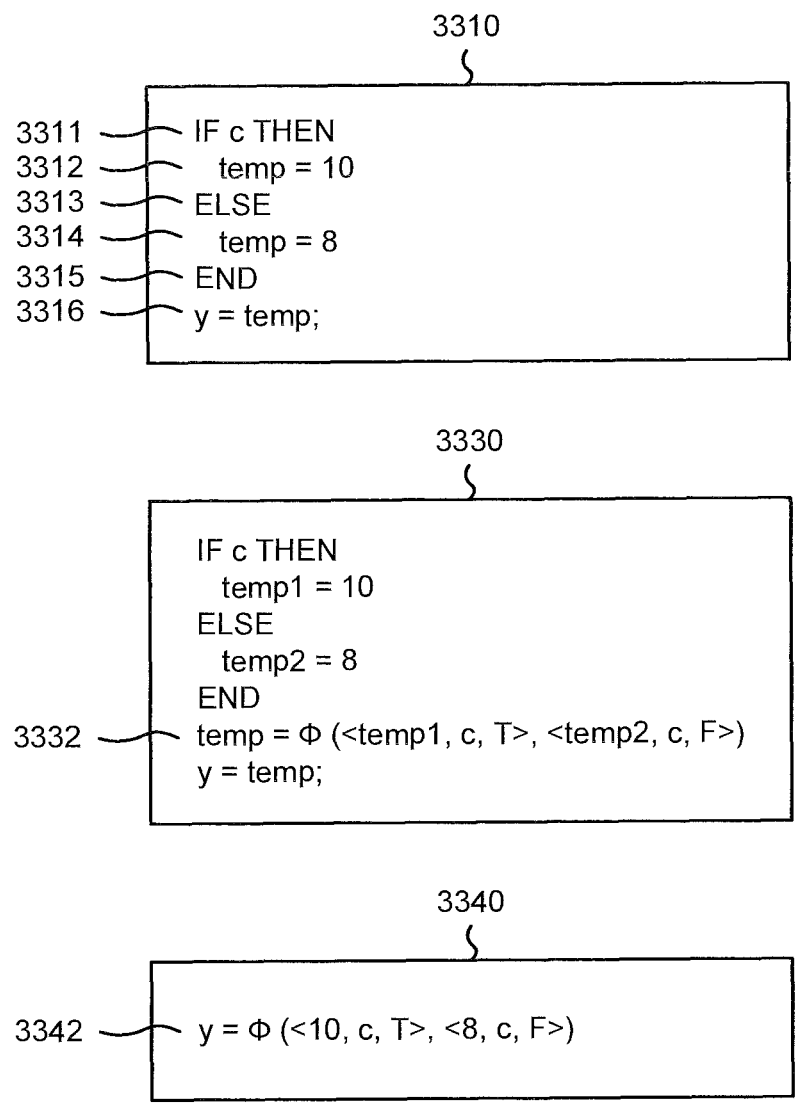
FIG. 33 illustrates an example of using a phi node to represent code generated for a model.

FIG. 33 illustrates examples of using a phi node to represent code generated for a model. Referring to FIG. 33, suppose the code 3310 is code that is generated from a model. Note that the code 3310 includes switch logic, which is encoded in statements at lines 3311-3316. The switch logic involves determining if a condition "c" exists. If so, the statement at line 3312 assigns a value of 10 to a variable named "temp". Otherwise, if the condition "c" does not exist, the statement at line 3314 assigns a value of 8 to the variable "temp". The statement at line 3316, assigns the value of "temp" to a variable named "y".

Code 3330 includes an example of a phi node 3332 that may be used to perform an assignment of the variable named "temp". In code 3330, if the condition "c" is true, a variable named "temp1" is set to 10. Otherwise, if the condition "c" is false, the value of a variable named "temp2" is set to 8. The phi node 3332 indicates that if "c" is a true, then the value held by the variable named "temp1" is assigned to the variable named "temp", otherwise, if "c" is false, then the value held by the variable named "temp2" is assigned to "temp".

Code 3340 includes an example of a phi node 3342 that collapses the switch structure into a single line. In addition, the phi node 3342 eliminates the use of the temporary variables (i.e., "temp1", "temp2", and "temp"). In phi node 3342, "y" represents the variable "y", "c" represents the condition "c", "T" represents the condition "c" being true, and "F" represents the condition "c" being false. Thus, phi node 3342 represents the following: the variable named "y" is set to the value of 10 if the condition "c" is true, otherwise, if the condition "c" is false, the variable named "y" is set to the value of 8.

Figure 34A:
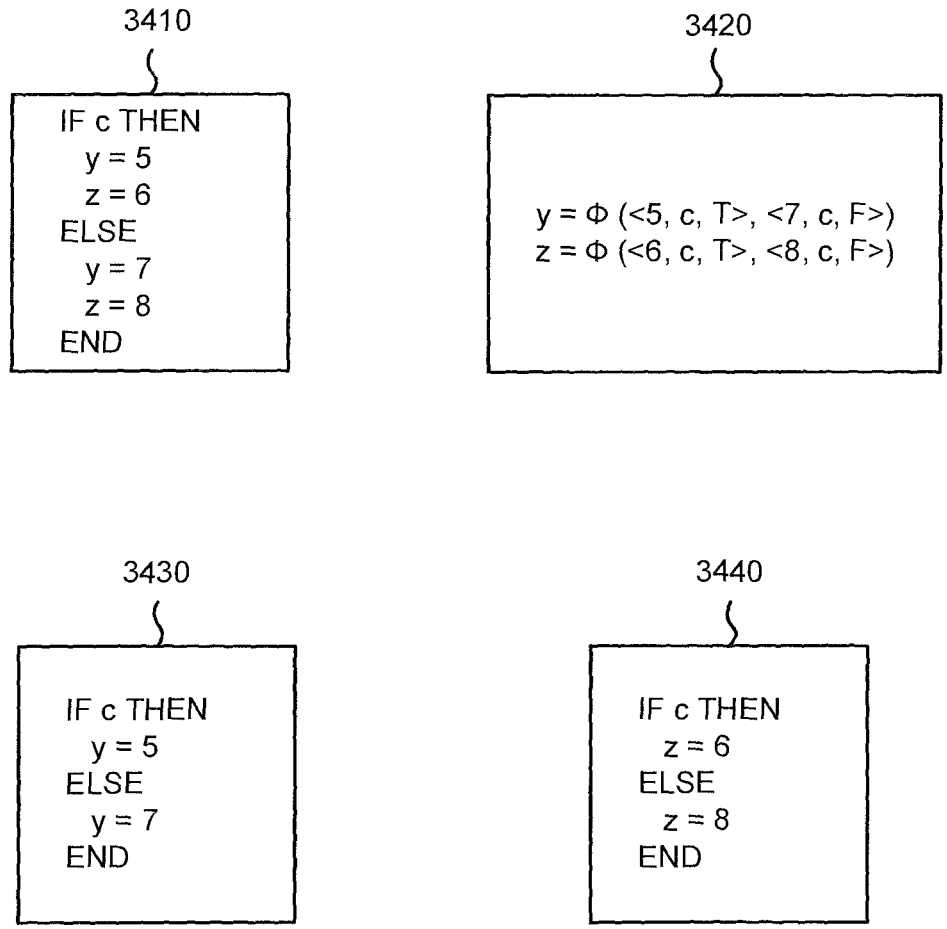
FIG. 34A-B illustrate slicing of code.
Figure 34B:
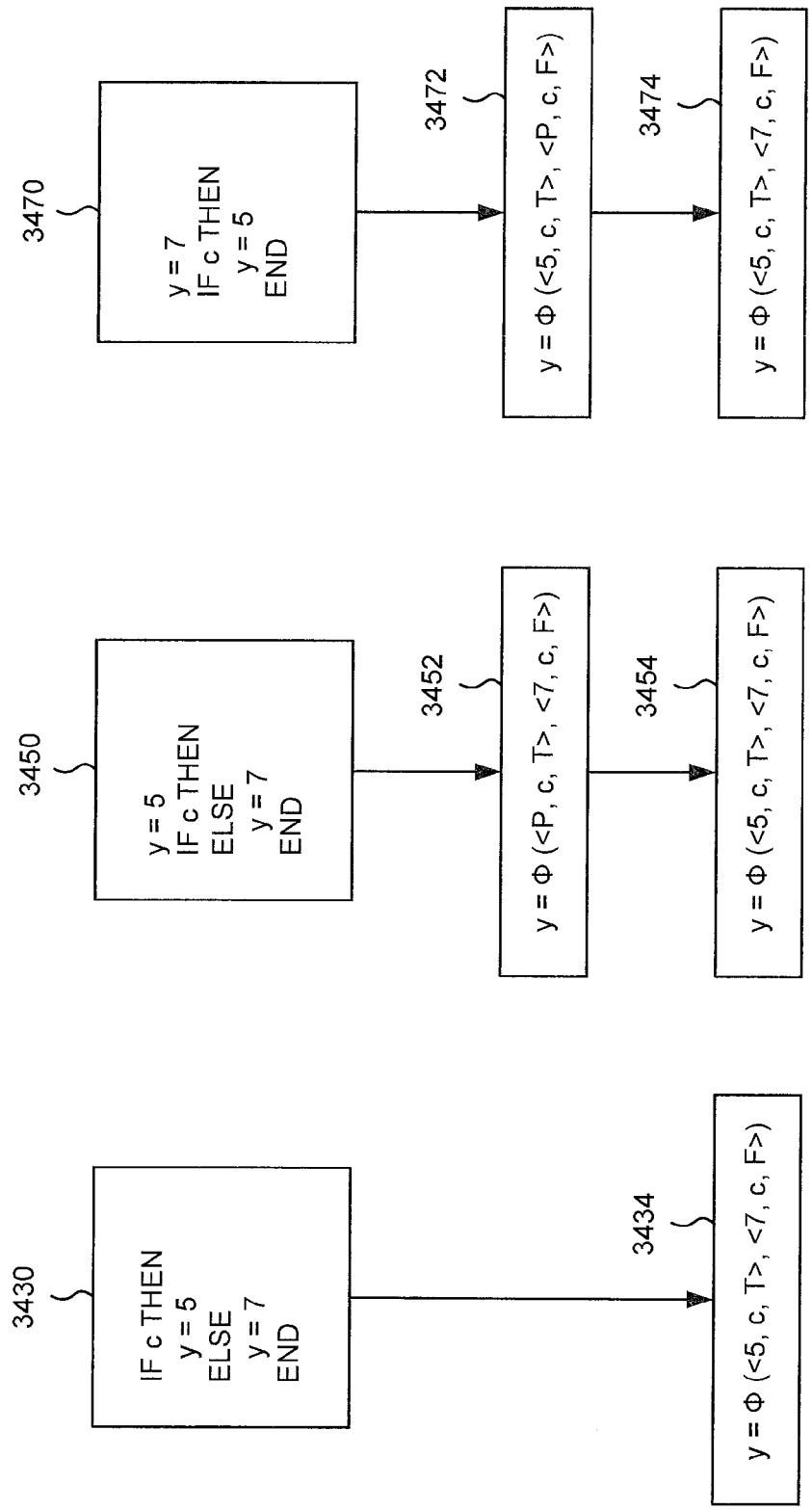

FIG. 34A-B illustrate slicing of code. Referring to FIG. 34A, block 3410 shows example code which could be expected code or generated code. Block 3420 shows phi nodes that represent the code in block 3410. Block 3430 shows a first slice of the code in block 3410. The first slice may be based on a point of interest which may be the variable "y". The first slice may be derived from phi node information contained in block 3420. Block 3440 show a second slice of the code in block 3410. The second slice may be based on a point of interest which may be the variable "z". The first slice may be derived from phi node information contained in block 3420.

Suppose the block 3430 is a slice of expected code. Referring to FIG. 34B blocks 3450 and 3470 may be different forms of code that may be generated. Block 3434 shows a phi node that may be generated from the code in block 3430. Block 3452 shows a phi node that may be generated from the code in block 3450. Block 3472 shows a phi node that may be generated from the code in block 3470. Block 3454 shows a phi node that may be generated from the phi node in block 3452 after the phi node in block 3452 is normalized. Normalization may involve removing "P" which represents a previously assigned value and replacing it with the actual previously assigned value. Blocks 3472 and 3474 show this process for block 3470. Verification of the generated code and the expected code may be performed by comparing the resultant phi nodes in block 3434, 3454, and 3474 to determine whether they are equivalent.

A constant value, which may be contained in code generated from a model, may be categorized as non-tunable or tunable. A non-tunable constant value may be represented in the code as the following representations: (a) a literal value (e.g., 888), or (b) a variable with "const" qualifier (e.g., const int Param_Gain1=888).

A constant may use most any valid data type. In some situations, a constant may be an array data type or a "struct" data type. Examples of data types for constants may include: (1) a built-in data type (e.g. int16, int32), (2) an array data type (e.g. int16[3]), and (3) a struct data type (e.g. bus1, where bus1 has two fields int a, int b). If the constant is a built-in data type, then representations "a" and "b" above could be used to represent the constant in the generated code. If the constant is an array data type, then only representation "b" may be used to represent the constant in the generated code.

If the constant is a struct data type, then representations "a" or "b" may be used to represent the constant in the generated code. For representation "a", the struct data type may be unrolled, so that a literal may be assigned to each field. A tunable constant value may use a variable without a "const" qualifier in the target code. For a non-tunable constant, a literal value may be directly used. Here, further normalization may not be necessary.

Figure 35:
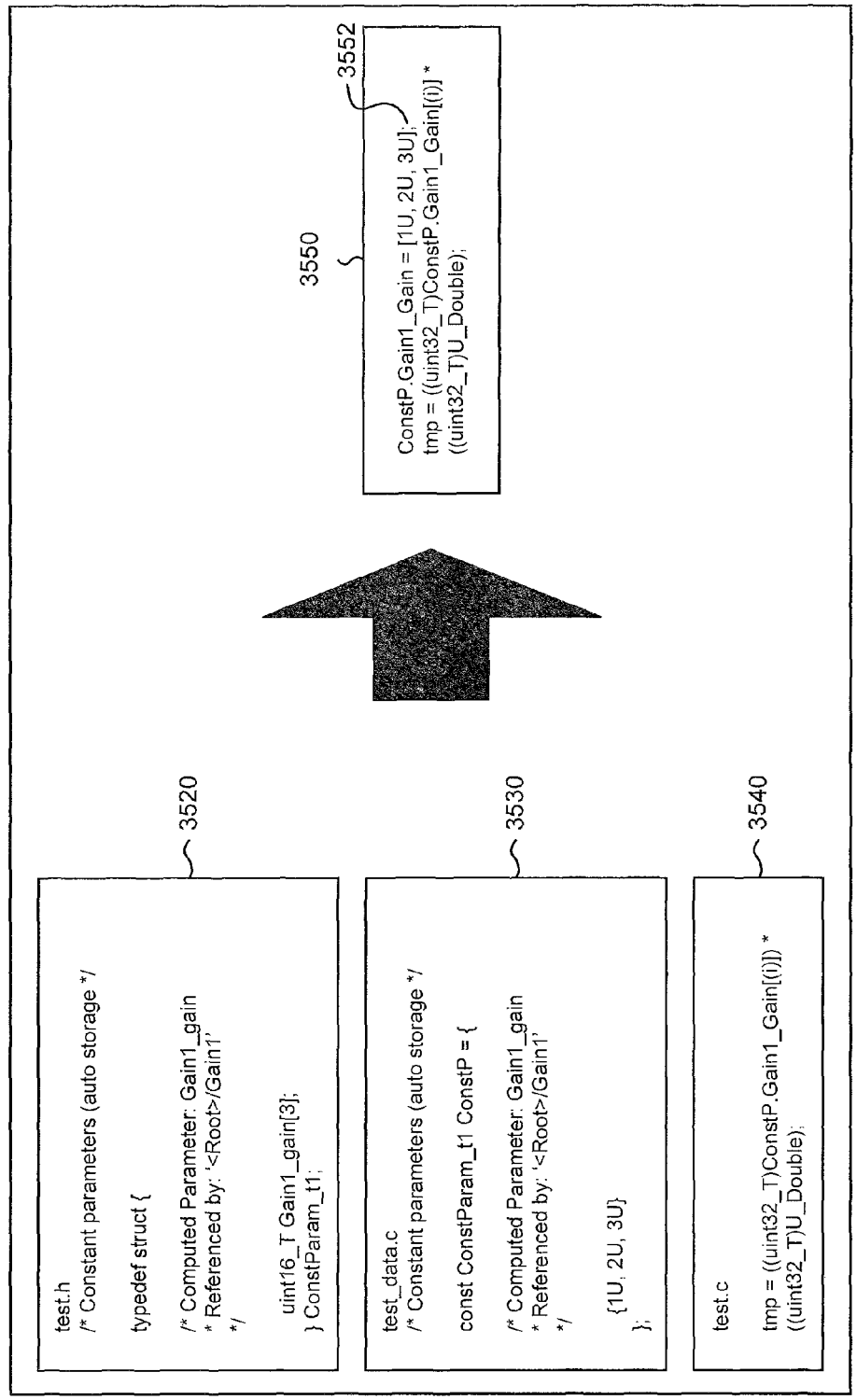
FIG. 35 illustrates an example normalization that may be applied to code generated for a model.

If a variable with a "const" qualifier is used, then normalization of "const" may convert the initialization of that "const" variable to an assignment and insert that into the proper scope IR. FIG. 35 illustrates an example normalization that may be applied to code generated for a model.

Referring to FIG. 35, the code in box 3520 defines a data type named "ConstParam_t1", which is a structure that contains a field named "Gain1_Gain". The field "Gain1_Gain" is defined in the code in box 3520 as a three element array of unsigned integers. The code in box 3530 declares a constant named "ConstP" whose data type is "ConstParam_t1". Further in the code in box 3530, "ConstP.Gain1_Gain" is defined as the array "{1U, 2U, 3U}". The code in box 3540 includes a statement which uses "ConstP.Gain1_Gain" in a calculation, the result of which is assigned to a variable named "tmp". A normalized IR of the code in boxes 3520, 3530, and 3540 is shown in box 3550. Specifically, normalization may include inserting statement 3552 into the IR as shown in block 3550.

Various optimizations may be performed by on a constant during code generation. These optimizations may include folding. In some environments, disabling this optimization may not be an option. Moreover, predicting how this optimization may work may be difficult.

To address these issues, an environment, such as TCE 200, may perform a maximum constant folding on both an expected pattern and a "to verify" pattern to minimize uncertainty that may be caused by folding. This may dramatically enhance the robustness of the environment.

Suppose, for example, that an expected pattern for code generated from a model is "3×5" and a "to verify" pattern of the code is "10+5". TCE 200 may consider the expected pattern and "to verify" pattern equivalent since the code in both patterns may be folded to the value 15. Note that TCE 200 may employ, for example, tagging and traceability, to reveal an evolution that led to the formation of the value 15 and thus help flag this situation.

Types (e.g., data types) used in generated code may be limited by target hardware that may execute the code. In choosing a type the TCE 200 may generally consider accuracy and efficiency. An alias term for type is container. A first container that is bigger than a second container may mean that the first container may have more bits than the second container and thus the first container may represent a value that is to a true value.

In some programming languages (e.g., C language), a variable may be associated with a type specifier. The type specifier may act as a container for the variable. Conversion rules may be used to derive intermediate container information. An explicit cast expression may be used to store a value, held by a variable of a certain type, into a new container provided the cast expression satisfies certain conversion rules. Converting a value, due to a cast expression, may fall into the following cases: (1) Convert a smaller container to a bigger container, (2) Convert a container to a same size container, (3) Convert a bigger container to a smaller container.

A "minimum container" may be defined as follows. Given an expression and all its possible containers C, a minimum container (i.e., $C_{minimum}$) is the one that is either equal to or smaller than any $c_i$, where $c_i \epsilon C$. It should be noted that a minimum container may determine an accuracy of a value that may be associated with an expression.

Regarding the above-mentioned three cases, $C_{minimum}$ for cases "1" and "3" may be the smaller container. For case "2", since conversion is between the same sized container, $C_{minimum}$ is the container itself.

In case "1" and case "2", a cast expression may be normalized with the expression itself without losing semantics. For case "3", a cast may not be normalized. Thus, for case "3", TCE 200 may (a) keep the cast or (b) remove the cast and use an expression to carry the container information.

Thus, normalization performed by the TCE 200 may involve:

1) A semantic equivalent transform may be performed on both an expected pattern and a "to verify" pattern, in addition, if multiple IR expressions have the same semantic, one may be chosen and all the others may be re-presented;
2) If an expression semantic is a subset of another IR semantic, the super set semantic may be used instead of the subset semantic;
3) If complex expression may be represented by a simple expression, then the simple expression may be used instead of the complex expression; and/or
4) If a semantic equivalent transform is performed on a "to verify" pattern, it may be uniformly performed on the IR and may be complete.

Referring back to FIG. 28, the linker 2880 may establish whether structurally $F_j^{normalized}$ and $F'_j^{normalized}$ are equivalent. For example, $F_j^{normalized}$ and $F'_j^{normalized}$ may be represented in a graph (e.g., tree) form. Linker 2880 may first determine whether $Root_j^{normalized}$, which is the root of the graph representing $F_j^{normalized}$, is equivalent to (e.g., is the same as) $Root_j^{normalized}$, which is the root of the graph representing $F_j^{normalized}$. If so, linker may follow the same kind of edges in both graphs to check whether vertices $v_i^{normalized}$ and $v'_i^{normalized}$, which depend on the roots, are equivalent. This process may continue for other edges and vertices in the graph to ensure the graphs are structurally equivalent.

A formal definition of structural equivalence may as follows:

1) Edge equivalence; $e_i = e'_i$ if
   a) $e_i$ and $e'_i$ are the same kind (e.g., control dependency true, control dependency false, and data dependency);
   b) $v_i^{source}$ of $e_i$ is equivalent to $V'^{source}_i$ of $e'_i$;
   c) $v_i^{dest}$ of $e_i$ is equivalent to $v'^{dest}_i$ of $e'_i$
2) Vertex equivalence; $v_i = v'_i$ if
   a) Identifier is same if $v_i$ and $v'_i$ are expression variable, or
   b) Functionality is same if $v_i$ and $v'_i$ are NOT expression variable.

A target language may support commutative expressions. Thus, when checking for structural equivalence between an IR for an expected pattern and an IR for a "to verify" pattern for code written in such a language, edges in the IRs for nodes associated with commutative expressions may be un-ordered and may need to be exhausted. Also, when checking "type equivalence" in during a structural equivalence check, the following heuristic may be used: if the generated code uses an equivalent or bigger container than an expected minimum container, then type is verified.

In general, a linker, such as linker 2880, may:
1) Establish $Y_i = Y'_i$, where $0 < i < N$ between what code is expected and what code may be generated; and/or
2) Examine an output, update, initialize(registration), init, and start functions in the generated code; and/or
3) not verify certain code if the code doesn't impact an output Y (e.g., the code may not be verified if the code is "dead code").

Figure 36:
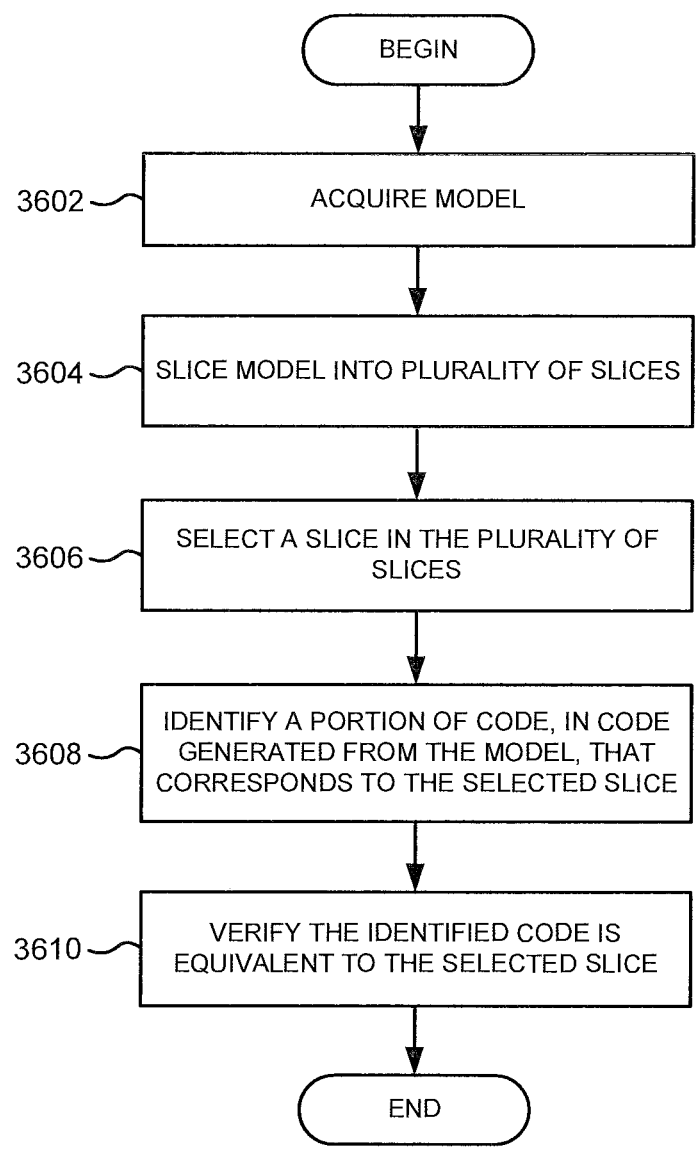
FIG. 36 illustrates a flow diagram of example acts that may be used to slice a model into a plurality of slices and perform various actions on the slices.

FIG. 36 illustrates a flow diagram of example acts that may be used to slice a model into a plurality of slices, select a slice in the plurality of slices, identify generated code that corresponds to the selected slice, and verify that the identified code is equivalent to the selected slice. Referring to FIG. 36, at block 3602, a model is acquired. The model may be acquired, for example, by reading the model or receiving the model from a file, database, storage device, via a user interface, or a communications network.

At block 3604, the model may be sliced into a plurality of slices. The slices may be identified using various criteria, such as outputs produced by the slices, types of blocks, verifiable/unverifiable portions of the model, or other criteria. For example, as noted above with respect to FIG. 19, model 1900 may be sliced based on verifiable portions in the model 1900.

At block 3606, a slice in the plurality of slices may be selected. The slice may be selected based on various criteria, such as complexity of the slice, outputs produced by the slice, or other criteria. The slice may be selected manually, for example, by a user via an interface, or automatically, for example, by a verification tool, such as code verifier 250.

At block 3608, a portion of code associated with the selected slice is identified. The portion of code may be contained in code generated from the model. The portion of code may correspond to the selected slice.

At block 3610, verification is performed to determine if the identified code is equivalent to the selected slice. Here, verification may involve generating an IR of the selected slice, generating an IR of the identified code, normalizing the IRs, and determining whether the normalized IR of the selected slice is equivalent to the normalized IR of the identified code.

Figure 37:
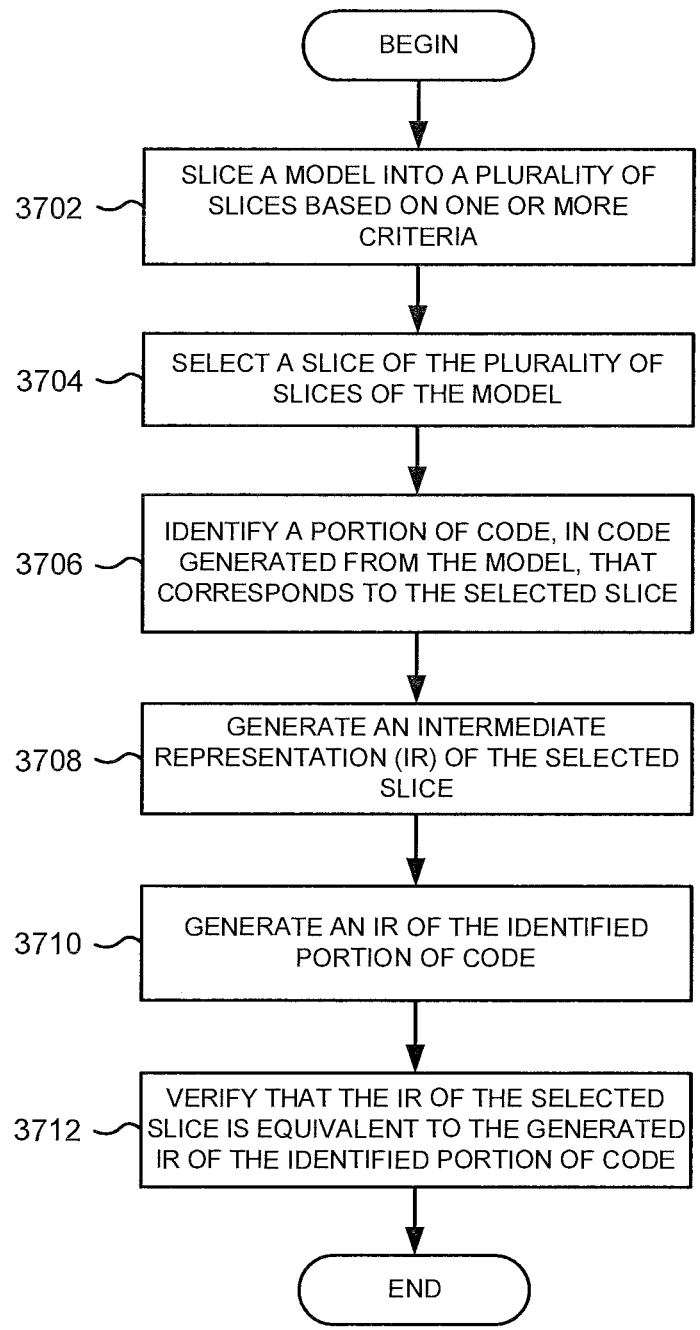
FIG. 37 illustrates a flow diagram of example acts that may be used to slice the model into a plurality of slices and perform various actions on the slices.

FIG. 37 illustrates a flow diagram of example acts that may be used to slice the model into a plurality of slices, select a slice of in the plurality of slices, identify generated code that corresponds to the slice, and verify that the selected slice is equivalent to the identified code using IRs of the code and the slice. Referring to FIG. 37, at block 3702, a model is sliced into a plurality of slices based on one or more criteria. As noted above, the criteria may include, for example, outputs produced by the slices, types of blocks, verifiable/unverifiable portions of the model, or other criteria.

At block 3704, a slice in the plurality of slices is selected. The slice may be selected such as described above. At block 3706, a portion of code, in code generated for the model, that corresponds to the selected slice is identified. The portion of code may be identified such as described above.

At block 3706, a portion of code generated from the model that corresponds to the selected slice is identified. The portion of code may be identified based on various criteria, such as functionality of the code and the corresponding selected slice, information (e.g., tags, comments) contained in the portion of code, or other criteria.

At block 3708, an IR of the selected slice is generated. The IR may include a graph. The IR may contain vertices that may represent functionality associated with the selected slice and edges that indicate a relationship (e.g., data flows, control flows) between functionality represented by the vertices.

At block 3710, an IR of the identified portion of code may be generated. The IR may include a graph. A vertex in the IR may represent a statement of portion of code and an edge may represent a dependency (e.g., data dependency, control dependency) relationship between two distinct vertices in the IR.

At block 3712, a verification may be performed to determine whether the IR of the selected slice is equivalent to the IR of the identified portion of code. The verification may involve analyzing the IR of the selected slice and the IR of the identified portion of code to determine whether they are equivalent.

Figure 38:
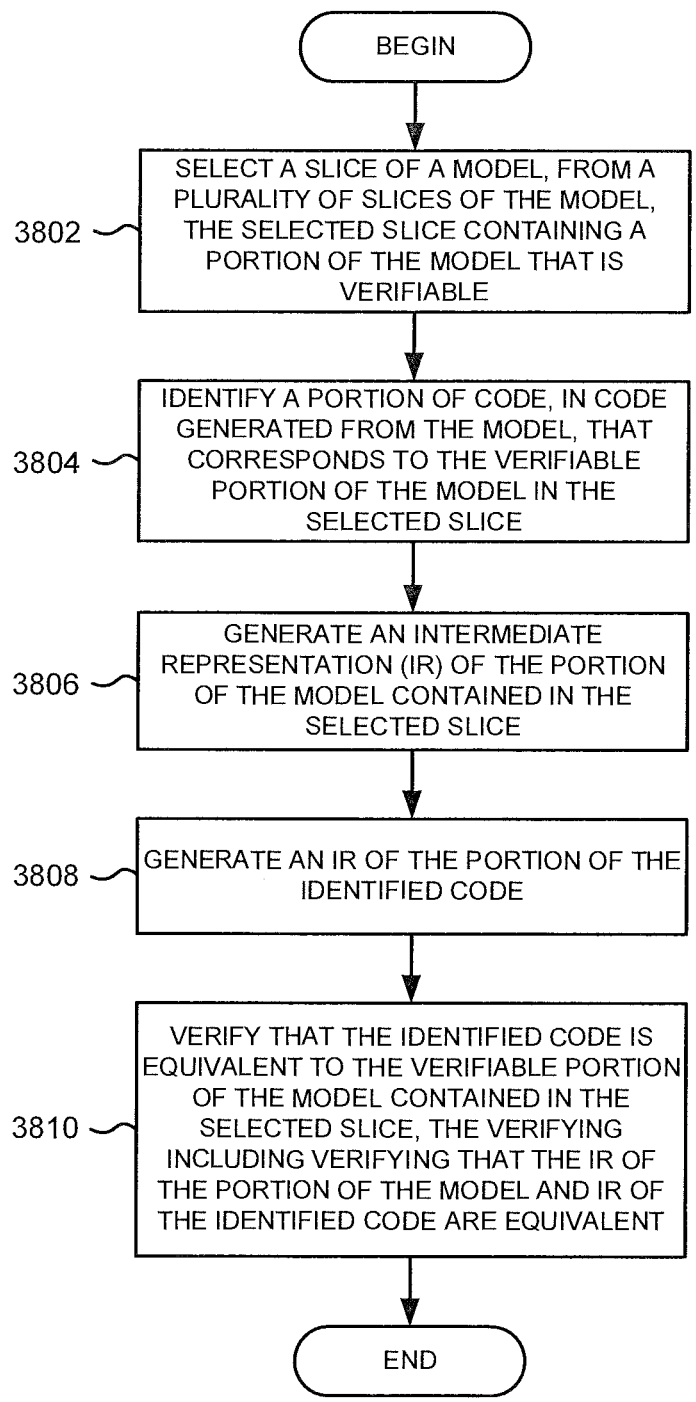
FIG. 38 illustrates a flow diagram of example acts that may be used to verify verifiable portions of a model with code generated for those portions in accordance with an embodiment of the invention.

FIG. 38 illustrates a flow diagram of example acts that may be used to verify verifiable portions of a model with code generated for those portions in accordance with an embodiment of the invention. Referring to FIG. 38, at block 3802, a slice of a model is selected from a plurality of slices of the model. The selected slice may contain a portion of the model that is verifiable. The portion of the model may be considered verifiable based on various criteria. For example, the portion of the model may be considered verifiable if the portion contains elements that are recognized (as opposed to unidentifiable/unknown elements).

At block 3804, a portion of code, generated from the model, that corresponds to the verifiable portion of the model contained in the selected slice, is identified. The portion of code may be identified as described above.

At block 3806, an IR of the verifiable portion of the model contained in the selected slice is generated. The IR may be generated as described above.

At block 3808, an IR of the portion of the code identified at block 3804 is generated. The IR may be generated as described above.

At block 3810, a verification is performed to determine whether the identified code is equivalent to the verifiable portion of the model contained in the selected slice. The verification may include verifying that the IR generated at block 3806 is equivalent to the IR generated at block 3808.

Figure 39:
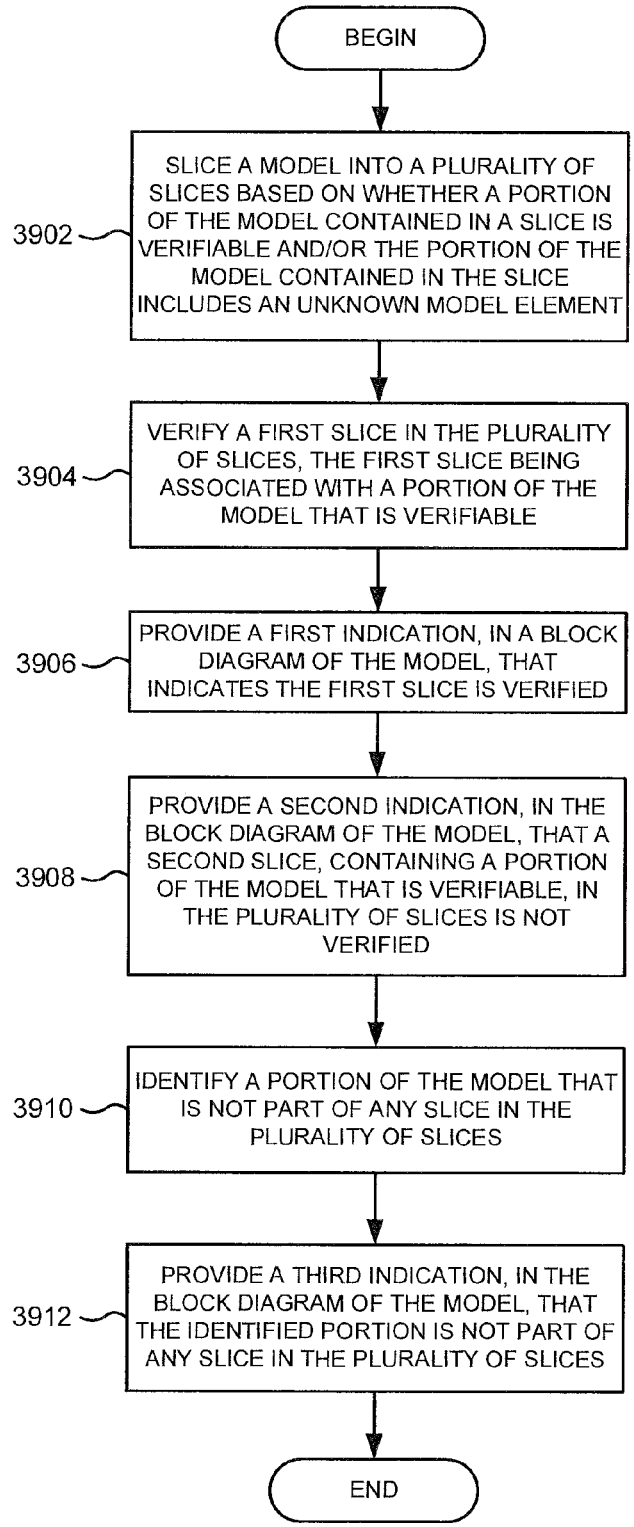
FIG. 39 illustrates a flow diagram of example acts that may be used to provide various indications in a block diagram of a model of various statuses associated with portions of the model.

FIG. 39 illustrates a flow diagram of example acts that may be used to provide various indications in a block diagram of a model of various statuses associated with portions of the model. Referring to FIG. 39, at block 3902, a model is sliced into a plurality of slices based on whether a portion of the model, contained in the slice, is verifiable and/or the portion of the model contains an unknown element. An unknown element may be an element that may not be verifiable because, for example, functionality associated with the element may be unknown or unrecognizable.

At block 3904, a first slice in the plurality of slices of the model is verified. The first slice may be associated with a portion of the model that is verifiable.

At block 3906, a first indication that indicates one or more elements in the first slice are verified is provided. The indication may be provided in a block diagram of the model. The indication may include presenting the one or more elements differently than elements that have not been verified. For example, the one or more verified elements may be displayed in a color that is different than the unverified elements.

At block 3908, a second indication is provided in the block diagram of the model. The second indication may indicate that a second slice, containing a portion of the model that is verifiable, has not been verified. For example, the second slice may contain one or more blocks of the model that are verifiable but have not been verified. At block 3908, the fact that the blocks are verifiable but have not been verified may be indicated in the block diagram (e.g., using a color that may indicate this distinction).

At block 3910, a portion of the model that is not part of any slice in the plurality of slices is identified. Identifying the portion may involve comparing the elements in the model with elements of the model contained in the slices and identifying those components that are in the model that are not contained any of the slices.

At block 3912, a third indication is provided in a block diagram of the model. The third indication may indicate the portion of the model that was identified at block 3910 that is not part of any slice in the plurality of slices.

Figure 40A:
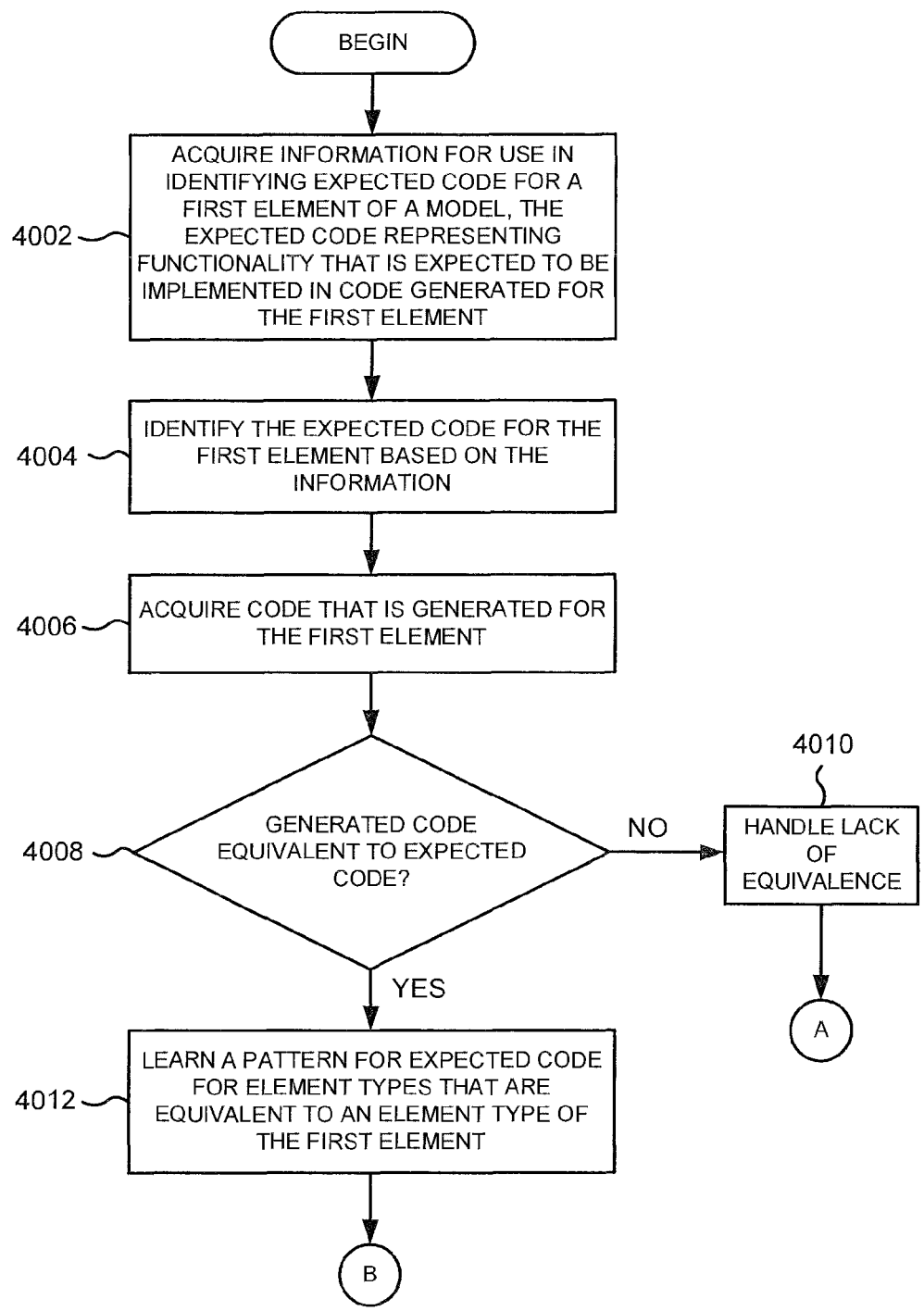
FIGS. 40A-B illustrate a flow diagram of example acts that may be used to learn a pattern for expected code for a particular block type and use the learned pattern to verify code generated for blocks of that block type.
Figure 40B:
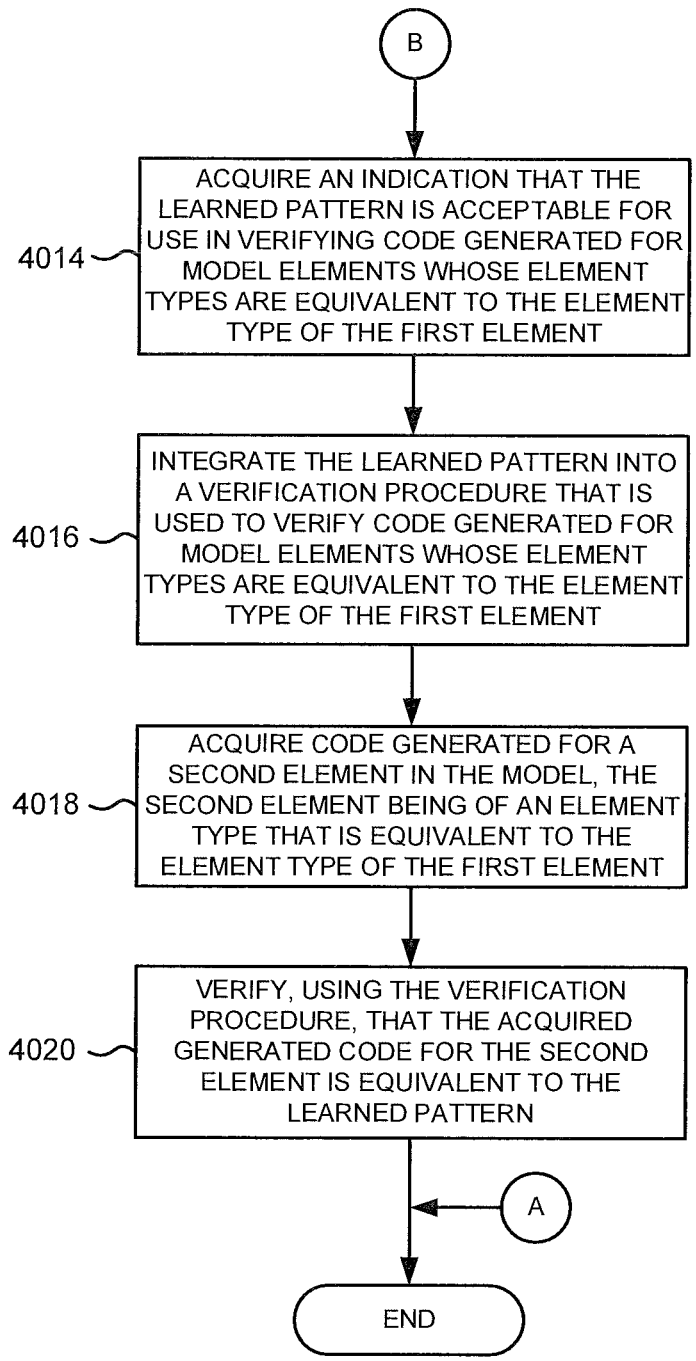

FIGS. 40A-B illustrate a flow diagram of example acts that may be used to learn a pattern for expected code for a particular element type and use the learned pattern to verify code generated for elements of that element type. Referring to FIG. 40A, at block 4002, information for use in identifying expected code for a first element in the model is acquired. The information may be acquired by reading the information from a file or database, receiving the information via an interface (e.g., a GUI, command line interface), receiving the information via a network, or otherwise acquiring the information. The information may include the expected code for the first element. Moreover the information may contain annotations that may be used to identify the expected code. For example, the annotation may include tags, comments, or other forms of annotations that may be used to identify expected code associated for the first element. The expected code may represent functionality that is expected to be implemented in code that is generated for the first element.

At block 4004, the expected code is identified using the information. For example, suppose the first element is a gain block in the model, the acquired information is a tag that indicates the first element is a gain block, the expected code is contained in a file, and that the location in the file that contains the expected code is tagged with a tag that matches the acquired annotation. The expected code may be identified by searching the file for the matching tag and reading the code associated with the matching tag from the file.

At block 4006, code that is generated for the first element is acquired. The generated code may be acquired by reading the code from a file or database, receiving the code via an interface (e.g., a GUI, command line interface), receiving the code via a network, or otherwise acquiring the code.

At block 4008, a check is performed to determine whether the generated code and the expected code are equivalent. The code may be checked for equivalence as described above.

If the generated code and the expected code are not equivalent, at block 4010, this lack of equivalence is handled. The lack of equivalence may be handled, for example, by providing a visual indication (e.g., in a block diagram of the model), generating an exception condition (e.g., throwing an exception, generating an interrupt), return an error code, reporting the situation in a report (e.g., an error message), or otherwise handling the condition.

If at block 4008 it is determined that the generated code is equivalent to the expected code, at block 4012 a pattern for the expected code may be learned. Learning may involve associating the identified expected code and/or the acquired information with element types that are equivalent to the element type of the first element.

At block 4014 (FIG. 40B), an indication is acquired. The indication may indicate that the learned pattern is acceptable for use in verifying elements that are equivalent to the element type of the first element. For example, the learned pattern may be presented to a user via a GUI. The user may review the pattern and provide the indication that the pattern is acceptable for use in verifying elements that are equivalent to the element type of the first element.

At block 4016, the learned pattern is integrated into a verification procedure that may be used to verify code generated from one or more elements whose element types are equivalent to the element type of the first element. For example, the pattern may be used to modify an algorithm or a behavior of an algorithm that may be used to verify elements of an equivalent type as the first element.

At block 4018, code generated for a second element in the model is acquired. The generated code may be acquired as described above. The second element may be of an element type that is equivalent to the element type of the first element.

At block 4020, generated code for the second element is verified using the learned pattern. Verification may involve generating expected code for the second element based on the learned pattern and determining whether the expected code is equivalent to the generated code for the second element, such as described above.

Figure 41:
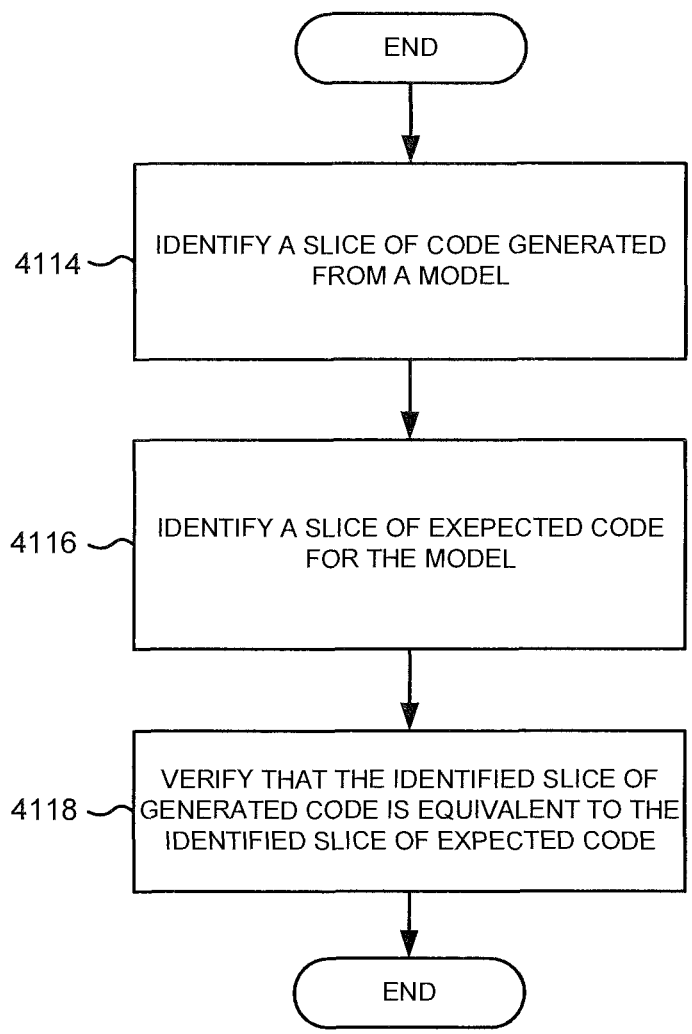
FIG. 41 illustrate a flow diagram of example acts that may be used to slice code.

FIG. 41 illustrates a flow chart that may be used to slice code. Referring to FIG. 41, at block 4114, a slice of code generated from a model is sliced. The code may be sliced by the TCE 200. Further, the code may generated by the TCE 200. The code may be sliced based on criteria. The criteria may be a point of interest such as, for example, an output or some other point of interest.

At block 4116, a slice of expected code is identified. The slice may be identified as described above. The expected code may be specified, for example, by a user, read from a file, or from some other source.

At block 4118, a verification is performed to determine whether the identified slice of generated code is equivalent to the identified expected code. The verification may be performed using various intermediate representations (e.g., graphs, phi nodes), such as described above.

Figure 42:
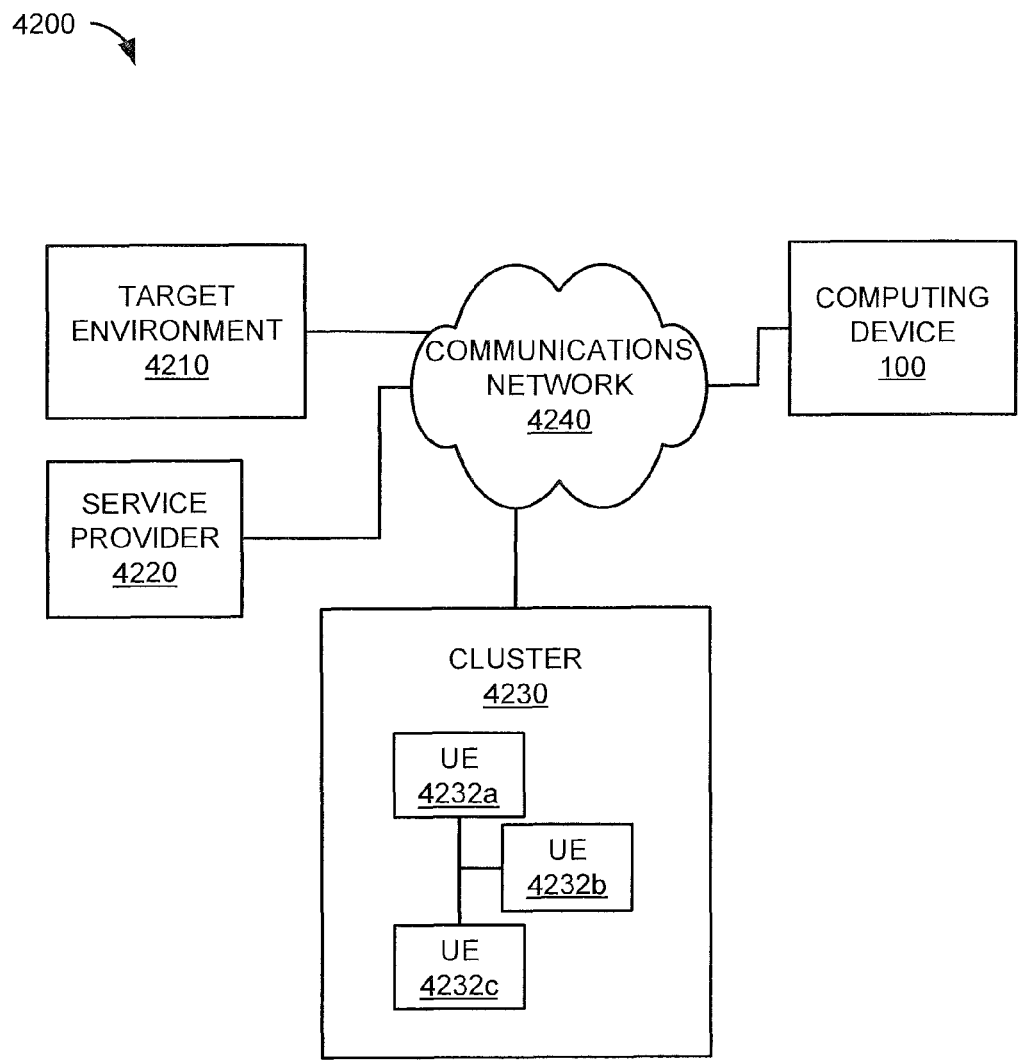
FIG. 42 illustrates an example of a distributed computing environment that may implement one or more embodiments of the invention.

One or more embodiments of the invention may be implemented in a distributed environment. FIG. 42 illustrates an example of a distributed environment 4200 that may implement one or more embodiments of the invention. Referring to FIG. 42, environment 4200 may contain various components including computing device 100, target environment 4210, service provider 4220, cluster 4230, and communications network 4240. Note that the distributed environment 4200 is just one example of a distributed environment that may be used with one or more embodiments of the invention. Other distributed environments that may be used with one or more embodiments of the invention may contain more components or fewer components than illustrated in FIG. 42. Moreover, the components in the distributed environments may be arranged differently than the arrangement shown in FIG. 42. In addition, the distributed environments may implement various "cloud computing" frameworks.

Details of computing device 100 were described above with respect to FIG. 1. In distributed environment 4200, computing device 100 may, among other things, exchange information (e.g., data) with other components in the communications network 4240 (e.g., target environment 4210, service provider 4220, and cluster 4230). Computing device 100 may interface with the communications network 4240 via a communication interface 180.

Target environment 4210 may be configured to interpret and/or execute, for example, one or more embodiments of the invention, which may be generated in or otherwise made available to the distributed environment 4200. The communications network 4240 may include digital and/or analog aspects. Information exchanged in communications network 4240 may include machine-readable information having a format that may be adapted for use, for example, in the communications network 4240 and/or with one or more components in the communications network 4240.

For example, the information may be encapsulated in one or more packets that may be used to transfer the information through the communications network 4240. Information may be exchanged between components in the communications network 4240 using various communication protocols, such as, but not limited to, the Internet Protocol (IP), Asynchronous Transfer Mode (ATM), Synchronous Optical Network (SONET), the User Datagram Protocol (UDP), Transmission Control Protocol (TCP), Institute of Electrical and Electronics Engineers (IEEE) 802.11, or other communication protocol.

The communications network 4240 may comprise various network devices, such as gateways, routers, switches, firewalls, servers, repeaters, address translators, etc. Some or all of the communications network 4240 may be wired (e.g., using wired conductors, optical fibers) and/or wireless (e.g., using free-space optical (FSO), radio frequency (RF), acoustic transmission paths). Portions of the communications network 4240 may include a substantially open public network, such as the Internet. Portions of the communications network 4240 may include a more restricted network, such as a private corporate network or virtual private network (VPN). It should be noted that implementations of communications networks and/or devices operating on communications networks described herein are not limited with regards to, for example, information carried by the communications networks, protocols used in the communications networks, and/or the architecture/configuration of the communications networks.

Cluster 4230 may include a number of units of execution (UEs) 4232 that may execute or interpret one or more embodiments of the invention or portions thereof on behalf of computing device 100 and/or another component, such as service provider 4220. The UEs 4232 may reside on a single device or chip or on multiple devices or chips. For example, the UEs 4232 may be implemented in a single ASIC or in multiple ASICs. Likewise, the UEs 4232 may be implemented in a single computer system or multiple computer systems. Other examples of UEs 4232 may include, for example, some combination of FPGAs, CPLDs, ASIPs, processors, multiprocessor systems-on-chip (MPSoCs), graphic processing units, and/or microprocessors. The UEs 4232 may be configured to perform operations on behalf of another component in the distributed environment 4200. For example, in an embodiment, the UEs 4232 are configured to execute portions of code associated with the TCE 200. Here, the TCE 200 may dispatch certain activities pertaining to one or more embodiments of the invention to the UEs 4232 for execution. The service provider 4220 may configure cluster 4230 to provide, for example, the above-described services to computing device 100 on a subscription basis (e.g., via a web service).

The foregoing description of embodiments is intended to provide illustration and description, but is not intended to be exhaustive or to limit the invention to the precise form disclosed. Modifications and variations are possible in light of the above teachings or may be acquired from a practice of the invention. For example, while a series of acts has been described above with respect to FIGS. 11-18, and 36-41, the order of the acts may be modified in other implementations. Further, non-dependent acts may be performed in parallel. Also, the term "user", as used herein, is intended to be broadly interpreted to include, for example, a computing device (e.g., a workstation) or a user of a computing device, unless otherwise stated.

It will be apparent that one or more embodiments, described herein, may be implemented in many different forms of software and hardware. Software code and/or specialized hardware used to implement embodiments described herein is not limiting of the invention. Thus, the operation and behavior of embodiments were described without reference to the specific software code and/or specialized hardware—it being understood that one would be able to design software and/or hardware to implement the embodiments based on the description herein.

One or more embodiments of the invention may be stored on one or more tangible non-transitory computer-readable storage media and may include computer-executable instructions that may be executed by processing logic, such as processing logic 120. The computer-executable instructions may include instructions that implement one or more embodiments of the invention. The tangible computer-readable storage media may be volatile or non-volatile and may include, for example, flash memories, dynamic memories, removable disks, and non-removable disks.

No element, act, or instruction used herein should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

It is intended that the invention not be limited to the particular embodiments disclosed above, but that the invention will include any and all particular embodiments and equivalents falling within the scope of the following appended claims.

What is claimed is:

1. One or more tangible non-transitory computer-readable storage media storing instructions, the instructions comprising:
   one or more instructions that, when executed by one or more processors, cause the one or more processors to:

slice a model into a plurality of slices,
   each slice, of the plurality of slices, including a different portion of the model;
select a slice from the plurality of slices;
generate a first intermediate representation based on the selected slice;
identify a portion of code, in code generated from the model, that corresponds to the selected slice;
generate a second intermediate representation based on the portion of code;
normalize the first intermediate representation and the second intermediate representation;
compare the normalized first intermediate representation with the normalized second intermediate representation; and
verify, based on the comparing the normalized first intermediate representation and the normalized second intermediate representation, whether the portion of code is equivalent to the selected slice.

2. The one or more tangible non-transitory computer-readable media of claim 1, where the instructions further comprise:
one or more instructions to detect, based on the comparing, a verification failure.

3. The one or more tangible non-transitory computer-readable media of claim 2, where the instructions further comprise:
one or more instructions to generate a report including information regarding the verification failure; and
one or more instructions to provide the report.

4. The one or more tangible non-transitory computer-readable media of claim 2, where the one or more instructions to detect the verification failure include:
one or more instructions to determine that the normalized second intermediate representation includes an element not corresponding with any element included in the normalized first intermediate representation.

5. The one or more tangible non-transitory computer-readable media of claim 1, where the instructions further comprise:
one or more instructions to select a second slice from the plurality of slices;
one or more instructions to generate a third intermediate representation based on the second selected slice;
one or more instructions to identify a second portion of code, in code generated from the model, that corresponds to the second selected slice;
one or more instructions to generate a fourth intermediate representation based on the second portion of code;
one or more instructions to normalize the third intermediate representation and the fourth intermediate representation;
one or more instructions to compare the normalized third intermediate representation with the normalized fourth intermediate representation; and
one or more instructions to verify, based on the comparing the normalized third intermediate representation and the normalized fourth intermediate representation, whether the second portion of code is equivalent to the second selected slice.

6. The one or more tangible non-transitory computer-readable media of claim 1, where the one or more instructions to generate the first intermediate representation include:
one or more instructions to generate an element connectivity list based on the selected slice.

7. The one or more tangible non-transitory computer-readable media of claim 1, where the one or more instructions to generate the second intermediate representation include:
one or more instructions to generate an abstract syntax tree based on the portion of code.

8. The one or more tangible non-transitory computer-readable media of claim 1, where
the instructions further comprise:
one or more instructions to generate a program dependency intermediate representation based on one or more data dependencies in the portion of the code and based on one or more control dependencies in the portion of the code, and
the one or more instructions to slice the model include:
one or more instructions to slice the program dependency intermediate representation into the plurality of slices.

9. The one or more tangible non-transitory computer-readable media of claim 8, where the program dependency intermediate representation includes a graph $G(e, v)$,
where e represents one or more edges and v represents a plurality of vertices, and
where the one or more instructions to slice the program dependency intermediate representation include:
one or more instructions to slice the program dependency intermediate representation based on determining that given a vertex $v_i$, of the plurality of vertices of the graph $G(e, v)$, a slice of graph $G(e, v)$, with respect to $v_i$, is a graph $G'(e', v')$ that contains one or more vertices, of the plurality of vertices, of which $v_i$ has a transitive flow or a control dependency.

10. The one or more tangible non-transitory computer-readable media of claim 1, where
the one or more instructions to generate the second intermediate representation include:
one or more instructions to generate a program dependency graph based on the portion of code, and
the one or more instructions to normalize the first intermediate representation and the second intermediate representation include:
one or more instructions to normalize the program dependency graph.

11. The one or more tangible non-transitory computer-readable media of claim 1, where
the portion of code contains a statement,
the instructions further comprise:
one or more instructions to identify a semantic equivalent for the statement in the portion of code; and
one or more instructions to replace the statement in the portion of code with the identified semantic equivalent, and
the one or more instructions to generate the second intermediate representation include:
one or more instructions to generate the second intermediate representation based on replacing the statement with the semantic equivalent.

12. The one or more tangible non-transitory computer-readable media of claim 1, where
the portion of code contains a plurality of statements,
the instructions further comprise:
one or more instructions to replace the plurality of statements in the portion of code with a phi node,
the phi node representing at least one of:
a control flow of the replaced plurality of statements, or a data flow of the replaced plurality of statements, and the one or more instructions to generate the second intermediate representation include:
one or more instructions to generate the second intermediate representation based on replacing the plurality of statements with the phi node.

13. The one or more tangible non-transitory computer-readable media of claim 1, where the instructions further comprise:
one or more instructions to perform a transformation operation on the second intermediate representation; and
one or more instructions to provide a result of the transformation operation performed on the second intermediate representation,
the result including information related to a change made to the second intermediate representation based on performing the transformation operation on the second intermediate representation.

14. The one or more tangible non-transitory computer-readable media of claim 1, where the instructions further comprise:
one or more instructions to identify an element in the selected slice for which corresponding code in the generated code cannot be identified; and
one or more instructions to separate the element from the selected slice for separate verification.

15. The one or more tangible non-transitory computer-readable media of claim 1, where the instructions further comprise:
one or more instructions to indicate, in a block diagram display of the model, that a portion of the model, included in the selected slice, is unverifiable.

16. The one or more tangible non-transitory computer-readable media of claim 1, where the instructions further comprise:
one or more instructions to identify an element in the selected slice which cannot be verified; and
one or more instructions to modify the identified element to make the identified element verifiable.

17. The one or more tangible non-transitory computer-readable media of claim 1, where the one or more instructions to verify whether the portion of code is equivalent to the selected slice include:
one or more instructions to verify whether the portion of code is equivalent to the selected slice independent of verifying another slice, of the plurality of slices, is equivalent to another portion of code.

18. The one or more tangible non-transitory computer-readable media of claim 17, where the other slice is unverifiable.

19. The one or more tangible non-transitory computer-readable media of claim 17, where the instructions further comprise:
one or more instructions to verify the other slice is equivalent to the other portion of code based on a manual verification.

20. A method comprising:
selecting a slice of a model from a plurality of slices of the model,
the plurality of slices of the model being identified based on one or more criteria, and
the selecting the slice being performed by a device;
identifying a portion of code, in code generated for the model, that corresponds to the slice,
the identifying the portion of code being performed by the device;
generating an intermediate representation (IR) of the slice of the model,
the generating the IR of the slice being performed by the device;
generating an IR of the portion of code,
the generating the IR of the portion of the code being performed by the device;
normalizing the IR of the slice and the IR of the portion of the code,
the normalizing the IR of the slice and the IR of the portion of code being performed by the device;
comparing the normalized IR of the slice with the normalized IR of the portion of code,
the comparing the normalized IR of the slice with the normalized IR of the portion of code being performed by the device; and
verifying, based on the comparing the normalized IR of the slice and the normalized IR of the portion of code, whether the portion of code is equivalent to the slice,
the verifying whether the slice is equivalent to the portion of code being performed by the device.

21. The method of claim 20, where
the portion of code includes one or more data dependencies and one or more control dependencies, and
generating the IR of the portion of code includes:
generating a program dependency graph that represents the one or more data dependencies and the one or more control dependencies; and
slicing the program dependency graph,
where the program dependency graph includes a graph $G(e, v)$,
where e represents one or more edges and v represents a plurality of vertices, and
where the program dependency graph is sliced based on:
given a vertex $v_i$ of the graph $G(e, v)$, a slice, of the plurality of slices of graph $G(e, v)$, with respect to $v_i$ is a graph $G'(e', v')$ containing one or more vertices, of the plurality of vertices, of which $v_i$ has a transitive flow or a control dependency.

22. The method of claim 21, where
generating the IR of the portion of the code includes:
performing a transformation on the IR of the portion of the code, and
the method further comprises:
outputting information identifying a change made to the IR of the portion of the code,
the change being made to the IR of the portion of the code based on performing the transformation on the IR of the portion of the code.

23. The method of claim 20, where verifying whether the portion of code is equivalent to the slice includes:
verifying whether the portion of code is equivalent to the slice independent of verifying another slice, of the plurality of slices, is equivalent to another portion of code.

24. The method of claim 23, where the other slice is unverifiable.

25. The method of claim 23, where the method further comprises:
verifying the other slice is equivalent to the other portion of code based on a manual verification.

26. A device comprising:
one or more processors, implemented at least partially in hardware, to:
slice a model into a plurality of slices,
each slice, of the plurality of slices, including a different portion of the model;
select a slice from the plurality of slices;
generate a first intermediate representation based on the selected slice;
identify a portion of code, in code generated from the model, that corresponds to the selected slice;
generate a second intermediate representation based on the portion of code;
normalize the first intermediate representation and the second intermediate representation;
compare the normalized first intermediate representation with the normalized second intermediate representation; and
verify, based on the comparing the normalized first intermediate representation and the normalized second intermediate representation, whether the portion of code is equivalent to the selected slice.

27. The device of claim 26, where the one or more processors, when verifying whether the portion of code is equivalent to the selected slice, are to:
verify whether the portion of code is equivalent to the selected slice independent of verifying another slice, of the plurality of slices, is equivalent to another portion of code.

28. The device of claim 27, where the other slice is unverifiable.

29. The device of claim 27, where the one or more processors are further to:
verify the other slice is equivalent to the other portion of code based on a manual verification.

* * * * *